United States Patent
Kobayashi

(10) Patent No.: US 11,982,595 B2
(45) Date of Patent: May 14, 2024

(54) DETERMINING ABNORMALITIES IN THE SUPERSTRUCTURE OF A BRIDGE BASED ON ACCELERATION DATA

(71) Applicant: Seiko Epson Corporation, Tokyo (JP)

(72) Inventor: Yoshihiro Kobayashi, Komagane (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/680,407

(22) Filed: Feb. 25, 2022

(65) Prior Publication Data

US 2022/0276118 A1    Sep. 1, 2022

(30) Foreign Application Priority Data

Feb. 26, 2021  (JP) .................. 2021-029748

(51) Int. Cl.
*G01M 5/00* (2006.01)
(52) U.S. Cl.
CPC ........ *G01M 5/0008* (2013.01); *G01M 5/0041* (2013.01); *G01M 5/0066* (2013.01)
(58) Field of Classification Search
CPC . G01M 5/0008; G01M 5/0041; G01M 5/0066
See application file for complete search history.

(56) References Cited

U.S. PATENT DOCUMENTS

2006/0159135 A1   7/2006  Cliche et al.
2009/0024336 A1*  1/2009  Tatom ................ G01G 23/3728
                                                   702/56
2012/0089378 A1   4/2012  Lee et al.
2015/0316426 A1* 11/2015  Feichtinger ............. G08G 1/02
                                                   702/42

(Continued)

FOREIGN PATENT DOCUMENTS

CN    203305802 U    11/2013
EP    3187838 A1 *   7/2017 ........... G01G 19/024

(Continued)

OTHER PUBLICATIONS

Pietrzak et al, "Dynamic mass measurement in checkweighers using a discrete time-variant low-pass filter", Mechanical SystemsandSignalProcessing48(2014) 67-76 (Year: 2014).*

(Continued)

*Primary Examiner* — Lina Cordero
(74) *Attorney, Agent, or Firm* — Harness, Dickey & Pierce, P.L.C.

(57) ABSTRACT

A measurement method includes: performing low-pass filter processing and high-pass filter processing on target data; estimating correction data; generating vibration component data, and the estimating the correction data includes: specifying a first interval, a second interval, and a third interval; generating first interval correction data, generating second interval correction data in the second interval by setting data in an interval before a first intersection point of first line data and second line data as the first line data, setting data in an interval from the first intersection point to a second intersection point of second line data and third line data as the second line data, and setting data in an interval after the second intersection point as the third line data; and generating third interval correction data.

16 Claims, 22 Drawing Sheets

(56) References Cited

U.S. PATENT DOCUMENTS

2021/0293606 A1\* 9/2021 Kobayashi ............... G08G 1/02
2022/0261511 A1 8/2022 Umekawa et al.

FOREIGN PATENT DOCUMENTS

| JP | 2009-237805 A | | 10/2009 |
|---|---|---|---|
| JP | 2015-140537 A | | 8/2015 |
| JP | 2015-183362 A | | 10/2015 |
| JP | 2019-049095 A | | 3/2019 |
| JP | 2021147820 A | \* | 9/2021 |
| JP | 2021148526 A | \* | 9/2021 |
| JP | 2022131020 A | \* | 9/2022 |

OTHER PUBLICATIONS

Kilikevčius, Artūras & Bacinskas, Darius & Kamaitis, Zenonas. (2013). A Sensor Instrumentation Method for Dynamic Monitoring of Railway Bridges. Journal of Vibroengineering. 15. 176-184 (Year: 2013).\*

\* cited by examiner

DETERMINING ABNORMALITIES IN THE SUPERSTRUCTURE OF A BRIDGE BASED ON ACCELERATION DATA

The present application is based on, and claims priority from JP Application Serial Number 2021-029748, filed Feb. 26, 2021, the disclosure of which is hereby incorporated by reference herein in its entirety.

BACKGROUND

1. Technical Field

The present disclosure relates to a measurement method, a measurement device, a measurement system, and a measurement program.

2. Related Art

JP-A-2009-237805 describes a displacement acquisition device including: a static component storage unit that stores a time series of a static component that is a component independent of motion of a railway vehicle in a time series of a displacement of a girder of a bridge accompanying passage of the railway vehicle; a displacement detection unit that detects a time series of a displacement of a girder of a bridge to be measured based on at least one of an acceleration measurement value and a velocity measurement value of the girder of the bridge to be measured accompanying passage of a railway vehicle to be measured; a dynamic component extraction unit that extracts a time series of a dynamic component that is a remaining component obtained by removing a static component that may include an error from the time series of the displacement detected by the displacement detection unit; a static component acquisition unit that acquires the time series of the static component from the static component storage unit; and a synthesis unit that synthesizes the time series of the dynamic component extracted by the dynamic component extraction unit and the time series of the static component acquired by the static component acquisition unit.

According to the displacement acquisition device described in JP-A-2009-237805, by removing the static component that may include an error from the time series of the displacement of the detected girder and replacing the static component with the stored static component, the time series of the displacement eliminating the error can be obtained.

However, in the displacement acquisition device described in JP-A-2009-237805, since approximability between the static component included in the time series of displacement of the detected girder and the stored static component greatly affects accuracy of the obtained time series of the displacement, when accuracy of the approximability is not sufficient, the accuracy of the time series of the displacement may decrease. In the displacement acquisition device described in JP-A-2009-237805, when a static component included in a time series of a displacement at a measurement time point changes due to a change in environment or the like, no unit is provided for recognizing a deviation between the static component and the stored static component, and it is not possible to know that there is a problem in the accuracy of the displacement. In the displacement acquisition device described in JP-A-2009-237805, it is necessary to store data of the static component for each classification of the railway vehicle and each classification of the bridge, and it is necessary to acquire and update the data, which complicates a configuration and makes it difficult to reduce a cost. Therefore, a method of reducing an error without preparing information for reducing an error such as static component data in advance is desired.

SUMMARY

According to an aspect of the present disclosure, a measurement method includes: a low-pass filter processing step of performing low-pass filter processing on target data including a drift noise and a vibration component to generate vibration component reduction data in which the vibration component is reduced; a high-pass filter processing step of performing high-pass filter processing on the vibration component reduction data to generate drift noise reduction data in which the drift noise is reduced; a correction data estimation step of estimating, based on the drift noise reduction data, correction data corresponding to a difference between the drift noise reduction data and data obtained by removing the drift noise from the vibration component reduction data; a vibration component data generation step of generating vibration component data, which includes the vibration component, by subtracting the vibration component reduction data from the target data; and a measurement data generation step of generating measurement data by adding the drift noise reduction data, the correction data, and the vibration component data, in which the correction data estimation step includes: an interval specifying step of calculating a first peak and a second peak of the drift noise reduction data and specifying a first interval before the first peak, a second interval between the first peak and the second peak, and a third interval after the second peak, a first interval correction data generation step of generating first interval correction data by inverting a sign of the drift noise reduction data in the first interval, a second interval correction data generation step of generating second interval correction data in the second interval, a third interval correction data generation step of generating third interval correction data by inverting a sign of the drift noise reduction data in the third interval, and a correction data generation step of generating the correction data by adding the first interval correction data, the second interval correction data, and the third interval correction data, and the second interval correction data generation step includes: generating first line data linearly approximating the first interval correction data smaller than a product of a first coefficient and a value obtained by inverting a sign of an amplitude of the first peak, generating second line data obtained by multiplying a line passing through the first peak and the second peak by a second coefficient, generating third line data linearly approximating the third interval correction data smaller than a product of the first coefficient and a value obtained by inverting a sign of an amplitude of the second peak, calculating a first intersection point between the first line data and the second line data and a second intersection point between the second line data and the third line data, and generating the second interval correction data in the second interval by using data before the first intersection point as the first line data, data from the first intersection point to the second intersection point as the second line data, and data after the second intersection point as the third line data.

According to an aspect of the present disclosure, a measurement method includes: a low-pass filter processing step of performing low-pass filter processing on target data including a drift noise and a vibration component to generate vibration component reduction data in which the vibration component is reduced; a high-pass filter processing step of performing high-pass filter processing on the vibration component reduction data to generate drift noise reduction data in which the drift noise is reduced; an interval specifying step of calculating a first peak and a second peak of the drift noise reduction data and specifying a first interval before the first peak, a second interval between the first peak and the second peak, and a third interval after the second peak; a correction data estimation step of estimating, based on the drift noise reduction data, correction data in the second interval corresponding to a difference between the drift noise reduction data and data obtained by removing the drift noise from the vibration component reduction data; a vibration component data generation step of generating vibration component data, which includes the vibration component, by subtracting the vibration component reduction data from the target data; and a measurement data generation step of generating measurement data by setting data in the first interval as the vibration component reduction data, adding the drift noise reduction data, the correction data, and the vibration component data in the second interval, and setting data in the third interval as the vibration component reduction data, in which the correction data estimation step includes: generating first interval inverted data by inverting a sign of the drift noise reduction data in the first interval, generating third interval inverted data by inverting a sign of the drift noise reduction data in the third interval, generating first line data linearly approximating the first interval inverted data smaller than a product of a first coefficient and a value obtained by inverting a sign of an amplitude of the first peak, generating second line data obtained by multiplying a line passing through the first peak and the second peak by a second coefficient, generating third line data linearly approximating the third interval inverted data smaller than a product of the first coefficient and a value obtained by inverting a sign of an amplitude of the second peak, calculating a first intersection point between the first line data and the second line data and a second intersection point between the second line data and the third line data, and generating the correction data in the second interval by using data before the first intersection point as the first line data, data from the first intersection point to the second intersection point as the second line data, and data after the second intersection point as the third line data.

According to an aspect of the present disclosure, a measurement device includes: a low-pass filter processing unit configured to perform low-pass filter processing on target data including a drift noise and a vibration component to generate vibration component reduction data in which the vibration component is reduced; a high-pass filter processing unit configured to perform high-pass filter processing on the vibration component reduction data to generate drift noise reduction data in which the drift noise is reduced; a correction data estimation unit configured to estimate, based on the drift noise reduction data, correction data corresponding to a difference between the drift noise reduction data and data obtained by removing the drift noise from the vibration component reduction data; a vibration component data generation unit configured to generate vibration component data, which includes the vibration component, by subtracting the vibration component reduction data from the target data; and a measurement data generation unit configured to generate measurement data by adding the drift noise reduction data, the correction data, and the vibration component data, in which the correction data estimation unit is configured to: calculate a first peak and a second peak of the drift noise reduction data and specify a first interval before the first peak, a second interval between the first peak and the second peak, and a third interval after the second peak, generate first interval correction data by inverting a sign of the drift noise reduction data in the first interval, generate third interval correction data by inverting a sign of the drift noise reduction data in the third interval, generate first line data linearly approximating the first interval correction data smaller than a product of a first coefficient and a value obtained by inverting a sign of an amplitude of the first peak, generate second line data obtained by multiplying a line passing through the first peak and the second peak by a second coefficient, generate third line data linearly approximating the third interval correction data smaller than a product of the first coefficient and a value obtained by inverting a sign of an amplitude of the second peak, calculate a first intersection point between the first line data and the second line data and a second intersection point between the second line data and the third line data, generate the second interval correction data in the second interval by using data before the first intersection point as the first line data, data from the first intersection point to the second intersection point as the second line data, and data after the second intersection point as the third line data, and generate the correction data by adding the first interval correction data, the second interval correction data, and the third interval correction data.

According to an aspect of the present disclosure, a measurement system includes: the measurement device according to the above aspect; and an observation device configured to observe an observation point, in which the target data is data based on observation data observed by the observation device.

According to an aspect of the present disclosure, a non-transitory computer-readable storage medium stores a measurement program, and the measurement program causes a computer to execute: a low-pass filter processing step of performing low-pass filter processing on target data including a drift noise and a vibration component to generate vibration component reduction data in which the vibration component is reduced; a high-pass filter processing step of performing high-pass filter processing on the vibration component reduction data to generate drift noise reduction data in which the drift noise is reduced; a correction data estimation step of estimating, based on the drift noise reduction data, correction data corresponding to a difference between the drift noise reduction data and data obtained by removing the drift noise from the vibration component reduction data; a vibration component data generation step of generating vibration component data, which includes the vibration component, by subtracting the vibration component reduction data from the target data; and a measurement data generation step of generating measurement data by adding the drift noise reduction data, the correction data, and the vibration component data, in which the correction data estimation step includes: an interval specifying step of calculating a first peak and a second peak of the drift noise reduction data and specifying a first interval before the first peak, a second interval between the first peak and the second peak, and a third interval after the second peak, a first interval correction data generation step of generating first interval correction data by inverting a sign of the drift noise reduction data in the first interval, a second interval correction data generation step of generating second interval correction data in the second interval, a third interval correction data generation step of generating third interval correction data by inverting a sign of the drift noise reduction data in the third interval, and a correction data generation step of generating the correction data by adding the first interval correction data, the second interval correction data, and the third interval correction data, and the second interval correction data generation step includes: generating first line data linearly approximating the first interval correction data smaller than a product of a first coefficient and a value obtained by inverting a sign of an amplitude of the first peak, generating second line data obtained by multiplying a line passing through the first peak and the second peak by a second coefficient, generating third line data linearly approximating the third interval correction data smaller than a product of the first coefficient and a value obtained by inverting a sign of an amplitude of the second peak, calculating a first intersection point between the first line data and the second line data and a second intersection point between the second line data and the third line data, and generating the second interval correction data in the second interval by using data before the first intersection point as the first line data, data from the first intersection point to the second intersection point as the second line data, and data after the second intersection point as the third line data.

DESCRIPTION OF EXEMPLARY EMBODIMENTS

Hereinafter, preferred embodiments of the present disclosure will be described in detail with reference to the drawings. The embodiments to be described below do not in any way limit contents of the present disclosure described in claims. Not all configurations to be described below are necessarily essential components of the present disclosure.

1. First Embodiment 1-1. Configuration of Measurement System

Hereinafter, a measurement system for implementing a measurement method according to the present embodiment will be described by taking a case where a structure is a superstructure of a bridge and a moving object is a railway vehicle as an example.

Figure 1:
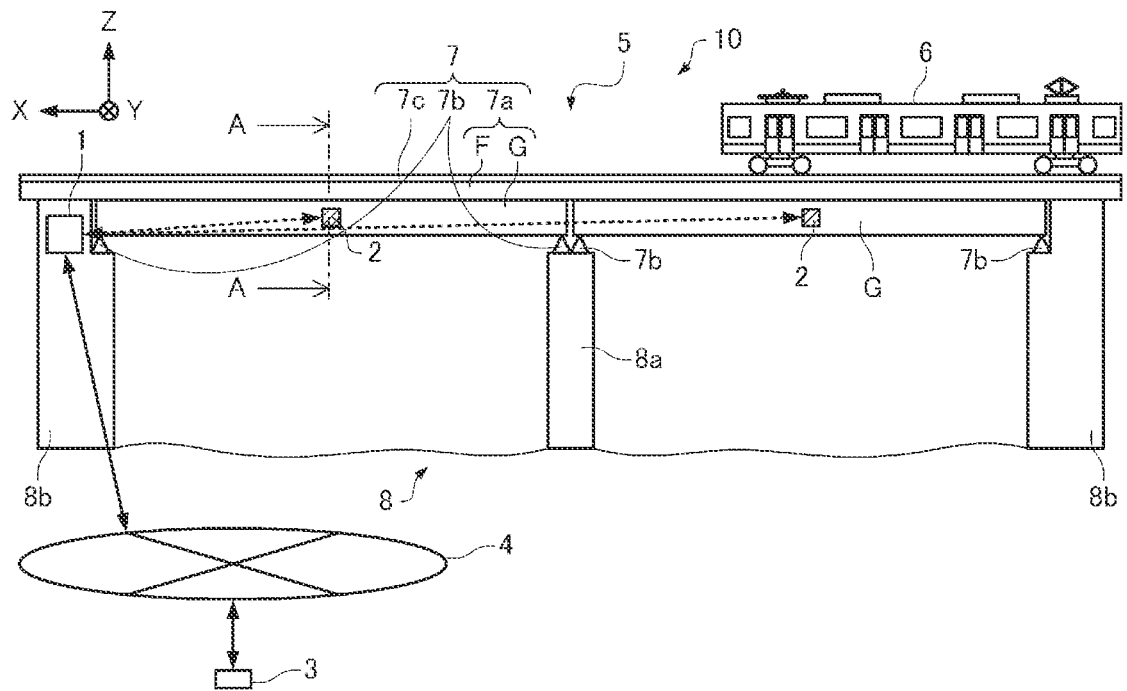
FIG. 1 is a diagram showing a configuration example of a measurement system.

FIG. 1 is a diagram showing an example of a measurement system according to the present embodiment. As shown in FIG. 1, a measurement system 10 according to the present embodiment includes a measurement device 1, and at least one sensor 2 provided on a superstructure 7 of a bridge 5. The measurement system 10 may include a monitoring device 3.

Figure 2:
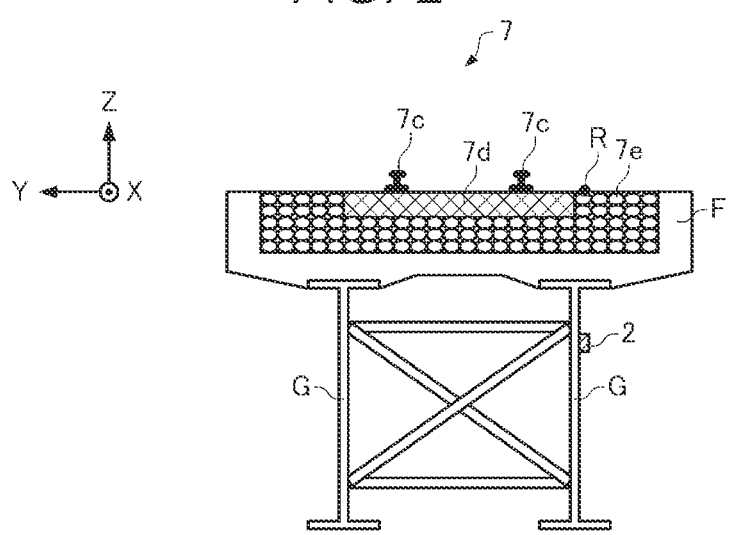
FIG. 2 is a cross-sectional view of a superstructure of FIG. 1 taken along line A-A.

The bridge 5 includes the superstructure 7 and a substructure 8. FIG. 2 is a cross-sectional view of the superstructure 7 taken along line A-A of FIG. 1. As shown in FIGS. 1 and 2, the superstructure 7 includes a bridge floor 7a, a support 7b, rails 7c, ties 7d, and a ballast 7e, and the bridge floor 7a includes a floor plate F, a main girder G, a cross girder which is not shown. As shown in FIG. 1, the substructure 8 includes bridge piers 8a and bridge abutments 8b. The superstructure 7 is a structure across any one of the bridge abutment 8b and the bridge pier 8a adjacent to each other, two adjacent bridge abutments 8b, and two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

The measurement device 1 and the sensors 2 are coupled by, for example, a cable which is not shown and communicate with one another via a communication network such as a CAN. CAN is an abbreviation for controller area network. Alternatively, the measurement device 1 and the sensors 2 may communicate with each other via a wireless network.

For example, each sensor 2 outputs data for calculating a displacement of the superstructure 7 caused by a movement of a railway vehicle 6 which is a moving object. In the present embodiment, each of the sensors 2 is an acceleration sensor, and may be, for example, a crystal acceleration sensor or an MEMS acceleration sensor. MEMS is an abbreviation for micro electro mechanical systems.

In the present embodiment, each sensor 2 is installed at position of a central portion of the superstructure 7 in a longitudinal direction, specifically, at a central portion of the main girder G in the longitudinal direction. Each sensor 2 is not limited to being installed at the central portion of the superstructure 7 as long as each sensor 2 can detect an acceleration for calculating the displacement of the superstructure 7. When each sensor 2 is provided on the floor plate F of the superstructure 7, the sensor 2 may be damaged due to traveling of the railway vehicle 6, and the measurement accuracy may be affected by local deformation of the bridge floor 7a, so that in the example of FIGS. 1 and 2, each sensor 2 is provided at the main girder G of the superstructure 7.

The floor plate F, the main girder G, and the like of the superstructure 7 are bent in a vertical direction due to a load of the railway vehicle 6 traveling on the superstructure 7. Each sensor 2 detects an acceleration of the bending of the floor plate F or the main girder G caused by the load of the railway vehicle 6 traveling on the superstructure 7.

The measurement device 1 calculates the bending displacement of the superstructure 7 caused by the traveling of the railway vehicle 6 based on acceleration data output from the sensors 2. The measurement device 1 is installed on, for example, the bridge abutment 8b.

The measurement device 1 and the monitoring device 3 can communicate with each other via, for example, a wireless network of a mobile phone and a communication network 4 such as the Internet. The measurement device 1 transmits information on the displacement of the superstructure 7 caused by the traveling of the railway vehicle 6 to the monitoring device 3. The monitoring device 3 may store the information in a storage device (not illustrated), and may perform, for example, processing such as monitoring of the railway vehicle 6 and abnormality determination of the superstructure 7 based on the information.

In the present embodiment, the bridge 5 is a railroad bridge, and is, for example, a steel bridge, a girder bridge, or an RC bridge. The RC is an abbreviation for reinforced-concrete.

As shown in FIG. 2, in the present embodiment, an observation point R is set in association with the sensor 2. In the example of FIG. 2, the observation point R is set at a position on a surface of the superstructure 7 located vertically above the sensor 2 provided at the main girder G. That is, the sensor 2 is an observation device for observing the observation point R. Although the sensor 2 for observing the observation point R may be provided at a position where the acceleration generated at the observation point R due to the traveling of the railway vehicle 6 can be detected, it is desirable that the sensor 23 is provided at a position close to the observation point R.

The number and installation positions of the sensors 2 are not limited to the examples shown in FIGS. 1 and 2, and various modifications can be made.

The measurement device 1 acquires an acceleration in a direction intersecting the surface of the superstructure 7 on which the railway vehicle 6 moves, based on the acceleration data output from the sensor 2. The surface of the superstructure 7 on which the railway vehicle 6 moves is defined by a direction in which the railway vehicle 6 moves, that is, an X direction which is the longitudinal direction of the superstructure 7, and a direction orthogonal to the direction in which the railway vehicle 6 moves, that is, a Y direction which is a width direction of the superstructure 7. Since the observation point R is bent in a direction orthogonal to the X direction and the Y direction due to the traveling of the railway vehicle 6, it is desirable that the measurement device 1 acquires the acceleration in a direction orthogonal to the X direction and the Y direction, that is, a Z direction which is a normal direction of the floor plate F, in order to accurately calculate a magnitude of the acceleration of the bending.

Figure 3:
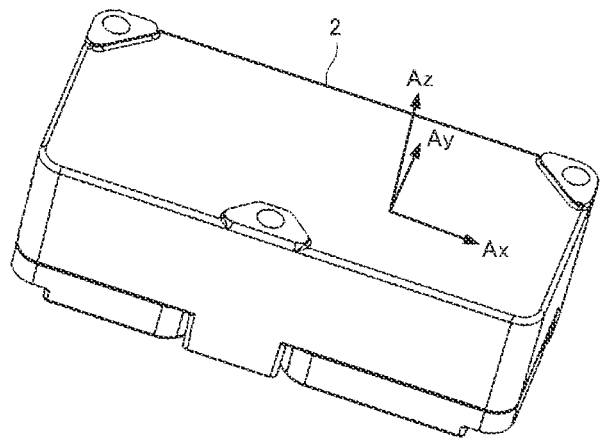
FIG. 3 is a diagram illustrating an acceleration detected by an acceleration sensor.

FIG. 3 is a diagram showing the acceleration detected by the sensor 2. The sensor 2 is an acceleration sensor that detects accelerations generated in three axes orthogonal to one another.

In order to detect the acceleration of the bending at the observation point R caused by the traveling of the railway vehicle 6, the sensor 2 is installed such that one of three detection axes, which are the x axis, the y axis, and the z axis, intersects the X direction and the Y direction. In FIGS. 1 and 2, the sensor 2 is installed such that one axis thereof is in a direction intersecting the X direction and the Y direction. The observation point R bends in the direction orthogonal to the X direction and the Y direction. Therefore, in order to accurately detect the acceleration of the bending, ideally, the sensor 2 is installed such that one axis thereof is in the direction orthogonal to the X direction and the Y direction, that is, the normal direction of the floor plate F.

However, when the sensor 2 is installed on the superstructure 7, an installation location may be inclined. In the measurement device 1, even if one of the three detection axes of the sensor 2 is not installed in the normal direction of the floor plate F, since the direction is substantially oriented in the normal direction, an error is small and thus can be ignored. The measurement device 1 can correct a detection error, caused by the inclination of the sensor 2, by a three-axis combined acceleration that is obtained by combining the accelerations in the x axis, the y axis, and the z axis even if one of the three detection axes of the sensor 2 is not installed in the normal direction of the floor plate F. The sensor 2 may be a one-axis acceleration sensor that detects an acceleration generated in a direction at least substantially parallel to the vertical direction or an acceleration in the normal direction of the floor plate F.

Hereinafter, first, basic concept of the measurement method according to the present embodiment executed by the measurement device 1 will be described, and then the details thereof will be described.

1-2. Basic Concept of Measurement Method

First, it is assumed that target data to be processed, which is obtained based on acceleration data output from the sensor 2 is $M_d(k)$, and the target data $M_d(k)$ includes the significant signal M(k) including the vibration component and a drift noise e(k) as in Equation (1). When the number of samples included in the target data $M_d(k)$ is N, k is an integer from 0 to N−1.

$$M_d(k)=M(k)+e(k) \quad (1)$$

Figure 4:
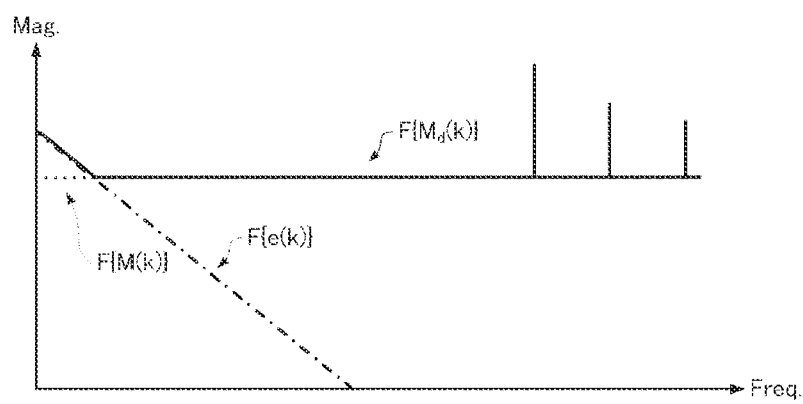
FIG. 4 is a diagram showing a relationship of frequency characteristics $F\{M_d(k)\}$, $F\{M(k)\}$, and $F\{e(k)\}$.

The drift noise e(k) is mainly not a signal input to the sensor 2, but an error signal generated inside the sensor 2, such as a zero-point error, a drift caused by a temperature change, or a drift caused by nonlinear sensitivity. The drift noise e(k) is a variation of a long period as compared with a signal input to the sensor 2, and has an energy distribution in a low frequency range. FIG. 4 shows a relationship of a frequency characteristic $F\{M_d(k)\}$ of the target data $M_d(k)$, a frequency characteristic $F\{M(k)\}$ of the signal M(k), and a frequency characteristic $F\{e(k)\}$ of the drift noise e(k).

The vibration component included in the signal M(k) is, for example, a signal component and a harmonic component of a fundamental frequency generated by natural vibration of the bridge 5, and generally has an energy distribution in a frequency range higher than that of the drift noise e(k). Therefore, as in Equation (2), data $M_S(k)$ in which the vibration component is reduced is obtained by performing low-pass filter processing on the target data $M_d(k)$.

$$M_S(k)=f_{LP}\{M_d(k)\} \quad (2)$$

Figure 5:
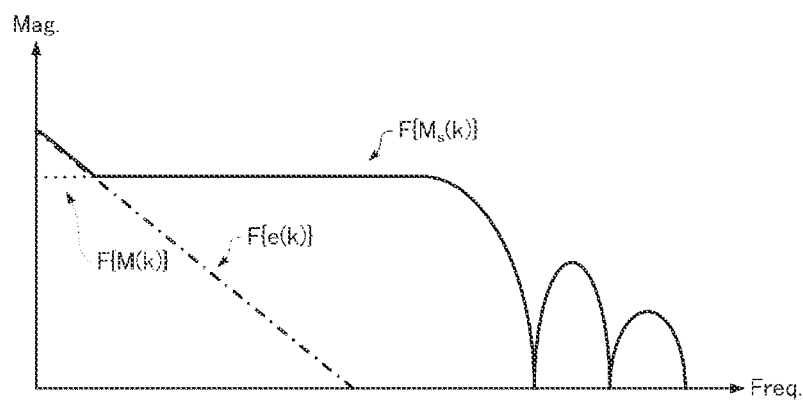
FIG. 5 is a diagram showing a relationship of frequency characteristics $F\{M_s(k)\}$, $F\{M(k)\}$, and $F\{e(k)\}$.

The low-pass filter processing for reducing the vibration component may be processing of performing moving average on the target data $M_d(k)$ in a cycle corresponding to a fundamental frequency calculated based on the frequency characteristic $F\{M_d(k)\}$, or may be FIR filter processing for attenuating a signal component of a frequency equal to or higher than the fundamental frequency. The FIR is an abbreviation for finite impulse response. FIG. 5 shows a relationship of a frequency characteristic $F\{M_s(k)\}$ of the data $M_s(k)$ obtained by performing moving average processing on the target data $M_d(k)$, the frequency characteristic $F\{M(k)\}$ of the signal M(k), and the frequency characteristic $F\{e(k)\}$ of the drift noise e(k).

Figure 6:
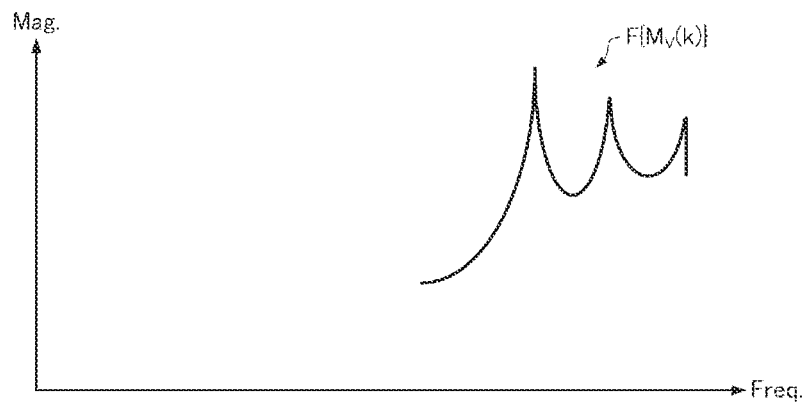
FIG. 6 is a diagram showing a frequency characteristic $F\{MV(k)\}$.

As in Equation (3), by subtracting the data $M_S(k)$ from the target data $M_d(k)$, data $M_V(k)$ including the vibration component is obtained. FIG. 6 shows a frequency characteristic $F\{M_V(k)\}$ of the data $M_V(k)$ including the vibration component.

$$M_V(k)=M_d(k)-M_S(k) \quad (3)$$

When data obtained by performing high-pass filter processing on the data $M_s(k)$ is represented by $f_{HP}(M_s(k))$ and data obtained by performing low-pass filter processing on the data $M_S(k)$ is represented by $f_{LP}(M_s(k))$, a relationship of the data $M_S(k)$, the data $f_{HP}(M_S(k))$, and the data $f_{LP}(M_S(k))$ is expressed by Equation (4).

$$M_S(k)=f_{HP}(M_S(k))+f_{LP}(M_S(k)) \quad (4)$$

Figure 7:
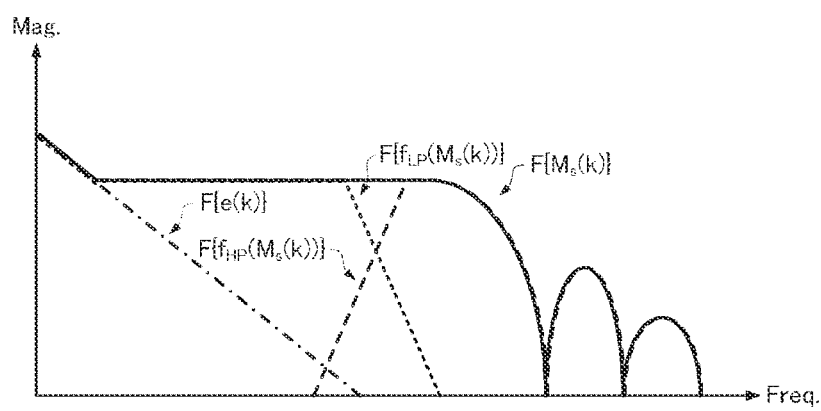
FIG. 7 is a diagram showing a relationship of frequency characteristics $F\{M_s(k)\}$, $F\{f_{HP}(M_s(k))\}$, and $F\{f_{LP}(M_s(k))\}$.

A relationship of the frequency characteristic $F\{M_S(k)\}$ of the data $M_S(k)$, a frequency characteristic $F\{f_{HP}(M_S(k))\}$ of the data $f_{HP}(M_S(k))$, and a frequency characteristic $F\{f_{LP}(M_S(k))\}$ of the data $f_{LP}(M_S(k))$ is expressed by Equation (5). FIG. 7 shows the relationship of the frequency characteristics $F\{M_S(k)\}$, $F\{f_{HP}(M_S(k))\}$, and $F\{f_{LP}(M_S(k))\}$.

$$F\{M_S(k)\}=F\{f_{HP}(M_S(k))\}+F\{f_{LP}(M_S(k))\} \quad (5)$$

Since the drift noise e(k) is observed as an offset error, high-pass filter processing for attenuating a signal in a low frequency range is effective in order to remove the drift noise e(k). It is assumed that, when high-pass filter processing is performed on the data $M_S(k)$, the drift noise e(k) having an energy distribution in the low frequency range is sufficiently reduced, and the data $f_{HP}(M_S(k))$ after the high-pass filter processing is substantially equal to the data $f_{HP}(M(k))$ obtained by performing high-pass filter processing on the signal M(k) as in Equation (6).

$$f_{HP}(M_S(k))≈f_{HP}(M(k)) \quad (6)$$

Since a signal component in the low frequency range of the signal M(k) is also lost due to the high-pass filter processing, in order to compensate for this signal component, the data $f_{LP}(M(k))$ obtained by performing low-pass filter processing on signal M(k) is estimated based on the data $f_{HP}(M_S(k))$ obtained by performing high-pass filter processing on the data $M_S(k)$. As in Equation (7), it is assumed that the data $f_{LP}(M(k))$ obtained by performing low-pass filter processing on the signal M(k) is substantially equal to data $A_{LP}(f_{HP}(M_S(k)))$ obtained by estimating the data $f_{LP}(M(k))$ obtained by performing low-pass filter processing on the signal M(k) from the data $f_{HP}(M_S(k))$ obtained by performing high-pass filter processing on the data $M_S(k)$.

$$f_{LP}(M(k))≈A_{LP}(f_{HP}(M_S(k))) \quad (7)$$

When it is assumed that, as in Equation (8), the data obtained by removing the drift noise e(k) from the data $M_S(k)$ is equal to a sum of the data $f_{HP}(M_S(k))$ obtained by performing high-pass filter processing on the data $M_S(k)$ and the data $f_{LP}(M(k))$ obtained by performing low-pass filter processing on the signal M(k), Equation (9) is obtained based on Equation (6), Equation (7), and Equation (8).

$$M_S(k)-e(k)=f_{HP}(M_S(k))+f_{LP}(M(k)) \quad (8)$$

$$M_S(k)-e(k)≈M_S'(k)=f_{HP}(M_S(k))+A_{LP}(f_{HP}(M_S(k))) \quad (9)$$

Figure 8:
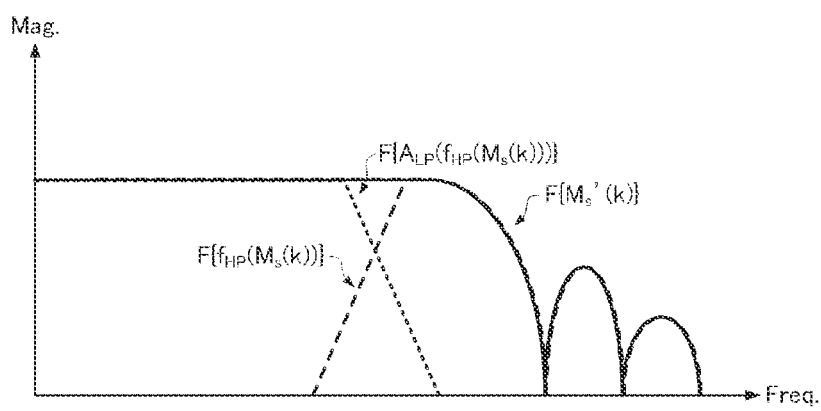
FIG. 8 is a diagram showing a relationship of frequency characteristics $F\{M_s'(k)\}$, $F\{f_{HP}(M_s(k))\}$, and $F\{A_{LP}(f_{HP}(M_s(k)))\}$.

Based on Equation (9), a relationship of a frequency characteristic $F\{M_S'(k)\}$ of the data $M_S'(k)$, the frequency characteristic $F\{f_{HP}(M_S(k))\}$ of the data $f_{HP}(M_S(k))$, and the frequency characteristic $F\{A_{LP}(f_{HP}(M_S(k)))\}$ of the data $A_{LP}(f_{HP}(M_S(k)))$ is expressed by Equation (10). FIG. 8 shows the relationship of the frequency characteristics $F\{M_S'(k)\}$, $F\{f_{HP}(M_S(k))\}$, and $F\{A_{LP}(f_{HP}(M_S(k)))\}$.

$$F\{M_S'(k)\}=F\{f_{HP}(M_S(k))\}+F\{A_{LP}(f_{HP}(M_S(k)))\} \quad (10)$$

Figure 9:
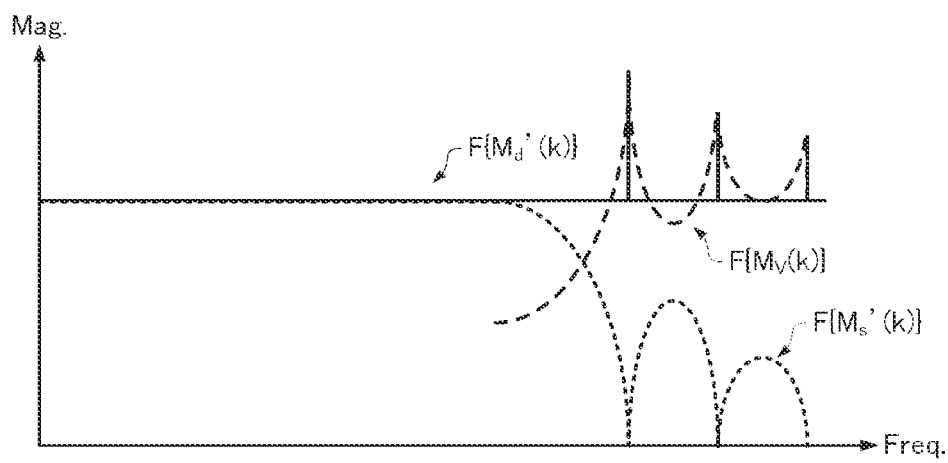
FIG. 9 is a diagram showing a relationship of frequency characteristics $F\{M_d'(k)\}$, $F\{M_s'(k)\}$, and $F\{M_V(k)\}$.

As in Equation (11), data $M_d'(k)$ approximate to the signal M(s) is obtained by adding the data $M_S'(k)$ obtained by Equation (9) and the data $M_V(k)$ including the vibration component. FIG. 9 is a diagram showing a relationship of frequency characteristics $F\{M_d'(k)\}$, $F\{M_S'(k)\}$, and $F\{M_V(k)\}$.

$$M(k)≈M_d'(k)=M_S'(k)+M_V(k) \quad (11)$$

Since the data $f_{HP}(M_s(k))$ in which the drift noise e(k) is reduced is obtained by performing high-pass filter processing on the data $M_s(k)$, the data $f_{LP}(M(k))$ obtained by performing low-pass filter processing on the signal M(k) is estimated based on the data $f_{HP}(M_s(k))$, and the signal $M(k)$ in which the drift noise $e(k)$ is reduced can be obtained by adding the data $f_{HP}(M_s(k))$, the estimated data, and the data $M_V(k)$ including the vibration component.

Hereinafter, a case where the data $M_s(k)$ is displacement data will be described as an example, and a procedure of estimating the data $f_{LP}(M(k))$, that is obtained by performing low-pass filter processing on the signal $M(k)$, based on the data $f_{HP}(M_s(k))$ obtained by performing high-pass filter processing on the data $M_s(k)$ will be described.

Figure 10:
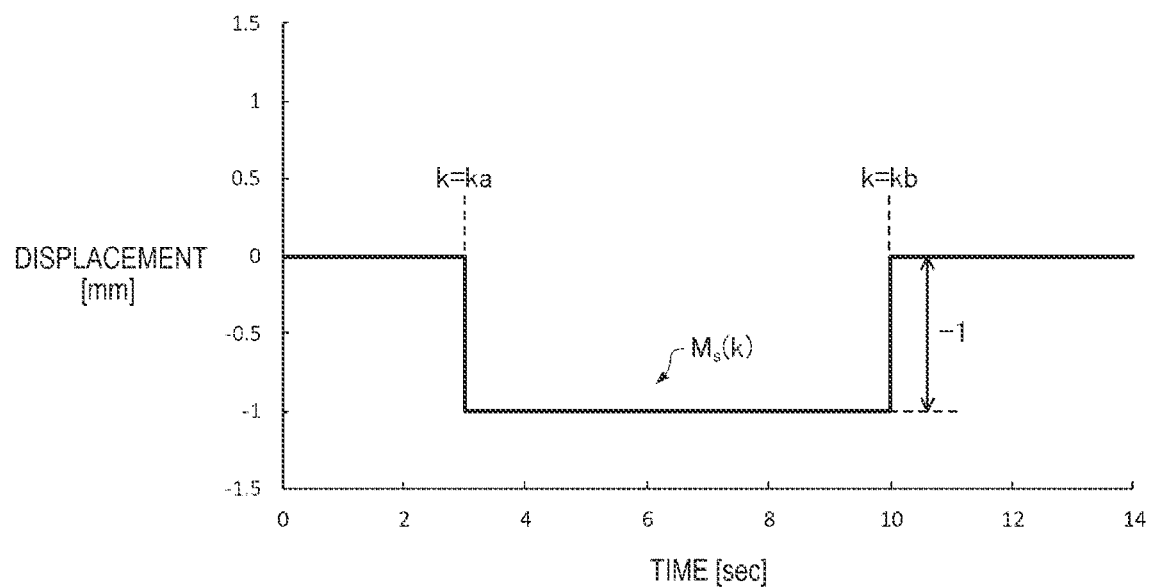
FIG. 10 is a diagram showing data $M_s(k)$ which is a unit pulse waveform.

First, a unit pulse waveform obtained by simplifying a deflection displacement of the superstructure 7 of the bridge 5 when the railway vehicle 6 passes through the superstructure 7 is assumed as the data $M_S(k)$, as in Equation (12). In Equation (12), k is an integer of 0 or more. FIG. 10 shows the data $M_S(k)$, which is a unit pulse waveform expressed by Equation (12).

$$M_s(k) = \begin{cases} 0 & k < k_a, k_b < k \\ -1 & k_a \le k \le k_b \end{cases} \tag{12}$$

It is assumed that a relationship of the data $M_S(k)$, the data $f_{HP}(M_S(k))$ obtained by performing high-pass filter processing on the data $M_S(k)$, and the data $f_{LP}(M_S(k))$ obtained by performing low-pass filter processing on the data $M_S(k)$ is as in Equation (13).

$$M_S(k) = f_{HP}(M_S(k)) + f_{LP}(M_S(k)) \tag{13}$$

For example, when the low-pass filter processing is moving average processing, Equation (14) is obtained based on Equation (13). At this time, data k is located at a center of a moving average interval 2p+1.

$$f_{HP}(M_s(k)) = M_s(k) - f_{LP}(M_s(k)) = M_s(k) - \frac{1}{2p+1} \sum_{n=k-p}^{n=k+p} M_s(n) \tag{14}$$

Figure 11:
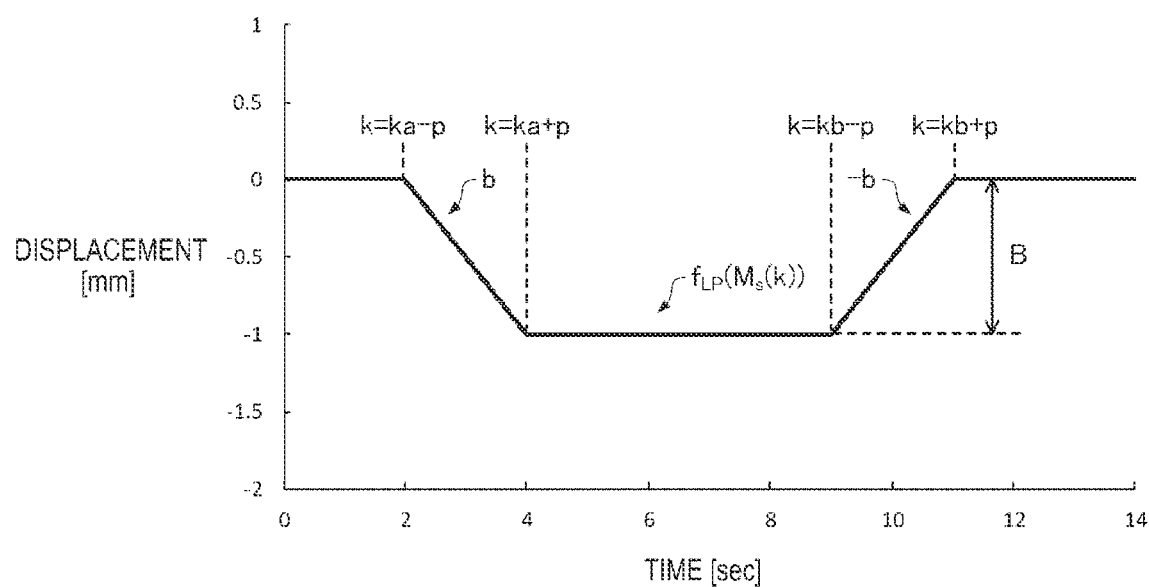
FIG. 11 is a diagram showing data $f_{LP}(M_s(k))$ obtained by performing low-pass filter processing on data $M_s(k)$.
Figure 12:
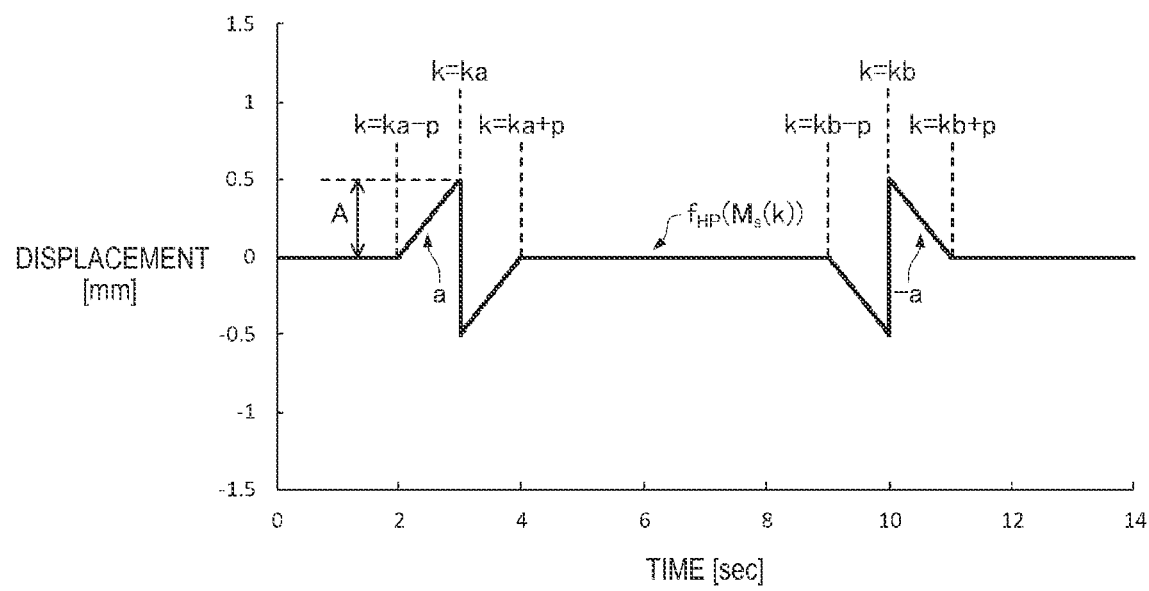
FIG. 12 is a diagram showing data $f_{HP}(M_s(k))$ obtained by performing high-pass filter processing on data $M_s(k)$.

In Equation (14), p is an integer of 1 or more, and since it is desired to provide a flat portion in the data $f_{LP}(M_s(k))$ obtained by performing low-pass filter processing on the data $M_s(k)$, $p < (k_a - k_b)/2$ is satisfied. FIG. 11 shows the data $f_{LP}(M_s(k))$ obtained by performing low-pass filter processing, which is moving average processing, on the data $M_s(k)$ which is a unit pulse waveform represented by Equation (12). FIG. 12 shows the data $f_{HP}(M_s(k))$ obtained by performing high-pass filter processing on the data $M_s(k)$ which is a unit pulse waveform represented by Equation (12).

With reference to FIGS. 11 and 12, the data $f_{HP}(M_s(k))$ obtained by performing high-pass filter processing on the data $M_s(k)$ which is a unit pulse waveform is compared with the data $f_{LP}(M_s(k))$ obtained by performing low-pass filter processing on the data $M_s(k)$.

As shown in FIG. 11, a slope b of an interval from $k_a-p$ to $k_a+p$ of the data $f_{LP}(M_S(k))$ obtained by performing low-pass filter processing on the data $M_S(k)$ is calculated by Equation (15).

$$b = f_{LP}(M_s(k_a+1)) - f_{LP}(M_s(k_a)) = \tag{15}$$

$$\frac{1}{2p+1} \sum_{n=k_a+1-p}^{n=k_a+1+p} M_s(n) - \frac{1}{2p+1} \sum_{n=k_a-p}^{n=k_a+1+p} M_s(n) = \frac{-1}{2p+1}$$

A slope of an interval from $k_b-p$ to $k_b+p$ of the data $f_{LP}(M_s(k))$ is $-b$, and an amplitude B of an interval from $k_a+p$ to $k_b-p$ is $-1$.

On the other hand, as shown in FIG. 12, a slope a of an interval from $k_a-p$ to $k_a$ of the data $f_{HP}(M_S(k))$ obtained by performing high-pass filter processing on the data $M_S(k)$ is calculated by Equation (16).

$$a = f_{HP}(M_s(k)) = M_s(k) - f_{LP}(M_s(k)) = \frac{1}{2p+1} \tag{16}$$

A slope of an interval from $k_b$ to $k_b+p$ of the data $f_{HP}(M_S(k))$ is $-a$, and an amplitude A of $k=k_a-1$ is calculated by Equation (17).

$$A = f_{HP}(M_s(k_a - 1)) = \tag{17}$$

$$M_s(k_a - 1) - f_{LP}(M_s(k_a - 1)) = M_s(k_a - 1) - \frac{1}{2p+1} \sum_{n=k_a-1-p}^{n=k_a-1+p} M_s(n)$$

By substituting Equation (12) into Equation (17), the amplitude A is calculated as in Equation (18).

$$A = 0 - \frac{1}{2p+1} \left( \sum_{n=k_a-1-p}^{n=k_a-1} M_s(n) + \sum_{n=k_a}^{n=k_a-1+p} M_s(n) \right) = \tag{18}$$

$$-\frac{1}{2p+1}(0 + (p)(-1)) = \frac{p}{2p+1}$$

According to Equation (18), when p is sufficiently large, the amplitude A is ½.

Here, the unit pulse waveform represented by Equation (12) and assumed as the data $M_s(k)$ does not include the drift noise $e(k)$. Therefore, the data $f_{LP}(M_s(k))$ obtained by performing low-pass filter processing on the data $M_s(k)$ is equal to the data $f_{LP}(M(k))$ obtained by performing low-pass filter processing on the signal $M(k)$. Therefore, a comparison between the data $f_{HP}(M_s(k))$ and the data $f_{LP}(M_s(k))$ is a comparison between the data $f_{HP}(M_s(k))$ and the data $f_{LP}(M(k))$, and by measuring the slope a and the amplitude A of the data $f_{HP}(M_s(k))$, the data $f_{LP}(M(k))$ obtained by performing low-pass filter processing on the signal $M(k)$ can be estimated.

1-3. Details of Measurement Method

Actually, the target data $U(k)$ which is displacement data of the deflection when the railway vehicle 6 passes through the superstructure 7 of the bridge 5 includes data of a waveform that projects in a positive direction or a negative direction and is different from the unit pulse waveform, but the data $f_{LP}(M(k))$ obtained by performing low-pass filter processing on the signal $M(k)$ can be estimated based on the estimation method described above by replacing the target data $M_d(k)$ with the target data $U(k)$. For example, the waveform that projects in the positive direction or the negative direction is a rectangular waveform, a trapezoidal waveform, or a sine half-wave waveform.

Figure 13:
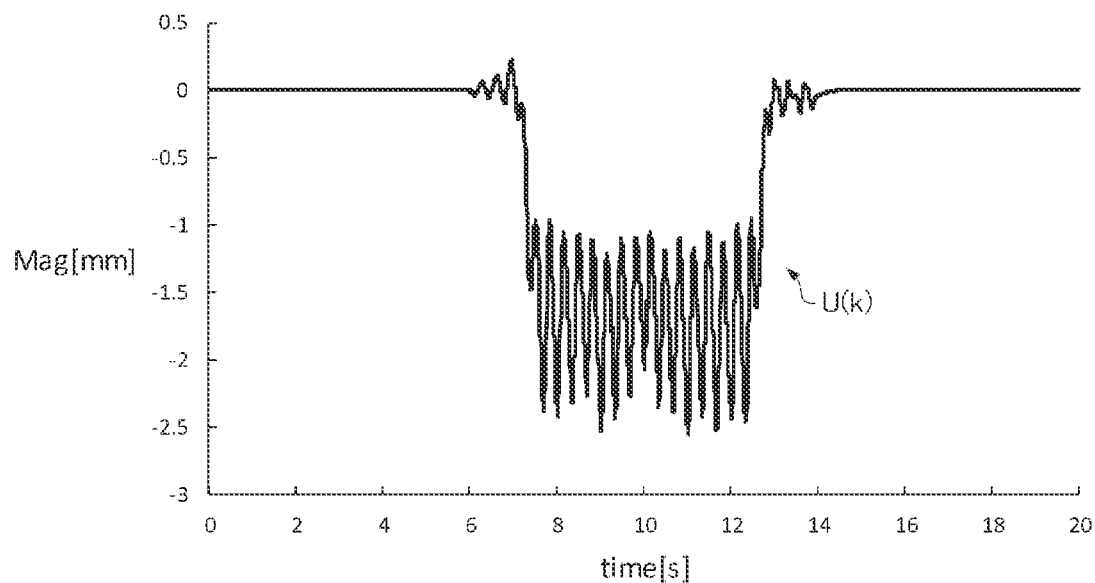
FIG. 13 is a diagram showing an example of target data $U(k)$.

First, the measurement device 1 integrates acceleration data $A_S(k)$ output from the acceleration sensor to generate velocity data $V_S(k)$ as in Equation (19), and further integrates the velocity data $V_S(k)$ to generate the target data $U(k)$ as in Equation (20). In Equation (19) and Equation (20), ΔT is a time interval of data. FIG. 13 shows an example of the target data U(k).

$$V_S(k)=A_S(k)\Delta T+V_S(k-1) \quad (19)$$

$$U(k)=V_S(k)\Delta T+U(k-1) \quad (20)$$

Next, in order to reduce the vibration component and the harmonic component of the fundamental frequency $F_f$ included in the target data U(k), the measurement device 1 generates displacement data $M_s(k)$ obtained by performing low-pass filter processing on the target data U(k).

Figure 14:
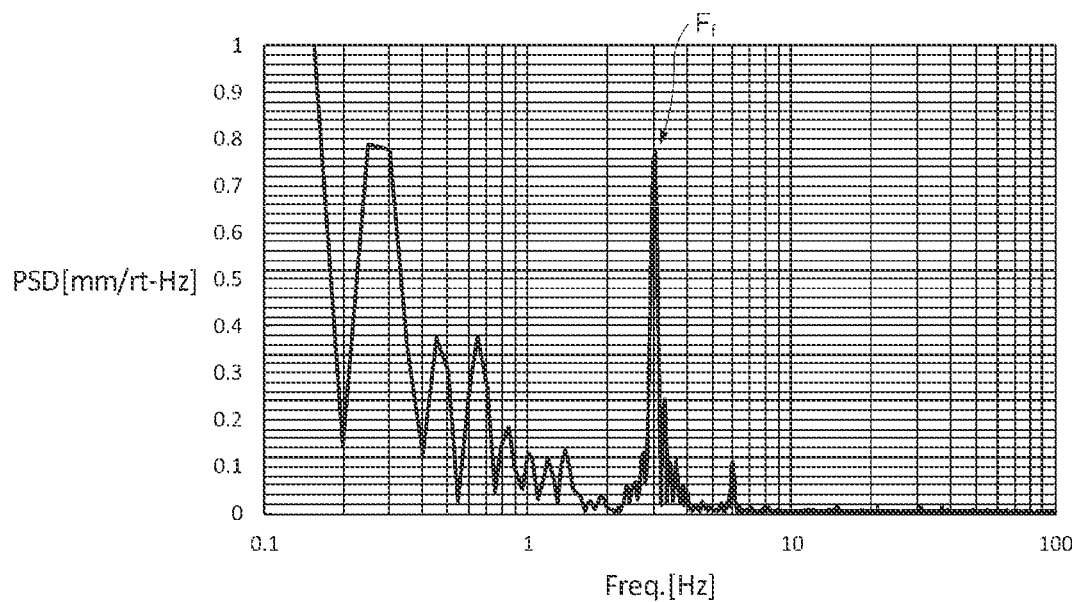
FIG. 14 is a diagram showing a power spectrum density of the target data $U(k)$.

Specifically, first, the measurement device 1 calculates a power spectrum density by performing fast Fourier transform processing on the target data U(k), and calculates a peak of the power spectrum density as the fundamental frequency $F_f$. FIG. 14 shows the power spectrum density obtained by performing fast Fourier transform processing on the target data U(k) of FIG. 13. In the example of FIG. 14, the fundamental frequency $F_f$ is calculated at about 3 Hz. Then, the measurement device 1 calculates a basic cycle $T_f$ based on the fundamental frequency $F_f$ according to Equation (21), and calculates a moving average interval $k_{mf}$ adjusted to a time resolution of the data by dividing the basic cycle $T_f$ by ΔT as in Equation (22). The basic cycle $T_f$ is a cycle corresponding to the fundamental frequency $F_f$, and $T_f>2\Delta T$.

$$T_f = \frac{1}{F_f} \quad (21)$$

$$k_{mf} = 2\left\lfloor \frac{T_f}{2\Delta T} \right\rfloor + 1 \quad (22)$$

Figure 15:
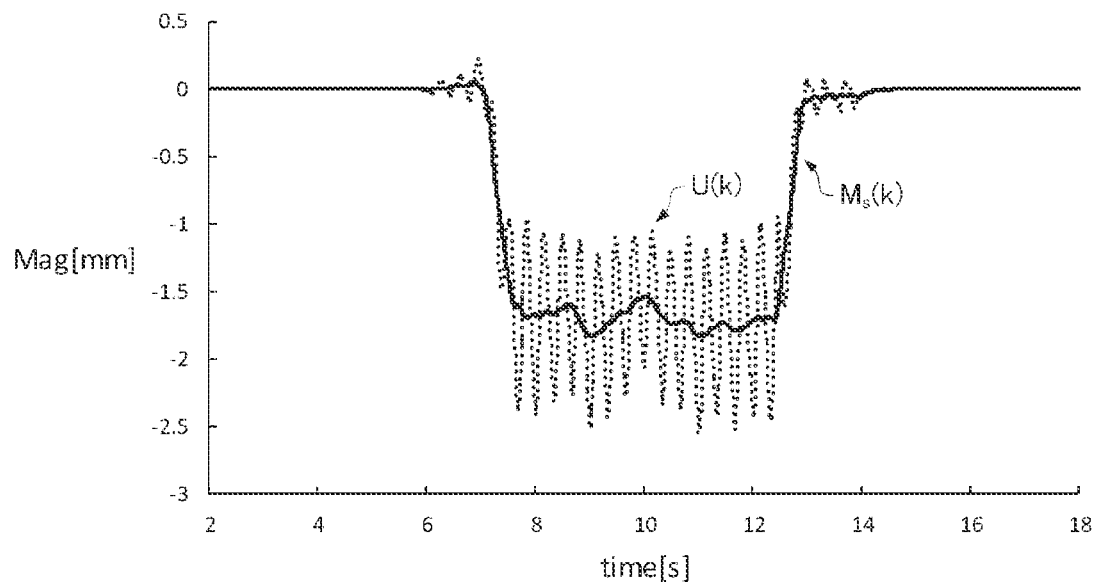
FIG. 15 is a diagram showing an example of the displacement data $M_s(k)$.
Figure 16:
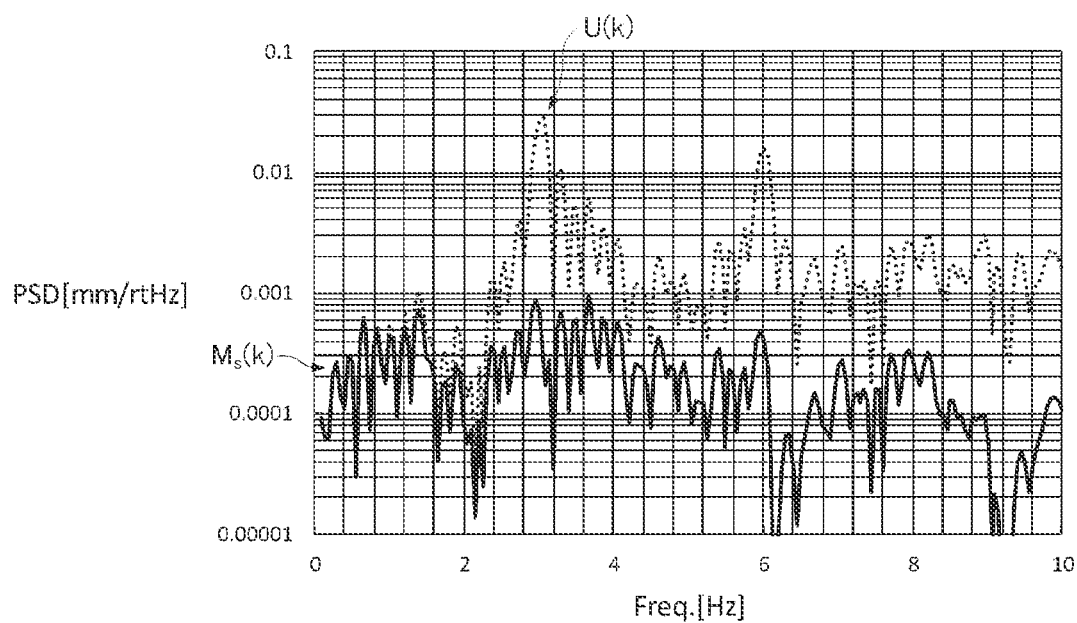
FIG. 16 is a diagram showing a power spectrum density of the displacement data $M_s(k)$.

Then, the measurement device 1 performs, as low-pass filter processing, moving average processing on the target data U(k) in the basic cycle $T_f$ according to Equation (23), and generates the displacement data $M_S(k)$ as vibration component reduction data in which the vibration component included in the signal M(k) is reduced. In the moving average processing, not only the necessary calculation amount is small, but also an attenuation amount of the signal component and the harmonic component of the fundamental frequency $F_f$ is very large, so that the displacement data $M_S(k)$ in which the vibration component is effectively reduced is obtained. FIG. 15 shows an example of the displacement data $M_S(k)$. FIG. 16 shows a power spectrum density of the displacement data $M_S(k)$. As shown in FIGS. 15 and 16, the displacement data $M_S(k)$ from which almost all vibration components included in the target data U(k) are removed is obtained.

$$M_s(k) = \frac{1}{k_{mf}} \sum_{n=k-\frac{k_{mf}-1}{2}}^{k+\frac{k_{mf}-1}{2}} U(n) \quad (23)$$

The measurement device 1 may generate the displacement data $M_s(k)$ by performing, as the low-pass filter processing, FIR filter processing for attenuating a signal component having a frequency equal to or higher than the basic cycle $T_f$ on the target data U(k). The FIR is an abbreviation for finite impulse response. Although the FIR filter processing has a larger calculation amount than the moving average processing, all signal components of a frequency equal to or higher than the fundamental frequency $F_f$ can be attenuated.

Figure 17:
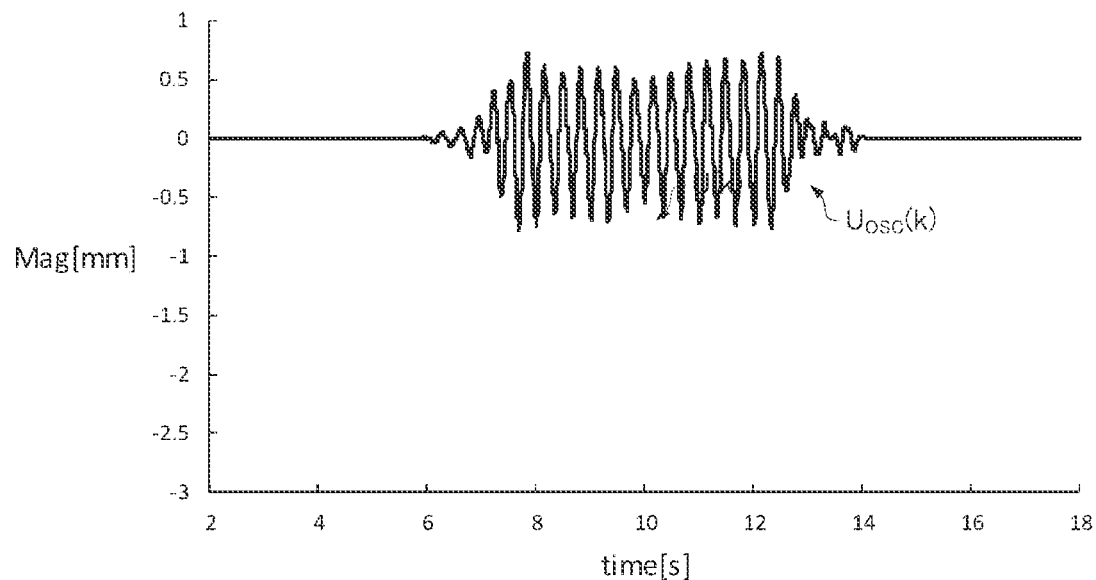
FIG. 17 is a diagram showing an example of vibration component data $U_{OSC}(k)$.

Next, the measurement device 1 subtracts the displacement data $M_S(k)$ in which the vibration component is reduced from the target data U(k) according to Equation (24) to generate vibration component data $U_{OSC}(k)$ including the vibration component. FIG. 17 shows an example of the vibration component data $U_{OSC}(k)$.

$$U_{OSC}(k)=U(k)-M_S(k) \quad (24)$$

Figure 18:
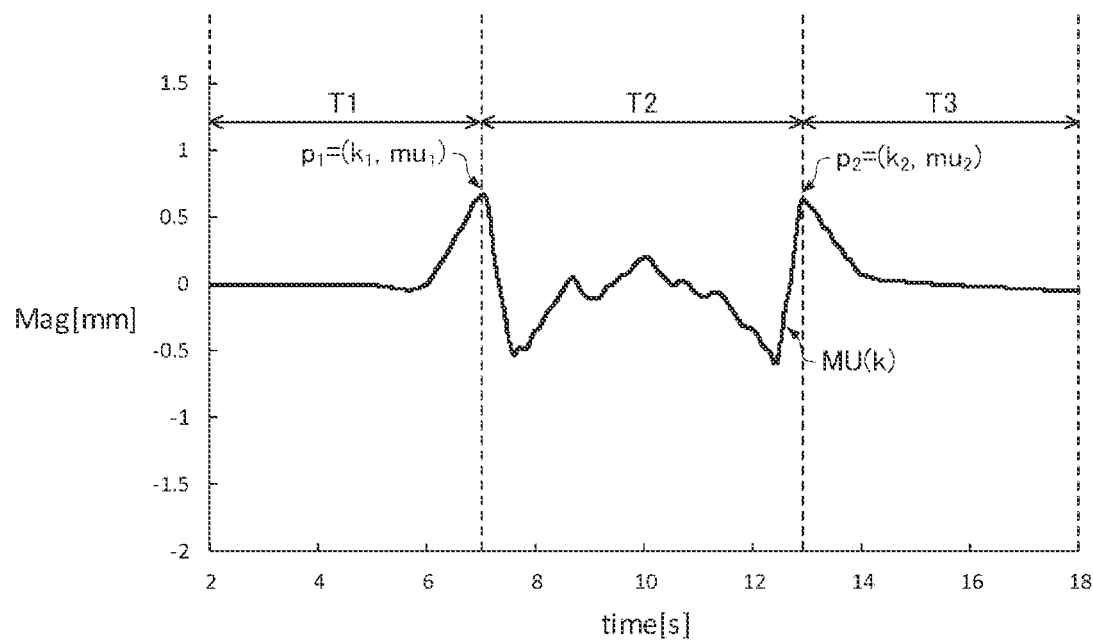
FIG. 18 is a diagram showing an example of displacement data $MU(k)$.

Next, the measurement device 1 generates the displacement data MU(k), that is obtained by performing high-pass filter processing on the displacement data $M_S(k)$ in order to reduce the drift noise, as in Equation (25). FIG. 18 shows an example of the displacement data MU(k).

$$MU(k)=f_{HP}(M_S(k)) \quad (25)$$

Next, based on the displacement data MU(k), the measurement device 1 estimates data $f_{LP}(M(k))$ obtained by performing low-pass filter processing on the signal M(k), that is, correction data $M_{CC}(k)$ corresponding to a difference between the displacement data MU(k) and data obtained by subtracting the drift noise from the displacement data $M_s(k)$.

As shown in FIG. 18, in the present embodiment, the measurement device 1 specifies a first interval T1, a second interval T2, and a third interval T3 based on the displacement data MU(k), and generates the correction data $M_{CC}(k)$ by dividing the correction data $M_{CC}(k)$ into these three intervals. In order to specify the first interval T1, the second interval T2, and the third interval T3, the measurement device 1 calculates a first peak $p_1=(k_1, mu_1)$, and a second peak $p_2=(k_2, mu_2)$ of the displacement data MU(k). As shown in FIG. 18, the first peak $p_1$ is a head peak near a time point when the railway vehicle 6 enters the superstructure 7, and the second peak $p_2$ is a tail peak near a time point when the railway vehicle 6 exits the superstructure 7. The first interval T1 is an interval before the first peak $p_1$, that is, an interval of $k \leq k_1$. The second interval T2 is an interval between the first peak $p_1$ and the second peak $p_2$, that is, an interval of $k_1 < k < k_2$. The third interval T3 is an interval after the second peak $p_2$, that is, an interval of $k_2 \leq k$.

As shown in Equation (26), the correction data $M_{CC}(k)$ is obtained as a sum of first interval correction data $M_{CC1}(k)$ which is the correction data of the first interval T1, second interval correction data $M_{CC2}(k)$ which is the correction data of the second interval T2, and third interval correction data $M_{CC3}(k)$ which is the correction data of the third interval T3.

$$M_{CC}(k)=M_{CC1}(k)+M_{CC2}(k)+M_{CC3}(k) \quad (26)$$

Figure 19:
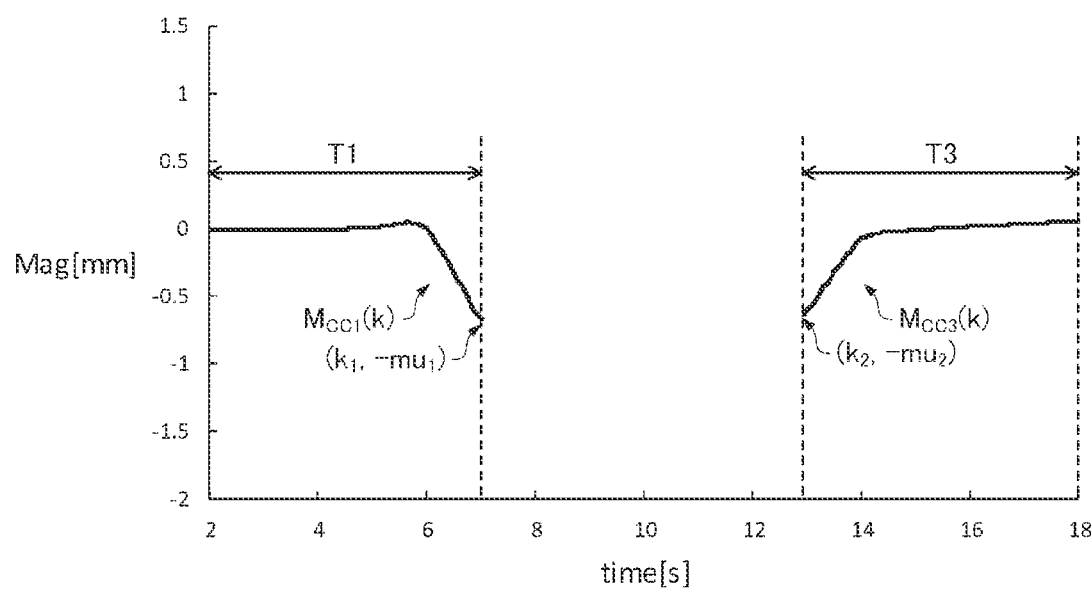
FIG. 19 is a diagram showing an example of first interval correction data $M_{CC1}(k)$ and third interval correction data $M_{CC3}(k)$.

The first interval correction data $M_{CC1}(k)$ is obtained according to Equation (27) using data MU'(k) obtained by inverting a sign of the displacement data MU(k). Similarly, the third interval correction data $M_{CC3}(k)$ is obtained according to Equation (28) using the data MU'(k) obtained by inverting the sign of the displacement data MU(k). FIG. 19 shows an example of the first interval correction data $M_{CC1}(k)$ and the third interval correction data $M_{CC3}(k)$.

$$M_{CC1}(k) = \begin{cases} k \leq k_1 & MU'(k) \\ k_1 < k & 0 \end{cases} = \begin{cases} k \leq k_1 & -MU(k) \\ k_1 < k & 0 \end{cases} \quad (27)$$

$$M_{CC3}(k) = \begin{cases} k < k_2 & 0 \\ k_2 \leq k & MU'(k) \end{cases} = \begin{cases} k < k_2 & 0 \\ k_2 \leq k & -MU(k) \end{cases} \quad (28)$$

The second interval correction data $M_{CC1}(k)$ is obtained as follows. First, the measurement device 1 generates first line data L1(k) linearly approximating the first interval correction data $M_{CC1}(k)$ smaller than a product $-mu_1 c_{TH}$ of a first coefficient $c_{TH}$ and a value $-mu_1$ obtained by inverting a sign of an amplitude $mu_1$ of the first peak $p_1=(k_1, mu_1)$. Here, since an optimum value of the first coefficient $c_{TH}$ varies depending on the superstructure 7, the structure of the railway vehicle 6, and the like, the first coefficient $c_{TH}$ is determined in advance in a range of $0<c_{TH}<1$ by performing evaluation before measurement, for example.

The first line data $L1(k)$ linearly approximating the first interval correction data $M_{CC1}(k)$ from $k=k_a$ to $k_1$ with respect to ka satisfying Equation (29) is represented by Equation (30).

$$M_{CC1}(k_a) \cong -mu_1 c_{Th} \quad (29)$$

$$L1(k)=s_1 k+i_1 \quad (30)$$

In Equation (30), the coefficients $s_1$ and $i_1$ that minimize an error between the first line data $L1(k)$ and the first interval correction data $M_{CC1}(k)$ are obtained by Equations (31) and (32) using a least-squares method.

$$s_1 \frac{\sum_{k=k_a}^{k_1} 1 \sum_{k=k_a}^{k_1} k M_{CC1}(k) - \sum_{k=k_a}^{k_1} k \sum_{k=k_a}^{k_1} M_{CC1}(k)}{\sum_{k=k_a}^{k_1} 1 \sum_{k=k_a}^{k_1} k^2 - \sum_{k=k_a}^{k_1} k \sum_{k=k_a}^{k_1} k} \quad (31)$$

$$i_1 \frac{\sum_{k=k_a}^{k_1} M_{CC1}(k) - s_1 \sum_{k=k_a}^{k_1} k}{\sum_{k=k_a}^{k_1} 1} \quad (32)$$

Similarly, the measurement device 1 generates third line data $L3(k)$ linearly approximating the third interval correction data $M_{CC3}(k)$ smaller than a product $-mu_2 c_{TH}$ of a first coefficient $c_{TH}$ and a value $-mu_2$ obtained by inverting a sign of an amplitude $mu_2$ of the second peak $p_2=(k_2, mu_2)$. For example, it is assumed that the third line data $L3(k)$ linearly approximating the third interval correction data $M_{CC3}(k)$ from $k=k_2$ to $k_b$ with respect to kb satisfying Equation (33) is represented by Equation (34).

$$M_{CC3}(k_b) \cong -mu_2 c_{Th} \quad (33)$$

$$L3(k)=s_3 k+i_3 \quad (34)$$

In Equation (34), the coefficients $s_3$ and $i_3$ that minimize an error between the third line data $L3(k)$ and the third interval correction data $M_{CC3}(k)$ are obtained by Equations (35) and (36) using the least-squares method.

$$s_3 \frac{\sum_{k=k_2}^{k_b} 1 \sum_{k=k_2}^{k_b} k M_{CC3}(k) - \sum_{k=k_2}^{k_b} k \sum_{k=k_2}^{k_b} M_{CC3}(k)}{\sum_{k=k_2}^{k_b} 1 \sum_{k=k_2}^{k_b} k^2 - \sum_{k=k_2}^{k_b} k \sum_{k=k_2}^{k_b} k} \quad (35)$$

$$i_1 \frac{\sum_{k=k_b}^{k_b} M_{CC3}(k) - s_3 \sum_{k=k_a}^{k_b} k}{\sum_{k=k_a}^{k_b} 1} \quad (36)$$

$$M_d(k)=M(k)+e(k) \quad (36)$$

Figure 20:
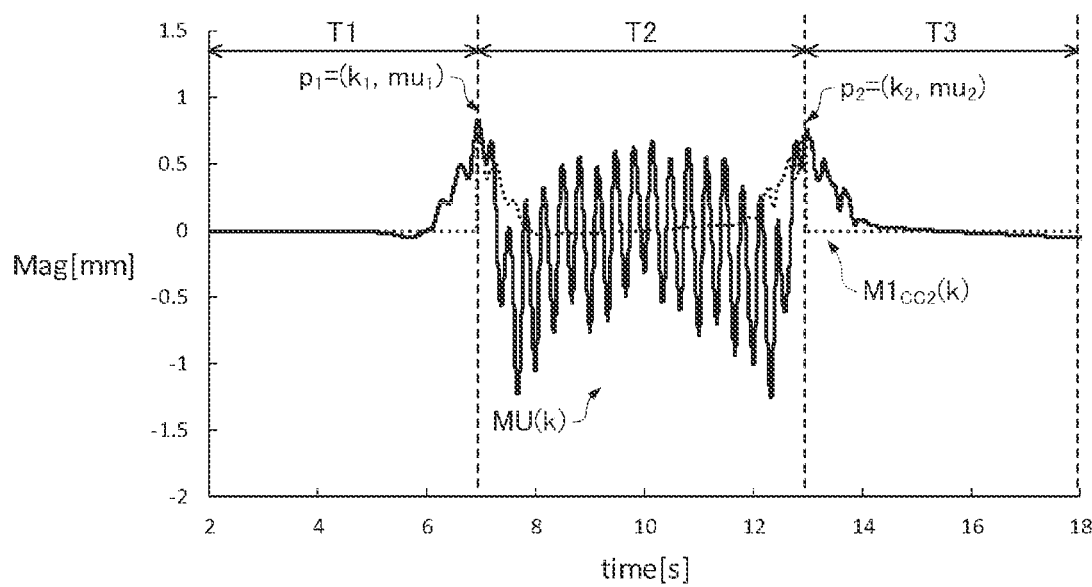
FIG. 20 is a diagram showing an example of first line data $L1(k)$ and third line data $L3(k)$.

FIG. 20 shows an example of the first line data $L1(k)$ and the third line data $L3(k)$.

Figure 21:
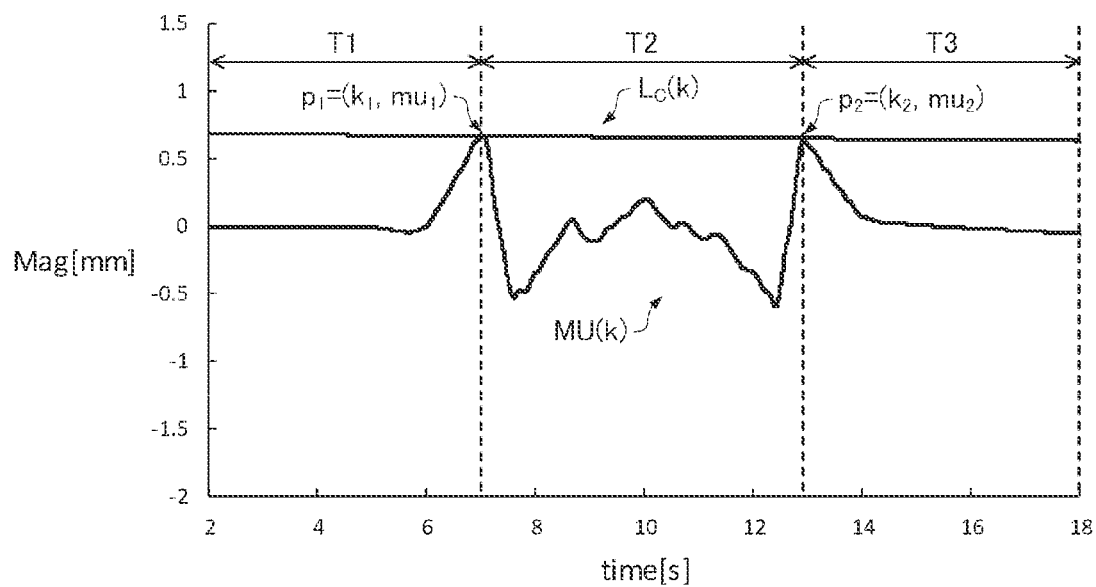
FIG. 21 is a diagram showing an example of a line $L_C(k)$.

Next, the measurement device 1 generates second line data $L2(k)=c_L L_C(k)$ obtained by multiplying a line $L_C(k)$ passing through the first peak $p_1=(k_1, mu_1)$ and the second peak $p_2=(k_2, mu_2)$ by the second coefficient $c_L$. The line $L_C(k)$ passing through the first peak $p_1=(k_1, mu_1)$ and the second peak $p_2=(k_2, mu_2)$ is obtained by Equation (37). FIG. 21 shows an example of the line $L_C(k)$.

$$L_C(k) = \frac{mu_1 - mu_2}{k_1 - k_2} k + mu_1 - \frac{mu_1 - mu_2}{k_1 - k_2} k_1 \quad (37)$$

The second line data $L2(k)$ obtained by multiplying the line $L_C(k)$ by the second coefficient $c_L$ is represented by Equation (38).

$$L2(k)=s_2 k+i_2=c_L L_C(k) \quad (38)$$

When the amplitude of the displacement data $M_s(k)$ changes more gently than the unit pulse waveform, the amplitude B of the data $f_{LP}(M_s(k))$ obtained by performing low-pass filter processing on the displacement data $M_s(k)$ tends to be larger than the amplitude A of $k=k-a$ of the data $f_{HP}(M_s(k))$ obtained by performing high-pass filter processing on the displacement data $M_s(k)$. Therefore, instead of $-2$ which is an amplitude coefficient in the high-pass filter processing of the unit pulse waveform, the second coefficient $c_L$ including this correction is provided. Here, since an optimum value of the second coefficient $c_L$ varies depending on the superstructure 7, the structure of the railway vehicle 6, and the like, the second coefficient $c_L$ is determined in advance in a range of $-4<c_L \leq -2$ by performing evaluation before measurement, for example.

Next, the measurement device 1 calculates a first intersection point $p_3$ between the first line data $L1(k)$ and the second line data $L2(k)$ and a second intersection point $p_4$ between the second line data $L2(k)$ and the third line data $L3(k)$.

The first intersection point $p_3$ is obtained by Equation (40) based on Equation (39).

$$L1(k)-L2(k)=s_1 k+i_2-(s_2 k+i_2) \quad (39)$$

$$p_3 = (k_3, mu_3) = \left( \frac{i_2 - i_1}{s_1 - s_2}, s_1 \frac{i_2 - i_1}{s_1 - s_2} + i_1 \right) \quad (40)$$

The second intersection point $p_4$ is obtained by Equation (42) based on Equation (41).

$$L2(k)-L3(k)=s_2 k+i_2-(s_3 k+i_3)=0 \quad (41)$$

$$p_4 = (k_4, mu_4) = \left( \frac{i_3 - i_2}{s_2 - s_3}, s_2 \frac{i_3 - i_2}{s_2 - s_3} + i_2 \right) \quad (42)$$

Figure 22:
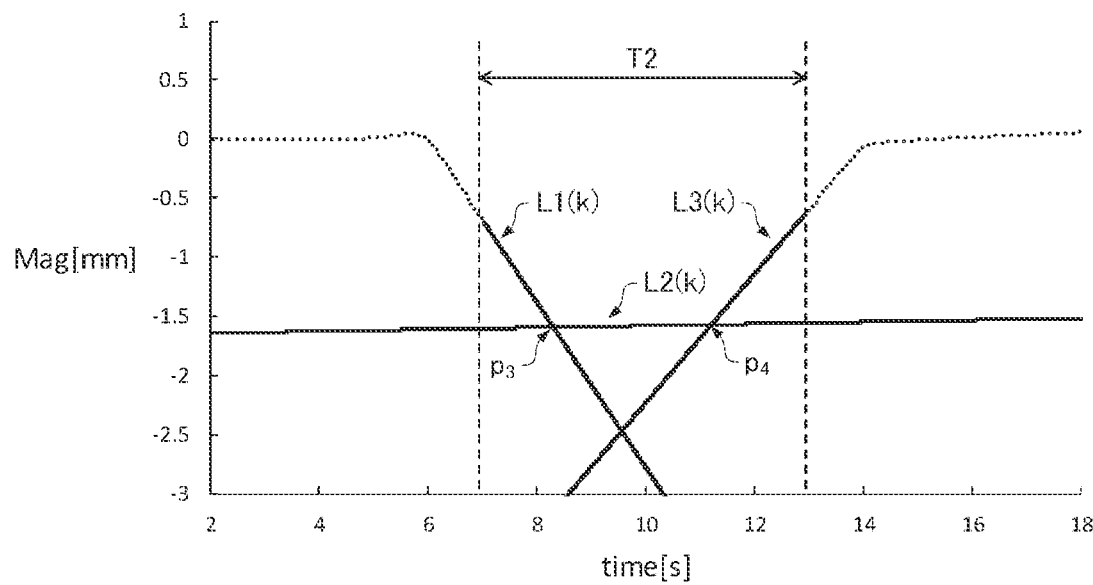
FIG. 22 is a diagram showing a relationship of the first line data $L1(k)$, the second line data $L2(k)$, the third line data $L3(k)$, a first intersection point $p_3$ and a second intersection point $p_4$.

FIG. 22 is a diagram showing a relationship of the first line data $L1(k)$, the second line data $L2(k)$, the third line data $L3(k)$, the first intersection point $p_3$ and the second intersection point $p_4$.

Figure 23:
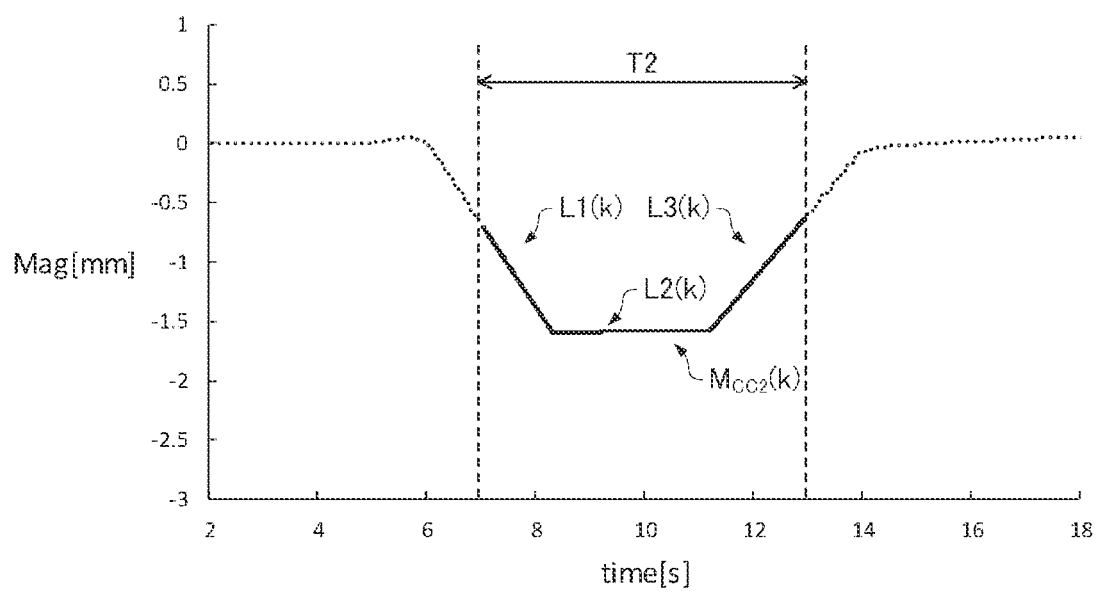
FIG. 23 is a diagram showing an example of second interval correction data $M_{CC2}(k)$.

Then, as in Equation (43), the measurement device 1 generates the second interval correction data $M_{CC2}(k)$ in the second interval T2 by using data before the first intersection point $p_3$ as the first line data $L1(k)$, data from the first intersection point $p_3$ to the second intersection point $p_4$ as the second line data $L2(k)$, and data after the second intersection point $p_4$ as the third line data $L3(k)$. FIG. 23 shows an example of the second interval correction data $M_{CC2}(k)$.

$$M_{CC2}(k) = \begin{cases} k_1 < k < k_3 & L1(k) \\ k_3 \leq k \leq k_4 & L2(k) \\ k_4 < k < k_2 & L3(k) \end{cases} \quad (43)$$

Figure 24:
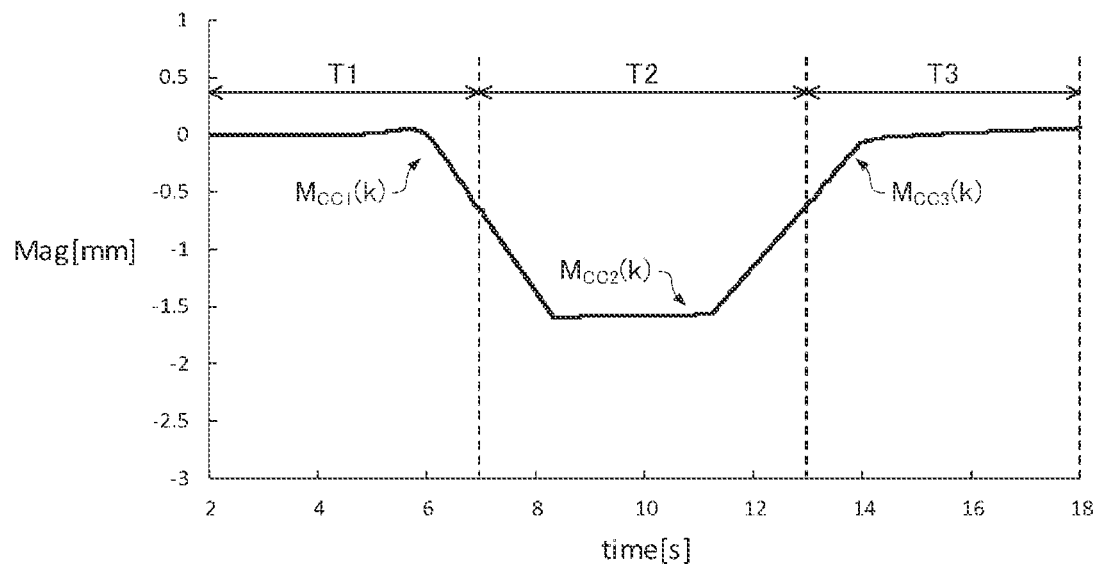
FIG. 24 is a diagram showing an example of correction data $M_{CC}(k)$.

The correction data $M_{CC}(k)$ is obtained as in Equation (44) by substituting Equation (26), Equation (27), Equation (28), and Equation (43) into Equation (44). FIG. 24 shows an example of the correction data $M_{CC}(k)$.

$$M_{CC}(k) = M_{CC1}(k) + M_{CC2}(k) + M_{CC3}(k) = \begin{cases} k \leq k_1 & -MU(k) \\ k_1 < k < k_3 & L1(k) \\ k_3 \leq k \leq k_4 & L2(k) \\ k_4 < k < k_2 & L3(k) \\ k_2 \leq k & -MU(k) \end{cases} \quad (44)$$

Then, as in Equation (45), the displacement data $MU(k)$ and the correction data $M_{CC}(k)$ are added to obtain the displacement data $RU(k)$ in which the vibration component and the drift noise are reduced.

$$RU(k) = MU(k) + M_{CC}(k) \quad (45)$$

Equation (46) is obtained by substituting Equation (44) into Equation (45).

$$RU(k) = \begin{cases} k \leq k_1 & 0 \\ k_1 < k < k_3 & MU(k) + L1(k) \\ k_3 \leq k \leq k_4 & MU(k) + L2(k) \\ k_4 < k < k_2 & MU(k) + L3(k) \\ k_2 \leq k & 0 \end{cases} \quad (46)$$

Equation (46) is transformed into Equation (47).

$$RU(k) = \begin{cases} k \leq k_1 & 0 \\ k_1 < k < k_3 & MU(k) + M_{CC}(k) \\ k_2 \leq k & 0 \end{cases} \quad (47)$$

Figure 25:
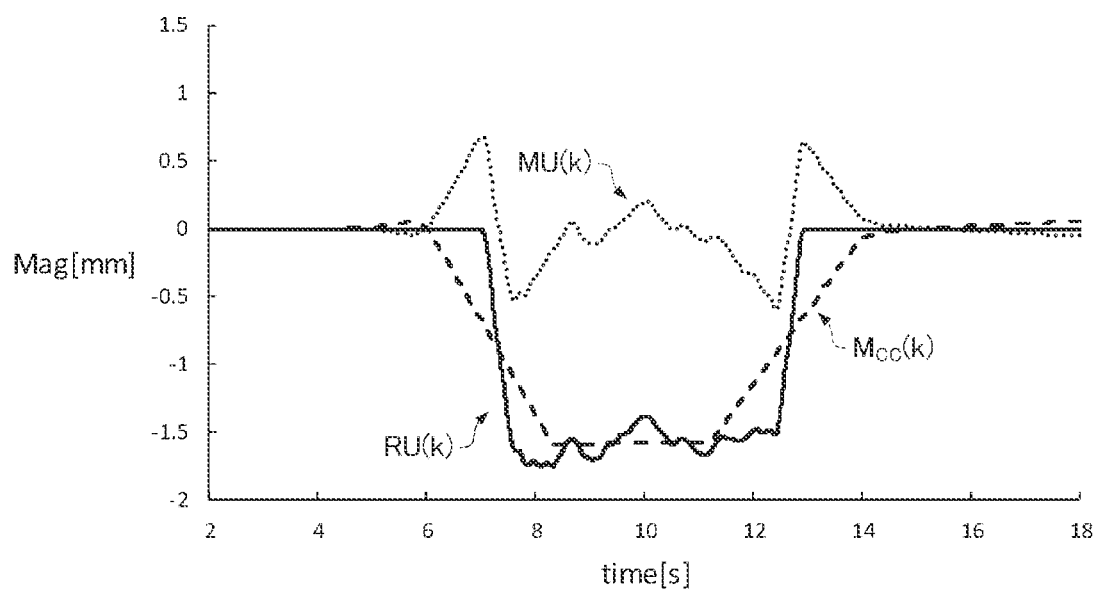
FIG. 25 is a diagram showing an example of displacement data $RU(k)$.

According to Equation (47), the displacement data $RU(k)$ is 0 in the interval of $k \leq k_1$ which is the first interval T1 and the interval of $k_2 \leq k$ which is the third interval T3, and the displacement data $RU(k)$ in which the vibration component and the drift noise is removed is obtained. FIG. 25 shows an example of the displacement data $RU(k)$.

Figure 26:
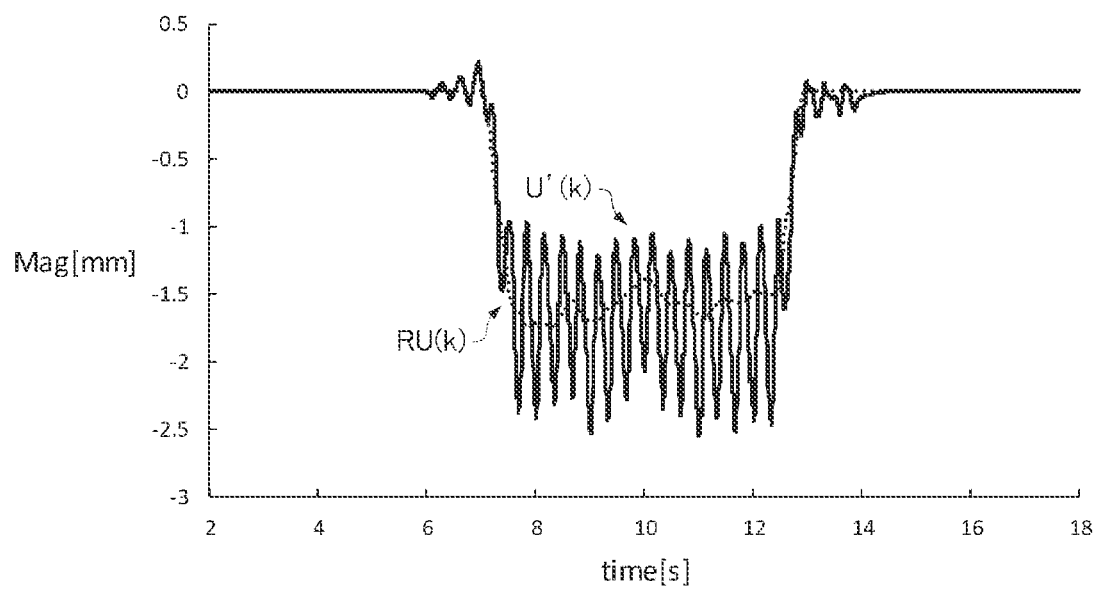
FIG. 26 is a diagram showing an example of measurement data $U'(k)$.

Then, as in Equation (48), the displacement data $RU(k)$ and the vibration component data $U_{OSC}(k)$ are added to obtain the measurement data $U'(k)$ which is the displacement data in which the drift noise is reduced. FIG. 26 shows an example of the measurement data $U'(k)$.

$$U'(k) = MU(k) + M_{CC}(k) + U_{OSC}(k) = RU(k) + U_{OSC}(k) \quad (48)$$

Equation (49) is obtained by substituting Equation (47) into Equation (48).

$$U'(k) = \begin{cases} k \leq k_1 & U_{osc}(k) \\ k_1 < k < k_2 & MU(k) + M_{CC}(k) + U_{osc}(k) \\ k_2 \leq k & U_{osc}(k) \end{cases} \quad (49)$$

Figure 27:
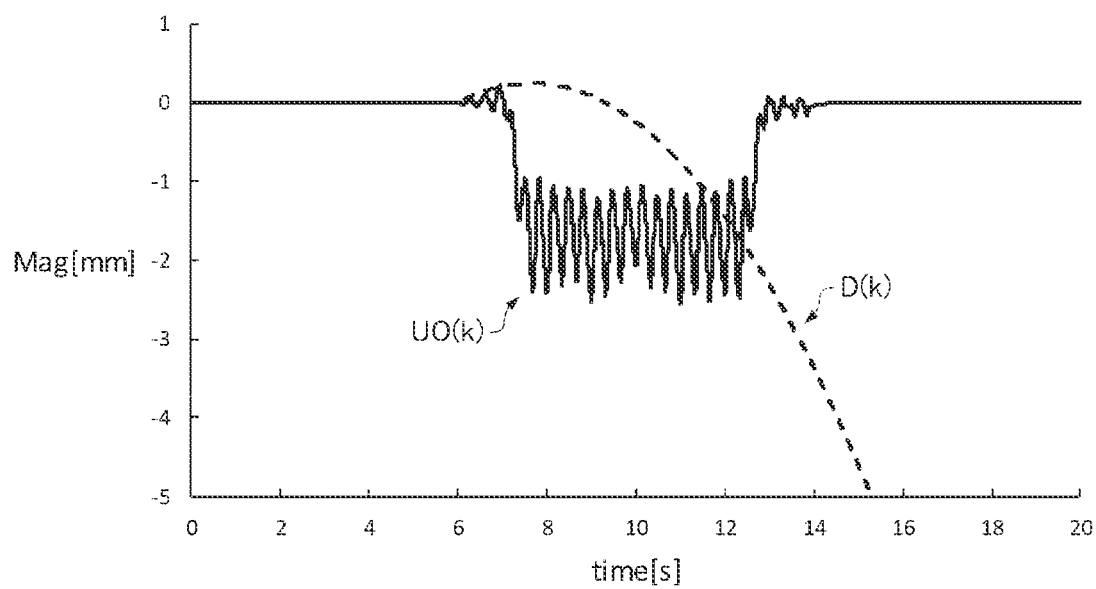
FIG. 27 is a diagram showing an example of displacement waveform $UO(k)$ and a drift noise $D(k)$.
Figure 28:
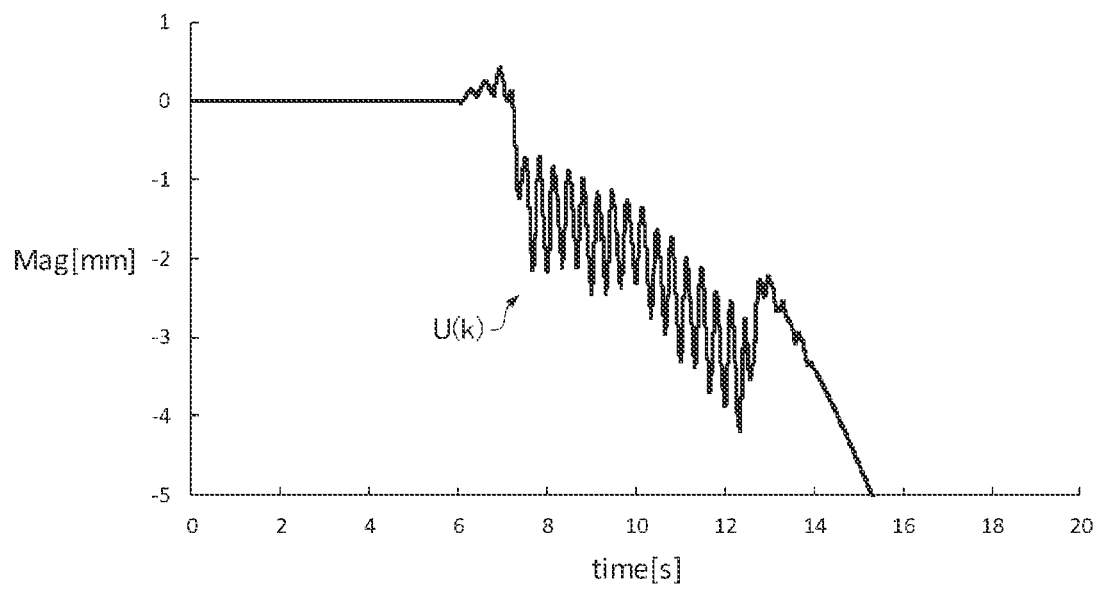
FIG. 28 is a diagram showing an example of the target data $U(k)$.

In order to confirm an effect of removing the drift noise by the measurement method of the present embodiment, a waveform obtained by adding the drift noise $D(k)$ to a displacement waveform $UO(k)$ as in Equation (50) is used as the target data $U(k)$. FIG. 27 shows an example of the displacement waveform $UO(k)$ and the drift noise $D(k)$. FIG. 28 shows an example of the target data $U(k)$.

$$U(k) = UO(k) + D(k) \quad (50)$$

Figure 29:
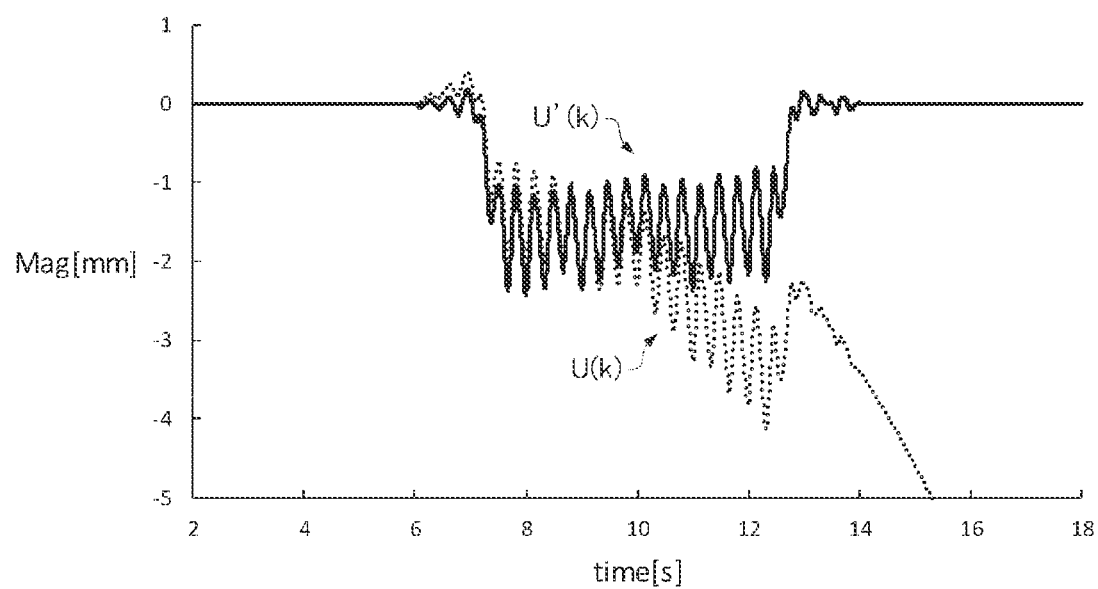
FIG. 29 is a diagram showing the measurement data $U'(k)$.
Figure 30:
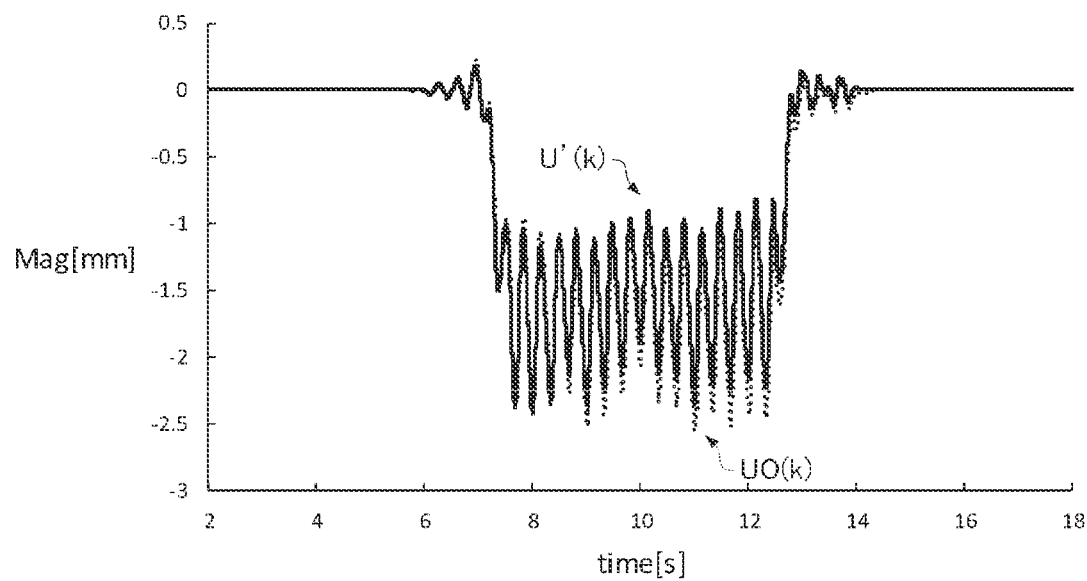
FIG. 30 is a diagram showing the measurement data $U'(k)$ and the displacement waveform $UO(k)$ in an overlapping manner.

The measurement data $U'(k)$ obtained by Equations (21) to (49) and the displacement waveform $UO(k)$ are compared with the target data $U(k)$. FIG. 29 shows the measurement data $U'(k)$. FIG. 30 shows the measurement data $U'(k)$ and the displacement waveform $UO(k)$ in an overlapping manner. As shown in FIGS. 29 and 30, it can be confirmed that the measurement data $U'(k)$ in which the drift noise is removed and the displacement waveform is restored is obtained by the measurement method according to the present embodiment.

1-4. Procedure of Measurement Method

Figure 31:
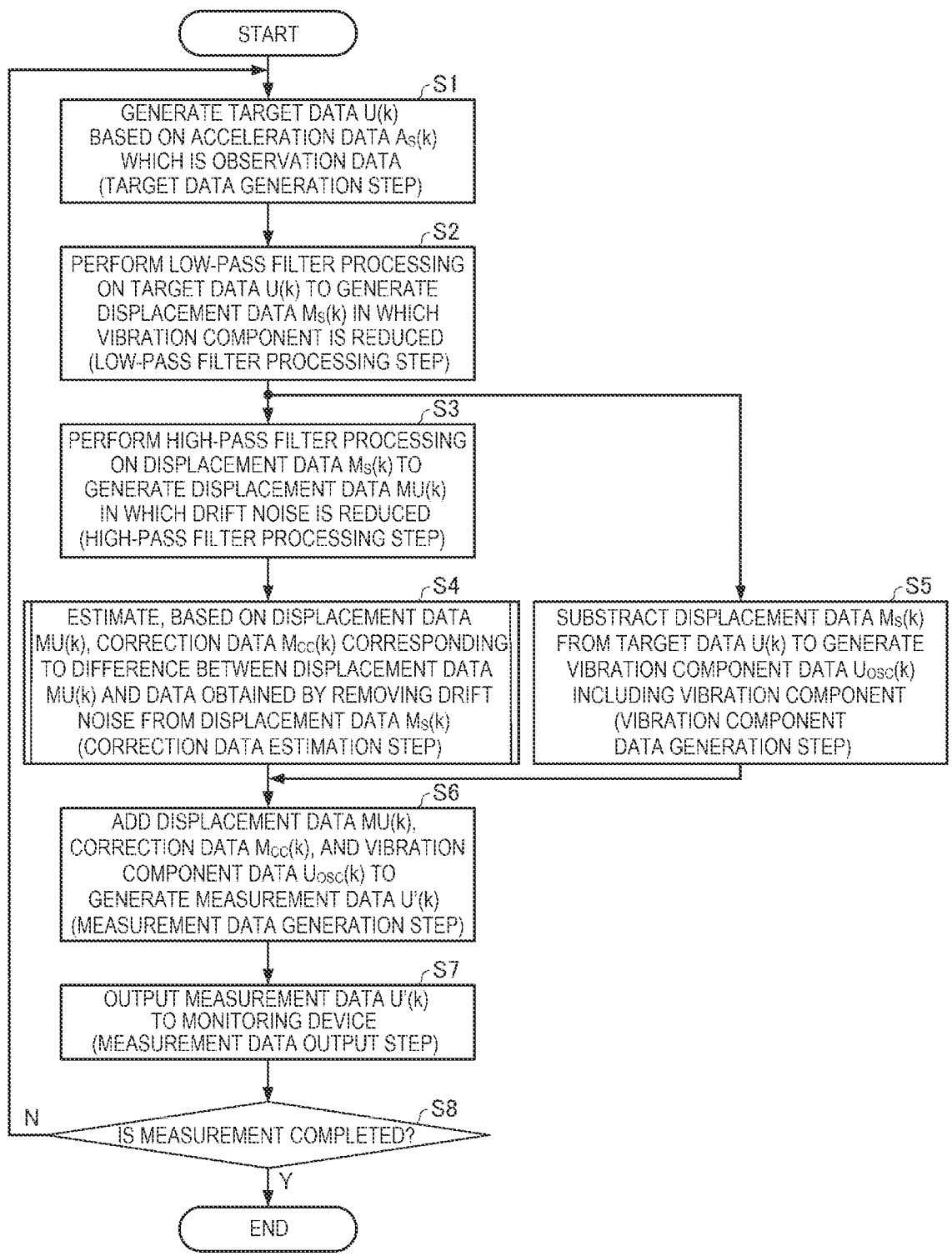
FIG. 31 is a flowchart showing an example of a procedure of a measurement method according to a first embodiment.

FIG. 31 is a flowchart showing an example of a procedure of the measurement method of the first embodiment for measuring the displacement of the superstructure 7 of the bridge 5. In the present embodiment, the measurement device 31 executes the procedure shown in FIG. 31.

As shown in FIG. 31, first, in a target data generation step S1, the measurement device 1 acquires the acceleration data $A_s(k)$ which is observation data, and generates the target data $U(k)$. Therefore, the target data $U(k)$ is data based on the acceleration data $A_s(k)$ which is observation data observed by the sensor 2 which is the observation device. Specifically, the measurement device 1 generates the target data $U(k)$ by performing calculations of Equations (19) and (20). In the present embodiment, the target data $U(k)$ to be processed is data of the displacement of the superstructure 7 caused by the railway vehicle 6 which is a moving object moving on the superstructure 7 which is a structure, and is data obtained by integrating twice the acceleration in the direction intersecting the surface of the superstructure 7 on which the railway vehicle 6 moves. Therefore, the target data $U(k)$ includes data of a waveform that projects in the positive direction or the negative direction, specifically, a rectangular waveform, a trapezoidal waveform, or a sine half-wave waveform. The rectangular waveform includes not only an accurate rectangular waveform but also a waveform approximate to the rectangular waveform. Similarly, the trapezoidal waveform includes not only an accurate trapezoidal waveform but also a waveform approximate to the trapezoidal waveform. Similarly, the sine half-wave waveform includes not only an accurate sine half-wave waveform but also a waveform approximate to the sine half-wave waveform.

Next, in a low-pass filter processing step S2, the measurement device 1 performs low-pass filter processing on the target data $U(k)$ including the drift noise and the vibration component and generated in step S1 to generate the displacement data $M_s(k)$ as vibration component reduction data in which the vibration component is reduced. For example, the measurement device 1 may calculate the fundamental frequency $F_f$ by performing fast Fourier transform processing on the target data $U(k)$, and may generate the displacement data $M_s(k)$ by performing moving average processing, as the low-pass filter processing, on the target data $U(k)$ in the basic cycle $T_f$ corresponding to the fundamental frequency $F_f$, as in Equation (23). For example, the measurement device 1 may calculate the fundamental frequency $F_f$ by performing fast Fourier transform processing on the target data $U(k)$, and may generate the displacement data $M_s(k)$ by performing FIR filter processing, as the low-pass filter processing, for attenuating a signal component having a frequency equal to or higher than the fundamental frequency $F_f$ on the target data $U(k)$.

Next, in a high-pass filter processing step S3, the measurement device 1 performs high-pass filter processing on the displacement data $M_s(k)$ including the drift noise and generated in step S2, so as to generate the displacement data $MU(k)$ as drift noise reduction data in which the drift noise is reduced, as in Equation (25). The high-pass filter processing of the displacement data $M_s(k)$ may be processing of subtracting data, that is obtained by performing low-pass filter processing on the displacement data $M_s(k)$, from the displacement data $M_s(k)$. The low-pass filter processing may be moving average processing or FIR filter processing. That is, the high-pass filter processing of the displacement data $M_s(k)$ may be processing of subtracting data, that is obtained by performing moving average processing or FIR filter processing on the displacement data $M_s(k)$, from the displacement data $M_s(k)$.

Next, in a correction data estimation step S4, the measurement device 1 estimates, based on the displacement data MU(k) generated in step S3, the correction data $M_{CC}(k)$ corresponding to the difference between the displacement data MU(k) and the data obtained by removing the drift noise from the displacement data $M_s(k)$. Specifically, the measurement device 1 generates the correction data $M_{CC}(k)$ by performing calculations of Equations (26) to (44).

In a vibration component data generation step S5, the measurement device 1 subtracts the displacement data $M_s(k)$ generated in step S2 from the target data U(k) generated in step S1, so as to generate the vibration component data $U_{OSC}(k)$ including the vibration component, as in Equation (24). In the present embodiment, a frequency of the drift noise included in the target data U(k) is lower than a minimum value of the natural vibration frequency of the superstructure 7. The minimum value of the natural vibration frequency of the superstructure 7 is, for example, a frequency of the superstructure 7 of a first-order vibration mode in the longitudinal direction. By setting the cutoff frequency of low-pass filter processing in step S2 and the cutoff frequency of high-pass filter processing in step S3 to be higher than the frequency of the drift noise of the superstructure 7 and lower than the minimum value of the natural vibration frequency, the drift noise in the vibration component data $U_{OSC}(k)$ generated in step S5 is reduced without reducing the signal component and the harmonic component of the natural vibration frequency of the superstructure 7. For example, the frequency of the drift noise may be less than 1 Hz, and the cutoff frequency of the low-pass filter processing and the cutoff frequency of the high-pass filter processing may be 1 Hz or more.

Next, in a measurement data generation step S6, the measurement device 1 generates the measurement data U'(k) by adding the displacement data MU(k) generated in step S3, the correction data $M_{CC}(k)$ generated in step S4, and the vibration component data $U_{OSC}(k)$ generated in step S5, as in Equations (45) and (48).

Next, in a measurement data output step S7, the measurement device 1 outputs the measurement data U'(k) generated in step S6 to the monitoring device 3. Specifically, the measurement device 1 transmits the measurement data U'(k) to the monitoring device 3 via the communication network 4.

Then, in step S8, the measurement device 1 repeats the processing of steps S1 to S7 until the measurement of the displacement of the superstructure 7 of the bridge 5 is completed.

Figure 32:
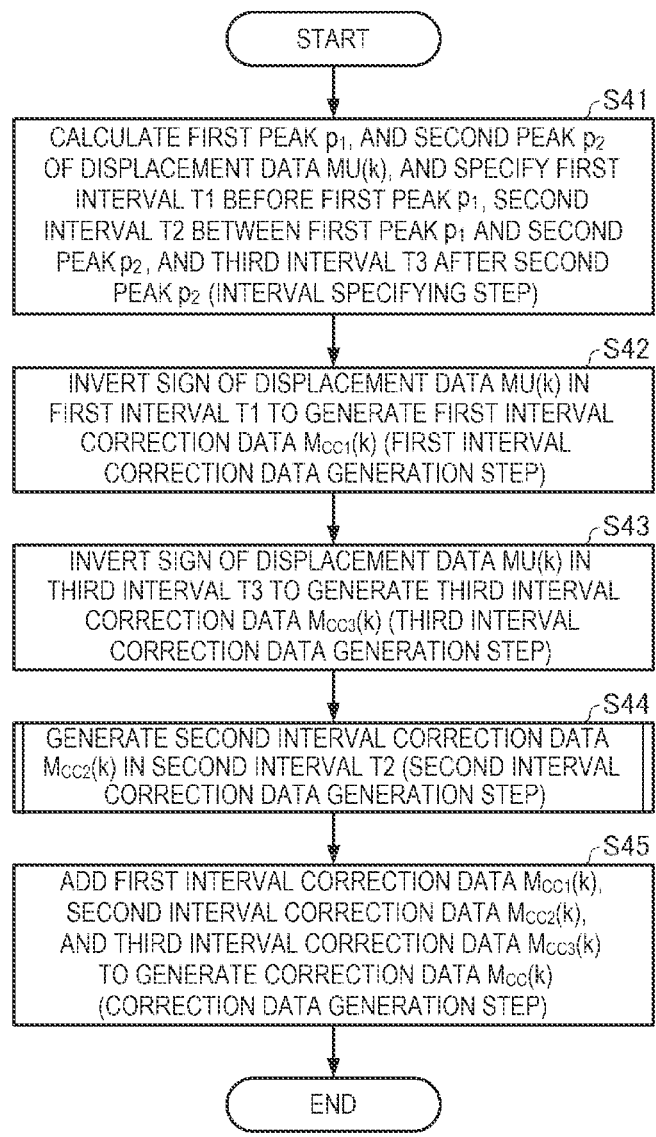
FIG. 32 is a flowchart showing an example of a procedure of a correction data estimation step in the first embodiment.

FIG. 32 is a flowchart showing an example of a procedure of the correction data estimation step S4 in FIG. 31.

As shown in FIG. 32, first, in an interval specifying step S41, the measurement device 1 calculates a first peak $p_1=(k_1, mu_1)$, and a second peak $p_2=(k_2, mu_2)$ of the displacement data MU(k), and specifies a first interval T1 before the first peak $p_1$, a second interval T2 between the first peak $p_1$ and the second peak $p_2$, and a third interval T3 after the second peak $p_2$. That is, the first interval T1 is an interval of $k \leq k_1$, the second interval T2 is an interval of $k_1 < k < k_2$, and the third interval T3 is an interval of $k_2 \leq k$. In the present embodiment, the first peak $p_1$ is the head peak near the time point when the railway vehicle 6 enters the superstructure 7, and the second peak $p_2$ is the tail peak near the time point when the railway vehicle 6 exits the superstructure 7.

Next, in a first interval correction data generation step S42, the measurement device 1 inverts the sign of the displacement data MU(k) in the first interval T1 to generate the first interval correction data $M_{CC1}(k)$, as in Equation (27).

Next, in a third interval correction data generation step S43, the measurement device 1 inverts the sign of the displacement data MU(k) in the third interval T3 to generate the third interval correction data $M_{CC3}(k)$, as in Equation (28).

Next, in a second interval correction data generation step S44, the measurement device 1 generates the second interval correction data $M_{CC2}(k)$ in the second interval T2.

Finally, in a correction data generation step S45, the measurement device 1 adds the first interval correction data $M_{CC1}(k)$ generated in step S42, the second interval correction data $M_{CC2}(k)$ generated in step S44, and the third interval correction data $M_{CC3}(k)$ generated in step S43 to generate the correction data $M_{CC}(k)$, as in Equation (26).

Figure 33:
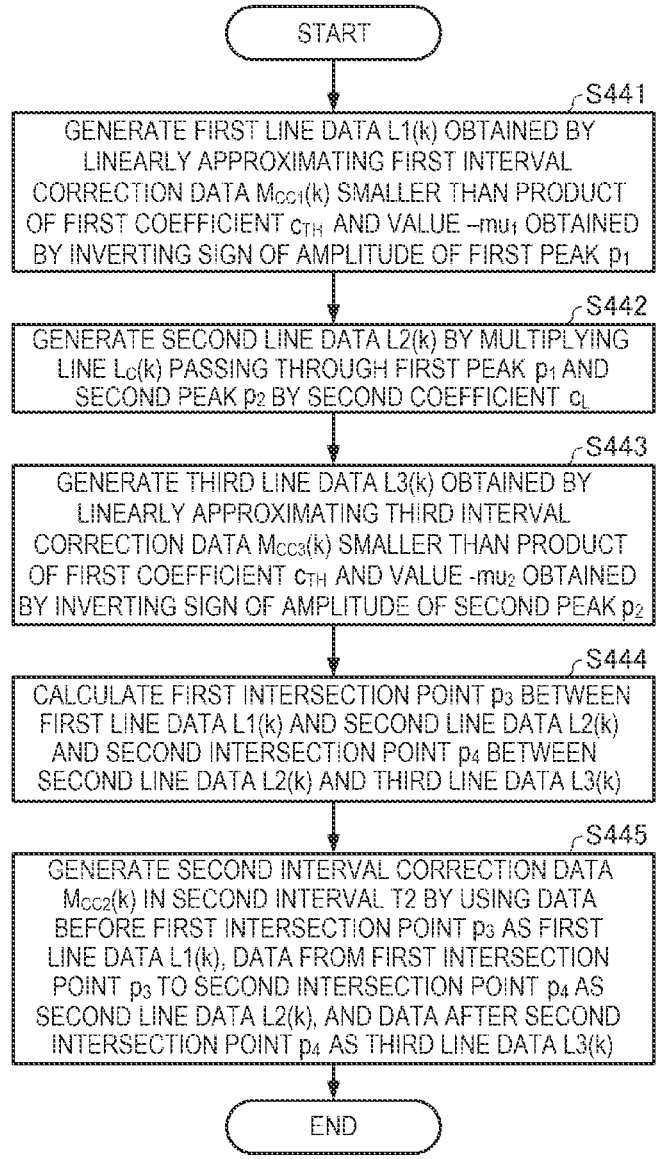
FIG. 33 is a flowchart showing an example of a procedure of a second interval correction data generation step.

FIG. 33 is a flowchart showing an example of a procedure of the second interval correction data generation step S44 in FIG. 32.

As shown in FIG. 32, in step S441, first, according to Equation (30), Equation (31), and Equation (32), the measurement device 1 generates the first line data L1($k$) linearly approximating the first interval correction data $M_{CC1}(k)$ smaller than the product $-mu_1 c_{TH}$ of the first coefficient $c_{TH}$ and the value $-mu_1$ obtained by inverting the sign of the amplitude $mu_1$ of the first peak $p_1=(k_1, mu_1)$. Here, the first coefficient $c_{TH}$ is larger than 0 and smaller than 1.

Next, in step S442, the measurement device 1 generates the second line data L2($k$)=$c_L L_C(k)$ obtained by multiplying the line $L_C(k)$ passing through the first peak $p_1$ and the second peak $p_2$ by the second coefficient $c_L$, according to Equations (37) and (38). For example, the second coefficient $c_L$ is larger than $-4$ and equal to or smaller than $-2$.

Next, in step S443, the measurement device 1 generates the third line data L3($k$) linearly approximating the third interval correction data $M_{CC3}(k)$ smaller than the product $-mu_2 c_{TH}$ of the value $-mu_2$ obtained by inverting the sign of the amplitude $mu_2$ of the second peak $p_2=(k_2, mu_2)$ and the first coefficient $c_{TH}$, according to Equations (34), (35), and (36).

Next, in step S444, according to Equations (40) and (42), the measurement device 1 calculates the first intersection point $p_3$ between the first line data L1($k$) and the second line data L2($k$) and the second intersection point $p_4$ between the second line data L2($k$) and the third line data L3($k$).

Finally, in step S445, the measurement device 1 generates the second interval correction data $M_{CC2}(k)$ in the second interval T2 by using data before the first intersection point $p_3$ as the first line data L1($k$), data from the first intersection point $p_3$ to the second intersection point $p_4$ as the second line data L2($k$), and data after the second intersection point $p_4$ as the third line data L3($k$), as in Equation (43).

1-5. Configuration of Observation Device, Measurement Device, and Monitoring Device FIG. 34 is a diagram showing a configuration example of the sensor 2 which is the observation device, the measurement device 1, and the monitoring device 3.

Figure 34:
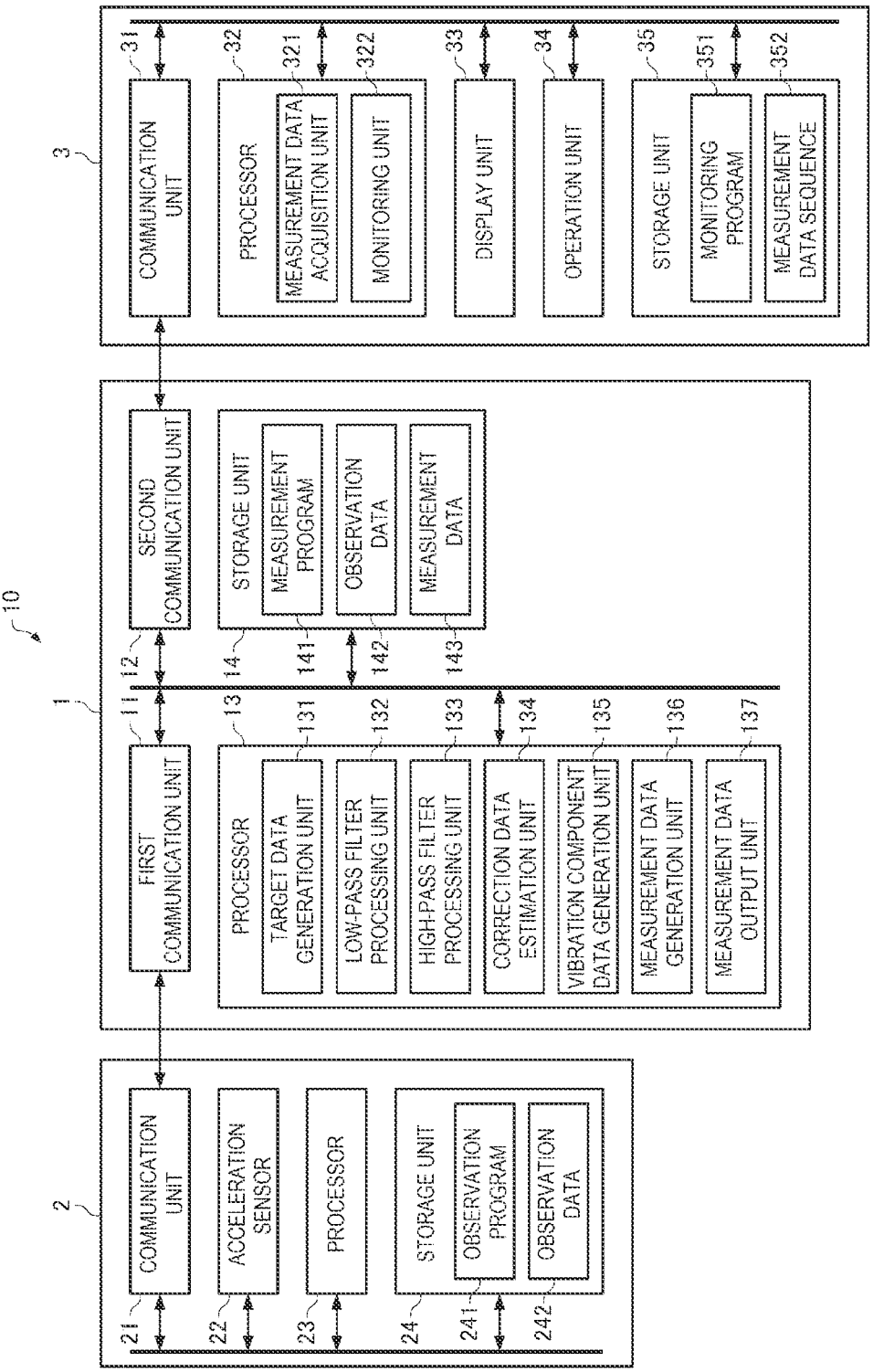
FIG. 34 is a diagram showing a configuration example of a sensor, a measurement device, and a monitoring device.

As shown in FIG. 34, the sensor 2 includes a communication unit 21, an acceleration sensor 22, a processor 23, and a storage unit 24.

The storage unit 24 is a memory that stores various programs, data, and the like for the processor 23 to perform calculation processing and control processing. The storage unit 24 stores programs, data, and the like for the processor 23 to implement predetermined application functions.

The acceleration sensor 22 detects an acceleration generated in each axial direction of the three axes.

The processor 23 controls the acceleration sensor 22 by executing an observation program 241 stored in the storage unit 24, generates observation data 242 based on the acceleration detected by the acceleration sensor 22, and stores the generated observation data 242 in the storage unit 24. In the present embodiment, the observation data 242 is the acceleration data $A_s(k)$.

The communication unit 21 transmits the observation data 242 stored in the storage unit 24 to the measurement device 1 under the control of the processor 23.

As shown in FIG. 34, the measurement device 1 includes a first communication unit 11, a second communication unit 12, a processor 13, and a storage unit 14.

The first communication unit 11 receives the observation data 242 from the sensor 2, and outputs the received observation data 242 to the processor 13. As described above, the observation data 242 is the acceleration data $A_s(k)$.

The storage unit 14 is a memory that stores programs, data, and the like for the processor 13 to perform the calculation processing and the control processing. The storage unit 14 stores programs, data, and the like for the processor 13 to implement predetermined application functions. The processor 13 may receive various programs, data, and the like via the communication network 4 and store the programs, data, and the like in the storage unit 14.

The processor 13 acquires the observation data 242 received by the first communication unit 11, and stores the observation data 242 in the storage unit 14 as observation data 142. Then, the processor 13 generates measurement data 143 based on the observation data 142 stored in the storage unit 14, and stores a generated measurement data 143 in the storage unit 14. In the embodiment, the measurement data 143 is the measurement data U'(k).

In the present embodiment, the processor 13 functions as a target data generation unit 131, a low-pass filter processing unit 132, a high-pass filter processing unit 133, a correction data estimation unit 134, a vibration component data generation unit 135, a measurement data generation unit 136 and a measurement data output unit 137 by executing the measurement program 141 stored in the storage unit 14. That is, the processor 13 includes the target data generation unit 131, the low-pass filter processing unit 132, the high-pass filter processing unit 133, the correction data estimation unit 134, the vibration component data generation unit 135, the measurement data generation unit 136 and the measurement data output unit 137.

The target data generation unit 131 reads the observation data 142 stored in the storage unit 14, and generates the target data U(k) based on the acceleration data $A_s(k)$ that is the observation data 142. Specifically, the target data generation unit 131 generates the target data U(k) by performing calculations of Equations (19) and (20). That is, the target data generation unit 131 performs the processing of the target data generation step S1 in FIG. 31.

The low-pass filter processing unit 132 performs low-pass filter processing on the target data U(k) including the drift noise and the vibration component and generated by the target data generation unit 131, so as to generate the displacement data $M_s(k)$ as the vibration component reduction data in which the vibration component is reduced. That is, the low-pass filter processing unit 132 performs the processing of the low-pass filter processing step S2 in FIG. 31.

The high-pass filter processing unit 133 performs high-pass filter processing on the displacement data $M_s(k)$ generated by the low-pass filter processing unit 132, so as to generate the displacement data MU(k) as the drift noise reduction data in which the drift noise is reduced, as in Equation (25). That is, the high-pass filter processing unit 133 performs the processing of the high-pass filter processing step S3 in FIG. 31.

The correction data estimation unit 134 generates, based on the displacement data MU(k) generated by the high-pass filter processing unit 133, the correction data $M_{CC}(k)$ corresponding to the difference between the displacement data MU(k) and the data obtained by removing the drift noise from the displacement data $M_s(k)$. The correction data estimation unit 134 generates the correction data $M_{CC}(k)$ by performing calculations of Equations (26) to (44).

Specifically, first, the correction data estimation unit 134 calculates the first peak $p_1=mu_1$), and the second peak $p_2=(k_2, mu_2)$ of the displacement data MU(k), and specifies the first interval T1 before the first peak $p_1$, the second interval T2 between the first peak $p_1$ and the second peak $p_2$, and the third interval T3 after the second peak $p_2$. That is, the correction data estimation unit 134 performs the processing of the interval specifying step S41 in FIG. 32.

Next, the correction data estimation unit 134 inverts the sign of the displacement data MU(k) in the first interval T1 to generate the first interval correction data $M_{CC1}(k)$, as in Equation (27). That is, the correction data estimation unit 134 performs the processing of the first interval correction data generation step S42 in FIG. 32.

Next, the correction data estimation unit 134 inverts the sign of the displacement data MU(k) in the third interval T3 to generate the third interval correction data $M_{CC3}(k)$, as in Equation (28). That is, the correction data estimation unit 134 performs the processing of the third interval correction data generation step S43 in FIG. 32.

Next, according to Equation (30), Equation (31), and Equation (32), the correction data estimation unit 134 generates the first line data $L1(k)$ linearly approximating the first interval correction data $M_{CC1}(k)$ smaller than the product $-mu_1 c_{TH}$ of the first coefficient $c_{TH}$ and the value $-mu_1$ obtained by inverting the sign of the amplitude $mu_1$ of the first peak $p_1=(k_1, mu_1)$. That is, the correction data estimation unit 134 performs the processing of step S441 in FIG. 33.

Next, the correction data estimation unit 134 generates the second line data $L2(k)=c_L L_C(k)$ obtained by multiplying the line $L_C(k)$ passing through the first peak $p_1$ and the second peak $p_2$ by the second coefficient $c_L$, according to Equations (37) and (38). That is, the correction data estimation unit 134 performs the processing of step S442 in FIG. 33.

Next, the correction data estimation unit 134 generates the third line data $L3(k)$ linearly approximating the third interval correction data $M_{CC3}(k)$ smaller than the product $-mu_2 c_{TH}$ of the value $-mu_2$ obtained by inverting the sign of the amplitude $mu_2$ of the second peak $p_2=(k_2, mu_2)$ and the first coefficient $c_{TH}$, according to Equations (34), (35), and (36). That is, the correction data estimation unit 134 performs the processing of step S443 in FIG. 33.

Next, according to Equations (40) and (42), the correction data estimation unit 134 calculates the first intersection point $p_3$ between the first line data L1(k) and the second line data L2(k) and the second intersection point $p_4$ between the second line data L2(k) and the third line data L3(k). That is, the correction data estimation unit 134 performs the processing of step S444 in FIG. 33.

Next, as in Equation (43), the correction data estimation unit 134 generates the second interval correction data $M_{CC1}$(k) in the second interval T2 by using data before the first intersection point $p_3$ as the first line data L1(k), data from the first intersection point $p_3$ to the second intersection point $p_4$ as the second line data L2(k), and data after the second intersection point $p_4$ as the third line data L3(k). That is, the correction data estimation unit 134 performs the processing of step S445 in FIG. 33.

Finally, the correction data estimation unit 134 adds the first interval correction data $M_{CC1}$(k), the second interval correction data $M_{CC1}$(k), and the third interval correction data $M_{CC1}$(k) to generate the correction data $M_{CC}$(k), as in Equation (26). That is, the correction data estimation unit 134 performs the processing of the correction data generation step S45 in FIG. 32.

As described above, the correction data estimation unit 134 performs the processing of the correction data estimation step S4 in FIG. 31, specifically, the processing of steps S41 to S45 in FIG. 32 and the processing of steps S441 to S445 in FIG. 33.

The vibration component data generation unit 135 subtracts the displacement data $M_s$(k) generated by the low-pass filter processing unit 132 from the target data U(k) generated by the target data generation unit 131 to generate vibration component data $U_{OSC}$(k) including a vibration component, as in Equation (24). That is, the vibration component data generation unit 135 performs the processing of the vibration component data generation step S5 in FIG. 31.

The measurement data generation unit 136 generates the measurement data U'(k) by adding the displacement data MU(k) generated by the high-pass filter processing unit 133, the correction data $M_{CC}$(k) generated by the correction data estimation unit 134, and the vibration component data $U_{OSC}$(k) generated by the vibration component data generation unit 135 as in Equation (45) and Equation (48). That is, the measurement data generation unit 136 performs the processing of the measurement data generation step S6 in FIG. 31. The measurement data U'(k) generated by the measurement data generation unit 136 is stored in the storage unit 14 as the measurement data 143.

The measurement data output unit 137 reads the measurement data 143 stored in the storage unit 14 and outputs the measurement data 143 to the monitoring device 3. Then, the second communication unit 12 transmits the measurement data 143 stored in the storage unit 14 to the monitoring device 3 via the communication network 4 under the control of the measurement data output unit 137. That is, the measurement data output unit 137 performs the processing of the measurement data output step S7 in FIG. 31.

As described above, the measurement program 141 is a program that causes the measurement device 1, which is a computer, to execute each procedure of the flowchart shown in FIG. 31.

As shown in FIG. 34, the monitoring device 3 includes a communication unit 31, a processor 32, a display unit 33, an operation unit 34, and a storage unit 35.

The communication unit 31 receives the measurement data 143 from the measurement device 1 and outputs the received measurement data 143 to the processor 32. As described above, the measurement data 143 is the measurement data U'(k).

The display unit 33 displays various types of information under the control of the processor 32. The display unit 33 may be, for example, a liquid crystal display or an organic EL display. The EL is an abbreviation for Electro Luminescence.

The operation unit 34 outputs operation data corresponding to an operation of a user to the processor 32. The operation unit 34 may be, for example, an input device such as a mouse, a keyboard, or a microphone.

The storage unit 35 is a memory that stores various programs, data, and the like for the processor 32 to perform calculation processing and control processing. The storage unit 35 stores programs, data, and the like for the processor 32 to implement predetermined application functions.

The processor 32 acquires the measurement data 143 received by the communication unit 31, generates evaluation information by evaluating a temporal change in the displacement of the superstructure 7 based on the acquired measurement data 143, and displays the generated evaluation information on the display unit 33.

In the present embodiment, the processor 32 functions as a measurement data acquisition unit 321 and a monitoring unit 322 by executing a monitoring program 351 stored in the storage unit 35. That is, the processor 32 includes the measurement data acquisition unit 321 and the monitoring unit 322.

The measurement data acquisition unit 321 acquires the measurement data 143 received by the communication unit 31, and adds the acquired measurement data 143 to a measurement data sequence 352 stored in the storage unit 35.

The monitoring unit 322 statistically evaluates the temporal change in the displacement of the superstructure 7 based on the measurement data sequence 352 stored in the storage unit 35. Then, the monitoring unit 322 generates evaluation information indicating the evaluation result, and displays the generated evaluation information on the display unit 33. The user can monitor a state of the superstructure 7 based on the evaluation information displayed on the display unit 33.

The monitoring unit 322 may perform processing such as monitoring of the railway vehicle 6 and abnormality determination of the superstructure 7 based on the measurement data sequence 352 stored in the storage unit 35.

The processor 32 transmits, based on the operation data output from the operation unit 34, information for adjusting operation states of the measurement device 1 and the sensor 2 to the measurement device 1 via the communication unit 31. The operation state of the measurement device 1 is adjusted according to the information received via the second communication unit 12. In addition, the measurement device 1 transmits information for adjusting the operation state of the sensor 2 received via the second communication unit 12 to the sensor 2 via the first communication unit 11. The operation state of the sensor 2 is adjusted according to the information received via the communication unit 21.

In the processors 13, 23, and 32, for example, the functions of the respective units may be implemented by individual hardware, or the functions of the respective units may be implemented by integrated hardware. For example, the processors 13, 23, and 32 include hardware, and the hardware may include at least one of a circuit that processes a digital signal and a circuit that processes an analog signal. The processors 13, 23, and 32 may be a CPU, a GPU, a DSP, or the like. The CPU is an abbreviation for central processing unit, the GPU is an abbreviation for graphics processing unit, and the DSP is an abbreviation for digital signal processor. The processors 13, 23, and 32 may be configured as custom ICs such as ASICs so as to implement the functions of the respective units, or may implement the functions of the respective units by a CPU and an ASIC. The ASIC is an abbreviation for application specific integrated circuit, and the IC is an abbreviation for integrated circuit.

The storage units 14, 24, and 35 are configured by, for example, various IC memories such as a ROM, a flash ROM, and a RAM, and a recording medium such as a hard disk, a memory card, and the like. ROM is an abbreviation for read only memory, RAM is an abbreviation for random access memory, and IC is an abbreviation for integrated circuit. The storage units 14, 24, and 35 include a non-volatile information storage device that is a computer-readable device or a medium, and various programs, data, and the like may be stored in the information storage device. The information storage device may be an optical disk such as an optical disk DVD or a CD, a hard disk drive, or various memories such as a card type memory or a ROM.

Although only one sensor 2 is shown in FIG. 34, a plurality of sensors 2 may generate the observation data 242 and transmit the observation data 242 to the measurement device 1. In this case, the measurement device 1 receives a plurality of pieces of the observation data 242 transmitted from the plurality of sensors 2, generates a plurality of pieces of measurement data 143, and transmits the plurality of pieces of measurement data 143 to the monitoring device 3. The monitoring device 3 receives the plurality of pieces of measurement data 143 transmitted from the measurement device 1, and monitors a plurality of states of the super-structures 7 based on the plurality of pieces of received measurement data 143.

1-6. Operation and Effect

In the measurement method of the first embodiment described above, the measurement device 1 generates the displacement data $M_s(k)$ in which the vibration component is reduced and the vibration component data $U_{OSC}(k)$ including the vibration component, using the target data $U(k)$ which is to be processed, generates the displacement data $MU(k)$, in which the drift noise is reduced, based on the displacement data $M_s(k)$, and estimates the correction data $M_{CC}(k)$ based on the displacement data $MU(k)$. Since the vibration component of the displacement data $MU(k)$ is reduced, the correction data $M_{CC}(k)$ estimated with high accuracy is obtained. Further, since the correction data $M_{CC}(k)$ corresponds to the difference between the displacement data $MU(k)$ and the data obtained by subtracting the drift noise from the displacement data $M_s(k)$, the correction data $M_{CC}(k)$ includes the significant signal component removed by high-pass filter processing. Therefore, according to the measurement method of the first embodiment, the measurement device 1 can generate the measurement data $U'(k)$, in which the drift noise is reduced with respect to the target data $U(k)$, by adding the displacement data $MU(k)$, the correction data $M_{CC}(k)$, and the vibration component data $U_{OSC}(k)$. According to the measurement method of the first embodiment, the measurement device 1 generates the displacement data $MU(k)$, the correction data $M_{CC}(k)$ and the vibration component data $U_{OSC}(k)$ using the target data $U(k)$ to be processed, adds the displacement data $MU(k)$, the correction data $M_{CC}(k)$ and the vibration component data $U_{OSC}(k)$, and thereby the measurement device 1 can generate the measurement data $U'(k)$, in which the drift noise is reduced, without preparing information for reducing the drift noise in advance. Therefore, by using the measurement method of the first embodiment, accurate measurement data $U'(k)$ can be obtained regardless of a change in environment, and cost reduction can be achieved.

According to the measurement method of the first embodiment, since the measurement device 1 can specify the first interval T1, the second interval T2, and the third interval T3, and generate the appropriate first interval correction data $M_{CC1}(k)$ second interval correction data $M_{CC2}(k)$, and third interval correction data $M_{CC3}(k)$ based on a feature of the displacement data $MU(k)$ in which the drift noise and the vibration component is reduced with respect to the target data $U(k)$, it is possible to improve the estimation accuracy of the correction data $M_{CC}(k)$ generated by adding the first interval correction data $M_{CC1}(k)$ the second interval correction data $M_{CC2}(k)$, and the third interval correction data $M_{CC3}(k)$. In particular, since the measurement device 1 can generate the first line data $L1(k)$, the second line data $L2(k)$, and the third line data $L3(k)$ with high accuracy by setting the first coefficient $c_{TH}$ and the second coefficient $C_L$ to appropriate values, the measurement device 1 can generate the second interval correction data $M_{CC2}(k)$ with high accuracy based on the first line data $L1(k)$, the second line data $L2(k)$, and the third line data $L3(k)$.

According to the measurement method of the first embodiment, the measurement device 1 performs moving average processing on the target data $U(k)$ in the cycle $T_f$ corresponding to the fundamental frequency $F_f$, and thereby not only the necessary calculation amount is small, but also the attenuation amount and the harmonic component of the signal component of the fundamental frequency $F_f$ is very large. Therefore, the displacement data $M_s(k)$ in which the vibration component is effectively reduced is obtained, so that the estimation accuracy of the correction data $M_{CC}(k)$ can be improved by eliminating the influence of the vibration component. Alternatively, the measurement device 1 generates the displacement data $M_s(k)$ by performing, on the target data $U(k)$, FIR filter processing for attenuating a signal component of a frequency equal to or higher than the fundamental frequency $F_f$, and thus the calculation amount is larger than that of the moving average processing, but since all signal components of a frequency equal to or higher than the fundamental frequency $F_f$ can be attenuated, the estimation accuracy of the correction data $M_{CC}(k)$ can be improved by eliminating the influence of the vibration component having a frequency equal to or higher than the fundamental frequency $F_f$.

According to the measurement method of the first embodiment, the measurement device 1 performs processing of subtracting the data, that is obtained by performing moving average processing or FIR filter processing on the displacement data $M_s(k)$, from the displacement data $M_s(k)$ as the high-pass filter processing to be performed on the displacement data $M_s(k)$, and thus the high-pass filter processing can be easily performed. Further, in the moving average processing or the FIR filter processing, since a group delay of each signal component included in the displacement data $M_s(k)$ is constant, the correction data $M_{CC}(k)$ can be estimated with high accuracy.

In the measurement method of the first embodiment, the target data $U(k)$ to be processed is data of the displacement of the superstructure 7 caused by the railway vehicle 6 moving on the superstructure 7 of the bridge 5. Therefore, according to the measurement method of the first embodiment, since the measurement device 1 generates the measurement data $U'(k)$ which is data of the displacement of the superstructure 7 caused by the movement of the railway vehicle 6 and in which the drift noise is reduced, it is possible to accurately measure the displacement of the superstructure 7 of the bridge 5.

According to the measurement method of the first embodiment, since the measurement device 1 generates the target data U(k) to be processed obtained by twice integrating the acceleration in the direction intersecting the surface of the superstructure 7 detected by the sensor 2 installed in the superstructure 7, it is possible to accurately measure the displacement of the superstructure 7.

In the measurement method of the first embodiment, since the frequency of the drift noise included in the target data U(k) is lower than the minimum value of the natural vibration frequency of the superstructure 7, the cutoff frequency of the low-pass filter processing and the high-pass filter processing for the target data U(k) can be set higher than the frequency of the drift noise of the superstructure 7 and lower than the minimum value of the natural vibration frequency. Therefore, according to the measurement method of the first embodiment, the drift noise can be reduced without reducing the signal component and the harmonic component of the natural vibration frequency of the superstructure 7 in the generated measurement data U'(k).

In the measurement method of the first embodiment, since the target data U(k) to be processed includes data of a waveform that projects in the positive direction or the negative direction, for example, data of a rectangular waveform, a trapezoidal waveform, or a sine half-wave waveform, the measurement device 1 can generate more appropriate correction data $M_{CC}(k)$ based on features of these waveforms, so that it is possible to improve the estimation accuracy of the generated correction data $M_{CC}(k)$.

2. Second Embodiment

Hereinafter, in a second embodiment, the same components as those in the first embodiment will be denoted by the same reference numerals, repetitive description as that in the first embodiment will be omitted or simplified, and contents different from those in the first embodiment will be mainly described.

In the measurement method of the first embodiment, the measurement device 1 generates the correction data $M_{CC}(k)$ by adding the first interval correction data $M_{CC1}(k)$, the second interval correction data $M_{CC2}(k)$, and the third interval correction data $M_{CC3}(k)$, and generates the measurement data U'(k) by adding the displacement data MU(k), the correction data $M_{CC}(k)$, and the vibration component data $U_{OSC}(k)$. On the other hand, the measurement data U'(k) obtained by adding the displacement data MU(k), the correction data $M_{CC}(k)$, and the vibration component data $U_{OSC}(k)$ as in Equation (49) is always the vibration component data $U_{OSC}(k)$ in the first interval T1 and the third interval T3. Therefore, in a measurement method of the second embodiment, the measurement device 1 generates the correction data $M_{CC2}(k)$ in the second interval T2 without generating the first interval correction data $M_{CC1}(k)$ and the third interval correction data $M_{CC3}(k)$. Then, as shown in Equation (51), the measurement device 1 generates the measurement data U'(k) by setting data in the interval of $k \leq k_1$ which is the first interval T1 and data in the interval of $k_2 \leq k$ which is the third interval T3 as the vibration component data $U_{OSC}(k)$, and adding the displacement data MU(k), the correction data $M_{CC2}(k)$, and the vibration component data $U_{OSC}(k)$ in the interval of $k_1 < k < k_2$ which is the second interval T2.

$$U'(k) = \begin{cases} k \leq k_1 & U_{osc}(k) \\ k_1 < k < k_2 & MU(k) + M_{CC2}(k) + U_{osc}(k) \\ k_2 \leq k & U_{osc}(k) \end{cases} \quad (51)$$

In Equation (49), since the correction data $M_{CC}(k)$ matches the second interval correction data $M_{CC2}(k)$ in the interval of $k_1 < k < k_2$, a calculation result of Equation (51) matches a calculation result of Equation (49).

Figure 35:
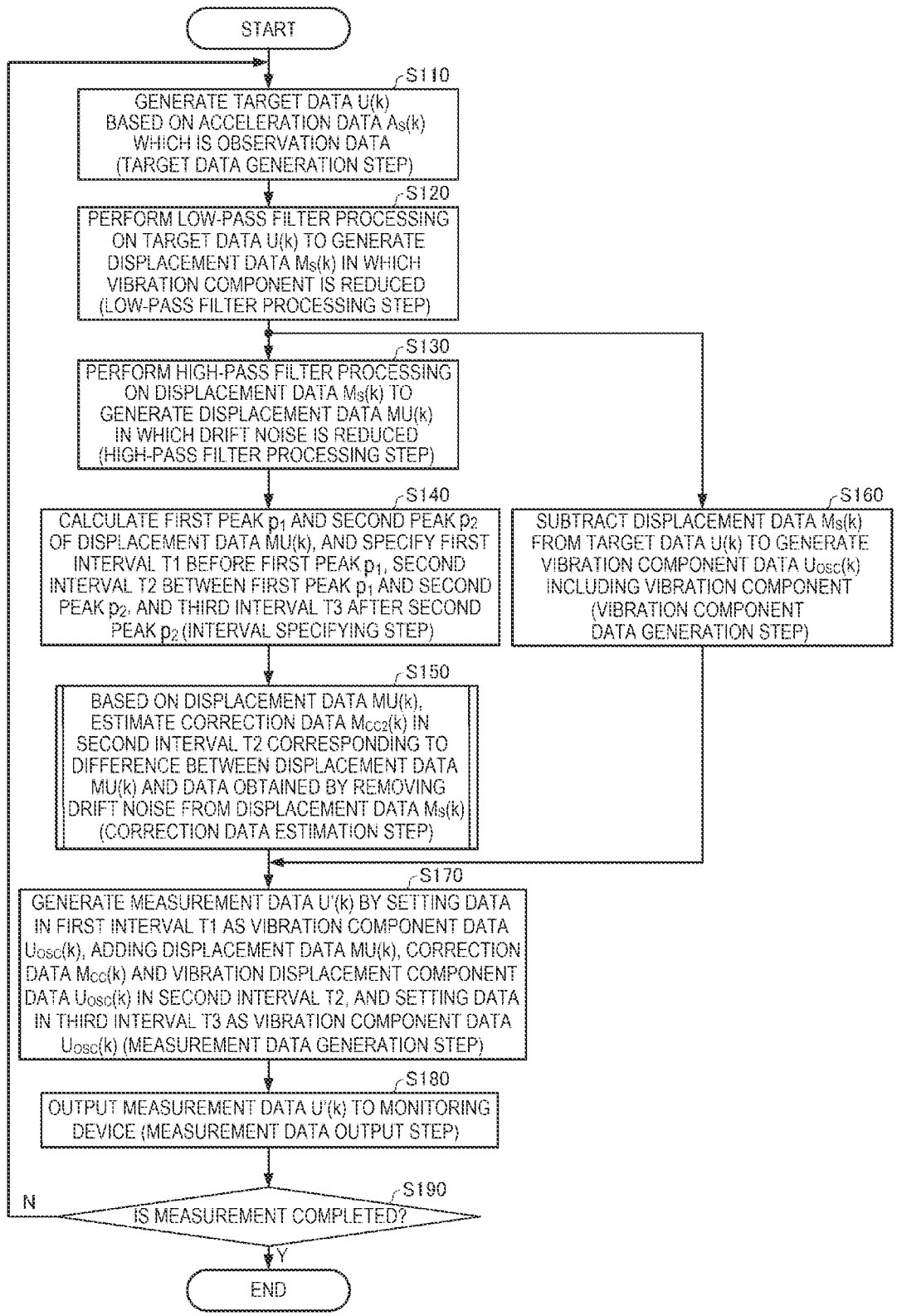
FIG. 35 is a flowchart showing an example of a procedure of a measurement method according to a second embodiment.

FIG. 35 is a flowchart showing an example of a procedure of the measurement method of the second embodiment for measuring the displacement of the superstructure 7 of the bridge 5. In the present embodiment, the measurement device 1 executes the procedure shown in FIG. 35.

As shown in FIG. 35, first, in a target data generation step S110, the measurement device 1 acquires acceleration data $A_s(k)$ which is observation data, and generates target data U(k). Specifically, the measurement device 1 generates the target data U(k) by performing calculations of Equations (19) and (20). The processing of the target data generation step S110 is the same as the processing of the target data generation step S1 of FIG. 31.

Next, in a low-pass filter processing step S120, the measurement device 1 performs low-pass filter processing on the target data U(k) including the drift noise and the vibration component and generated in step S110 to generate the displacement data $M_s(k)$ as vibration component reduction data in which the vibration component is reduced. The processing of the low-pass filter processing step S120 is the same as the processing of the low-pass filter processing step S2 in FIG. 31.

Next, in a high-pass filter processing step S130, the measurement device 1 performs high-pass filter processing on the displacement data $M_s(k)$ including the drift noise and generated in step S120, so as to generate the displacement data MU(k) as drift noise reduction data in which the drift noise is reduced, as in Equation (25). The processing of the high-pass filter processing step S130 is the same as the processing of the high-pass filter processing step S3 in FIG. 31.

Next, in an interval specifying step S140, the measurement device 1 calculates the first peak $p_1=(k_1, mu_1)$, and the second peak $p_2=(k_2, mu_2)$ of the displacement data MU(k) generated in step S130, and specifies a first interval T1 before the first peak $p_1$, a second interval T2 between the first peak $p_1$ and the second peak $p_2$, and a third interval T3 after the second peak $p_2$. That is, the first interval T1 is an interval of $k \leq k_1$, the second interval T2 is an interval of $k_1 < k < k_2$, and the third interval T3 is an interval of $k_2 \leq k$. The processing of the interval specifying step S140 is the same as the processing of the interval specifying step S41 of FIG. 32.

Next, in the correction data estimation step S150, the measurement device 1 generates, based on the displacement data MU(k) generated in step S130, the correction data $M_{CC2}(k)$ in the second interval T2 corresponding to the difference between the displacement data MU(k) and the data obtained by removing the drift noise from the displacement data $M_s(k)$. Specifically, the measurement device 1 generates the correction data $M_{CC2}(k)$ by performing calculations of Equations (29) to (43).

In a vibration component data generation step S160, the measurement device 1 subtracts the displacement data $M_s(k)$ generated in step S120 from the target data U(k) generated in step S110, so as to generate the vibration component data $U_{OSC}(k)$ including the vibration component, as in Equation (24). The processing of the vibration component data generation step S160 is the same as the processing of the vibration component data generation step S5 of FIG. 31.

Next, in a measurement data generation step S170, the measurement device 1 generates the measurement data U'(k) by setting data in the first interval T1 as the vibration component data $U_{OSC}(k)$ generated in step S160, adding the displacement data MU(k) generated in step S130, the correction data $M_{CC2}(k)$ generated in step S150, and the vibration component data $U_{OSC}(k)$ in the second interval T2, and setting data in the third interval T3 as the vibration component data $U_{OSC}(k)$, as in Equation (51).

Next, in a measurement data output step S180, the measurement device 1 outputs the measurement data U'(k) generated in step S170 to the monitoring device 3. Specifically, the measurement device 1 transmits the measurement data U'(k) to the monitoring device 3 via the communication network 4. The processing of the measurement data output step S180 is the same as the processing of the measurement data output step S7 of FIG. 31.

Then, in step S190, the measurement device 1 repeats the processing of steps S110 to S180 until the measurement of the displacement of the superstructure 7 of the bridge 5 is completed.

Figure 36:
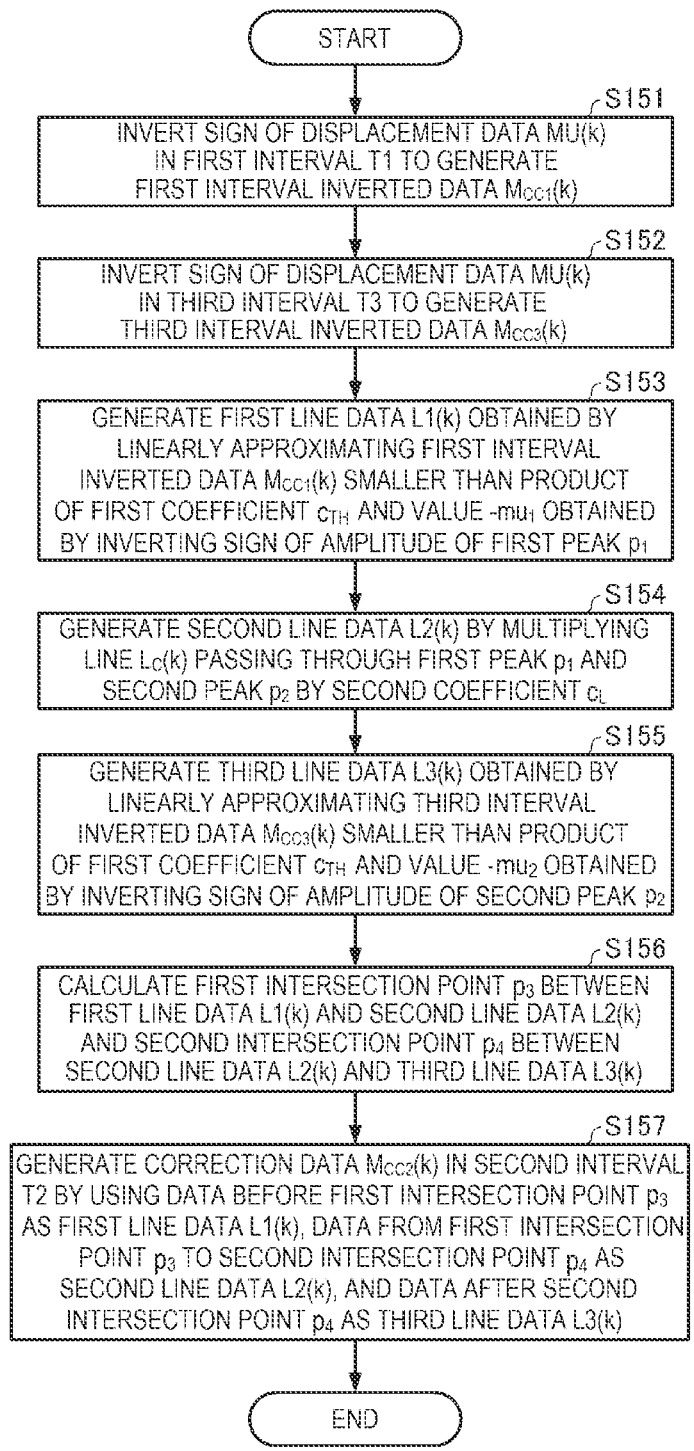
FIG. 36 is a flowchart showing an example of a procedure of a correction data estimation step in the second embodiment.

FIG. 36 is a flowchart showing an example of a procedure of the correction data estimation step S150 in FIG. 35.

As shown in FIG. 36, first, in step S151, the measurement device 1 inverts the sign of the displacement data MU(k) in the first interval T1 to generate first interval inverted data $M_{CC1}(k)$ in the same manner as in Equation (18) for obtaining the first interval correction data $M_{CC1}(k)$.

Next, in step S152, the measurement device 1 inverts the sign of the displacement data MU(k) in the third interval T3 to generate third interval inverted data $M_{CC1}(k)$ in the same manner as in Equation (19) for obtaining the third interval correction data $M_{CC3}(k)$.

Next, in step S153, according to Equation (30), Equation (31), and Equation (32), the measurement device 1 generates the first line data L1(k) linearly approximating the first interval inverted data $M_{CC1}(k)$ smaller than the product $-mu_1 c_{TH}$ of the first coefficient $c_{TH}$ and the value $-mu_1$ obtained by inverting the sign of the amplitude $mu_1$ of the first peak $p_1=(k_1, mu_1)$. Here, the first coefficient $c_{TH}$ is larger than 0 and smaller than 1.

Next, in step S154, the measurement device 1 generates the second line data $L2(k)=c_L L_C(k)$ obtained by multiplying the line Lc(k) passing through the first peak $p_1$ and the second peak $p_2$ by the second coefficient $c_L$, according to Equations (37) and (38). For example, the second coefficient $c_L$ is larger than −4 and equal to or smaller than −2.

Next, in step S155, the measurement device 1 generates the third line data L3(k) linearly approximating the third interval inverted data $M_{CC3}(k)$ smaller than the product $-mu_2 c_{TH}$ of the value $-mu_2$ obtained by inverting the sign of the amplitude $mu_2$ of the second peak $p_2=(k_2, mu_2)$ and the first coefficient $c_{TH}$, according to Equations (34), (35), and (36).

Next, in step S156, according to Equations (40) and (42), the measurement device 1 calculates the first intersection point $p_3$ between the first line data L1(k) and the second line data L2(k) and the second intersection point $p_4$ between the second line data L2(k) and the third line data L3(k).

Finally, as in Equation (43), in step S157, the measurement device 1 generates the correction data $M_{CC2}(k)$ in the second interval T2 by using data before the first intersection point $p_3$ as the first line data L1(k), data from the first intersection point $p_3$ to the second intersection point $p_4$ as the second line data L2(k), and data after the second intersection point $p_4$ as the third line data L3(k).

Figure 37:
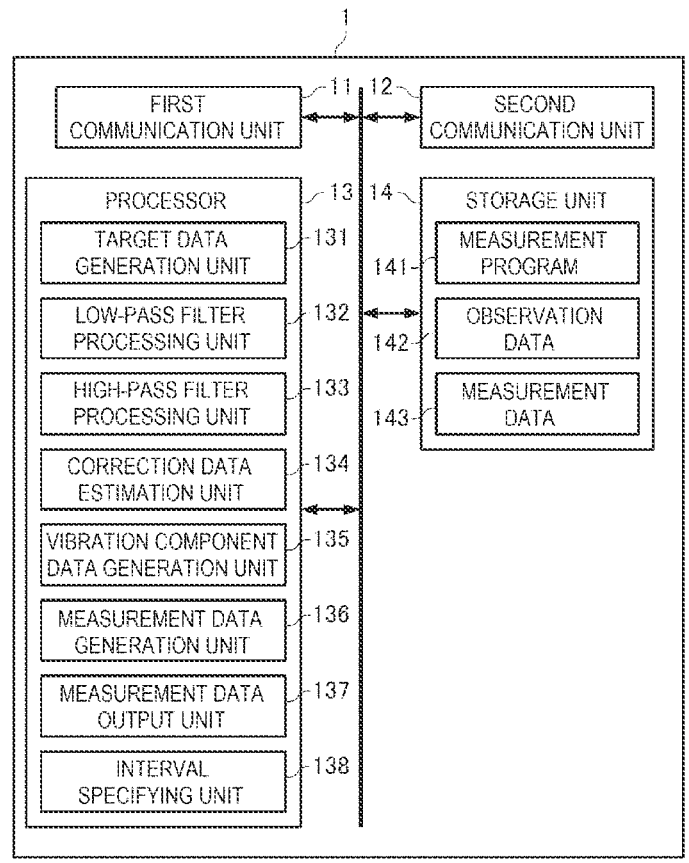
FIG. 37 is a diagram showing a configuration example of a measurement device according to the second embodiment.

FIG. 37 is a diagram showing a configuration example of the measurement device 1 according to the second embodiment. As shown in FIG. 37, the measurement device 1 according to the second embodiment includes the first communication unit 11, the second communication unit 12, the processor 13, and the storage unit 14, similarly to the first embodiment. Since functions of the first communication unit 11, the second communication unit 12, and the storage unit 14 are similar to those in the first embodiment, description thereof will be omitted.

In the present embodiment, the processor 13 functions as the target data generation unit 131, the low-pass filter processing unit 132, the high-pass filter processing unit 133, the correction data estimation unit 134, the vibration component data generation unit 135, the measurement data generation unit 136, the measurement data output unit 137, and the interval specifying unit 138 by executing the measurement program 141 stored in the storage unit 14. That is, the processor 13 includes as the target data generation unit 131, the low-pass filter processing unit 132, the high-pass filter processing unit 133, the correction data estimation unit 134, the vibration component data generation unit 135, the measurement data generation unit 136, the measurement data output unit 157, and the interval specifying unit 138.

The functions of the target data generation unit 131, the low-pass filter processing unit 132, the high-pass filter processing unit 133, the vibration component data generation unit 135, and the measurement data output unit 137 are similar as those in the first embodiment, and thus the description thereof will be omitted. The target data generation unit 131 performs the processing of the target data generation step S110 in FIG. 35. The low-pass filter processing unit 132 performs the processing of the low-pass filter processing step S120 in FIG. 35. The high-pass filter processing unit 133 performs the processing of the high-pass filter processing step S130 in FIG. 35. The vibration component data generation unit 135 performs the processing of the vibration component data generation step S160 in FIG. 35. The measurement data output unit 137 performs the processing of the measurement data output step S180 in FIG. 35.

Next, the interval specifying unit S138 calculates the first peak $p_1=(k_1, mu_1)$, and the second peak $p_2=(k_2, mu_2)$ of the displacement data MU(k) generated by the high-pass filter processing unit 133, and specifies the first interval T1 before the first peak $p_1$, the second interval T2 between the first peak $p_1$ and the second peak $p_2$, and the third interval T3 after the second peak $p_2$. That is, the interval specifying unit 138 performs the processing of the interval specifying step S140 in FIG. 35.

The correction data estimation unit 134 generates, based on the displacement data MU(k) generated by the high-pass filter processing unit 133, the correction data $M_{CC2}(k)$ in the second interval T2 corresponding to the difference between the displacement data MU(k) and the data obtained by removing the drift noise from the displacement data $M_s(k)$. The correction data estimation unit 134 generates the correction data $M_{CC2}(k)$ by performing calculations of Equations (29) to (43).

Specifically, first, the correction data estimation unit 134 inverts the sign of the displacement data MU(k) in the first interval T1 to generate the first interval inverted data $M_{CC1}$(k) in the same manner as in Equation (18) for obtaining the first interval correction data $M_{CC1}$(k). That is, the correction data estimation unit 134 performs the processing of step S151 in FIG. 36.

Next, the correction data estimation unit 134 inverts the sign of the displacement data MU(k) in the third interval T3 to generate the third interval inverted data $M_{CC3}(k)$ in the same manner as in Equation (19) for obtaining the third interval correction data $M_{CC3}(k)$. That is, the correction data estimation unit 134 performs the processing of step S152 in FIG. 36.

Next, according to Equation (30), Equation (31), and Equation (32), the correction data estimation unit 134 generates the first line data $L1(k)$ linearly approximating the first interval inverted data $M_{CC1}$(k) smaller than the product $-mu_1 c_{TH}$ of the first coefficient $c_{TH}$ and the value $-mu_1$ obtained by inverting the sign of the amplitude $mu_1$ of the first peak $p_1=(k_1, mu_1)$. That is, the correction data estimation unit 134 performs the processing of step S153 in FIG. 36.

Next, the correction data estimation unit 134 generates the second line data $L2(k)=c_L L_C(k)$ obtained by multiplying the line $L_C(k)$ passing through the first peak $p_1$ and the second peak $p_2$ by the second coefficient $c_L$, according to Equations (37) and (38). That is, the correction data estimation unit 134 performs the processing of step S154 in FIG. 36.

Next, the correction data estimation unit 134 generates third line data $L3(k)$ linearly approximating the third interval inverted data $M_{CC1}$(k) smaller than the product $-mu_2 c_{TH}$ of the value $-mu_2$ obtained by inverting the sign of the amplitude $mu_2$ of the second peak $p_2=(k_2, mu_2)$ and the first coefficient $c_{TH}$, according to Equations (34), (35), and (36). That is, the correction data estimation unit 134 performs the processing of step S155 in FIG. 36.

Next, according to Equations (40) and (42), the correction data estimation unit 134 calculates the first intersection point $p_3$ between the first line data $L1(k)$ and the second line data $L2(k)$ and the second intersection point $p_4$ between the second line data $L2(k)$ and the third line data $L3(k)$. That is, the correction data estimation unit 134 performs the processing of step S156 in FIG. 36.

Finally, as in Equation (43), the correction data estimation unit 134 generates the correction data $M_{CC2}(k)$ in the second interval T2 by using data before the first intersection point $p_3$ as the first line data $L1(k)$, data from the first intersection point $p_3$ to the second intersection point $p_4$ as the second line data $L2(k)$, and data after the second intersection point $p_4$ as the third line data $L3(k)$. That is, the correction data estimation unit 134 performs the processing of step S157 in FIG. 36.

As described above, the correction data estimation unit 134 performs the processing of the correction data estimation step S150 in FIG. 35, specifically, the processing of steps S151 to S157 in FIG. 36.

The measurement data generation unit 136 generates the measurement data U'(k) by setting data in the first interval T1 as the vibration component data $U_{OSC}$(k) generated by the vibration component data generation unit 135, adding the displacement data MU(k) generated by the high-pass filter processing unit 133, the correction data $M_{CC2}$(k) and the vibration component data $U_{OSC}$(k) generated by the correction data estimation unit 134 in the second interval T2, and setting data in the third interval T3 as the vibration component data $U_{OSC}$(k), as in Equation (51). That is, the measurement data generation unit 136 performs the processing of the measurement data generation step S170 in FIG. 35. The measurement data U'(k) generated by the measurement data generation unit 136 is stored in the storage unit 14 as the measurement data 143.

As described above, the measurement program 141 is a program that causes the measurement device 1, which is a computer, to execute each procedure of the flowchart shown in FIG. 35.

In the measurement method of the second embodiment described above, the measurement device 1 generates the displacement data $M_s$(k) in which the vibration component is reduced and the vibration component data $U_{OSC}$(k) including the vibration component, by using the target data U(k) to be processed. Then, the measurement device 1 generates the displacement data MU(k), in which the drift noise is reduced, based on the displacement data $M_s$(k), specifies the first interval T1, the second interval T2, and the third interval T3 based on the feature of the displacement data MU(k), and estimates the correction data $M_{CC}$(k) in the second interval T2. Since in the second interval T2, the correction data $M_{CC}$(k) corresponds to the difference between the displacement data MU(k) and the data obtained by removing the drift noise from the displacement data $M_s$(k), the correction data $M_{CC}$(k) includes the significant signal component removed by the high-pass filter processing. Therefore, according to the measurement method of the second embodiment, the measurement device 1 can generate the measurement data U'(k), in which the drift noise is reduced with respect to the target data U(k), by setting data in the first interval T1 and data in the third interval T3 as the vibration component data $U_{OSC}$(k) and adding the displacement data MU(k), the correction data $M_{CC}$(k), and the vibration component data $U_{OSC}$(k) in the second interval T2. According to the measurement method of the second embodiment, the measurement device 1 generates the displacement data MU(k), the correction data $M_{CC2}$(k) and the vibration component data $U_{OSC}$(k) using the target data U(k) to be processed, adds the displacement data MU(k), the correction data $M_{CC2}$(k) and the vibration component data $U_{OSC}$(k) in the second interval T2, and thereby the measurement device 1 can generate the measurement data U'(k), in which the drift noise is reduced, without preparing information for reducing the drift noise in advance. Therefore, by using the measurement method of the second embodiment, accurate measurement data U'(k) can be obtained regardless of a change in environment, and cost reduction can be achieved.

According to the measurement method of the second embodiment, in order to generate the measurement data U'(k), the measurement device 1 does not need to generate the correction data $M_{CC1}$(k) and $M_{CC3}$(k) in the first interval T1 and the third interval T3 and add the displacement data MU(k), the correction data $M_{CC1}$(k) and $M_{CC3}$(k), and the vibration component data $U_{OSC}$(k), and thus the calculation amount is reduced.

In particular, according to the measurement method of the second embodiment, the measurement device 1 can generate more appropriate correction data $M_{CC2}$(k) in the second interval T2 based on a feature of the displacement data MU(k) in which the drift noise and the vibration component is reduced with respect to the target data U(k), and thus the estimation accuracy of the generated correction data $M_{CC2}$(k) can be improved. In particular, since the measurement device 1 can generate the first line data $L1(k)$, the second line data $L2(k)$, and the third line data $L3(k)$ with high accuracy by setting the first coefficient $c_{TH}$ and the second coefficient CL to appropriate values, the measurement device 1 can generate the correction data $M_{CC2}(k)$ with high accuracy based on the first line data $L1(k)$, the second line data $L2(k)$, and the third line data $L3(k)$.

In addition, according to the measurement method of the second embodiment, it is possible to achieve the same effects as those of the measurement method of the first embodiment.

3. Modification

The present disclosure is not limited to the present embodiments, and various modifications can be made within the scope of the gist of the present disclosure.

Although in the above embodiments, the observation device is the sensor 2 that outputs the acceleration data $A_s(k)$, and the target data is the target data $U(k)$ obtained by integrating the acceleration data $A_s(k)$ twice, the observation device and the target data are not limited thereto. For example, the observation device may be a contact-type displacement meter, a ring-type displacement meter, a laser displacement meter, a pressure-sensitive sensor, an image processing-based displacement measurement device, or an optical fiber-based displacement measurement device, and the target data may be observation data observed by any of these observation devices. The contact-type displacement meter, the ring-type displacement meter, the laser displacement meter, the image processing-based displacement measurement device, or the optical fiber-based displacement measurement device measures a displacement of the observation point R caused by traveling of the railway vehicle 6. The pressure-sensitive sensor detects a change in stress at the observation point R caused by traveling of the railway vehicle 6. For example, the observation device may be a velocity sensor, and the target data may be data obtained by integrating the velocity detected by the velocity sensor. According to the measurement methods, the measurement device 1 can accurately measure the displacement of the superstructure 7 using the data of the displacement, the stress change, or the velocity.

Figure 38:
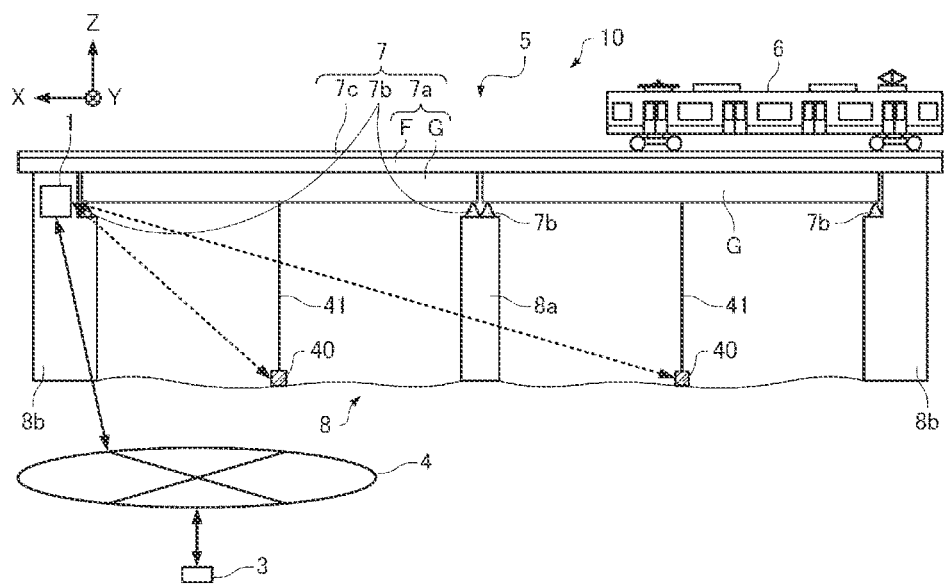
FIG. 38 shows another configuration example of the measurement system.
Figure 39:
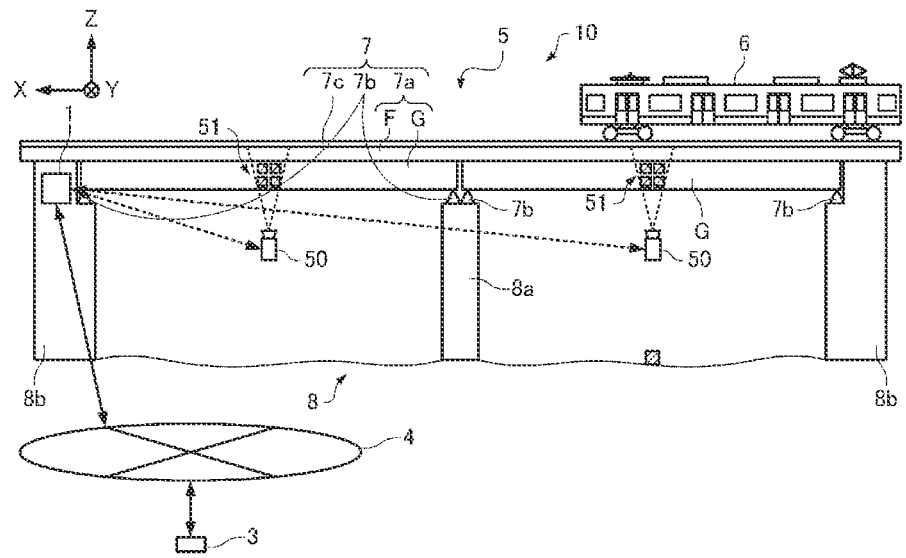
FIG. 39 shows another configuration example of the measurement system.

As an example, FIG. 38 shows a configuration example of the measurement system 10 using a ring-type displacement meter as the observation device. FIG. 39 shows a configuration example of the measurement system 10 using an image processing-based displacement measurement device as the observation device. In FIG. 38 and FIG. 39, the same components as those in FIG. 1 are denoted by the same reference numerals, and description thereof will be omitted. In the measurement system 10 shown in FIG. 38, a piano wire 41 is fixed between an upper surface of a ring-type displacement meter 40 and a lower surface of the main girder G immediately above the ring-type displacement meter 40, and the ring-type displacement meter 40 measures a displacement of the piano wire 41 caused by bending of the superstructure 7 and transmits the measured target data $U(k)$ to the measurement device 1. The measurement device 1 generates measurement data $U'(k)$, in which the drift noise is removed, based on the target data $U(k)$ transmitted from the ring-type displacement meter 40. In the measurement system 10 shown in FIG. 39, a camera 50 transmits, to the measurement device 1, an image obtained by imaging a target 51 provided on a side surface of the main girder G. The measurement device 1 processes the image transmitted from the camera 50, calculates the displacement of the target 51 due to the deflection of the superstructure to generate the target data $U(k)$, and generates the measurement data $U'(k)$, in which the drift noise is removed, based on the generated target data $U(k)$. In the example of FIG. 39, the measurement device 1 generates the target data $U(k)$ as an image processing-based displacement measurement device, but a displacement measurement device (not illustrated) different from the measurement device 1 may generate the target data $U(k)$ by image processing.

Figure 40:
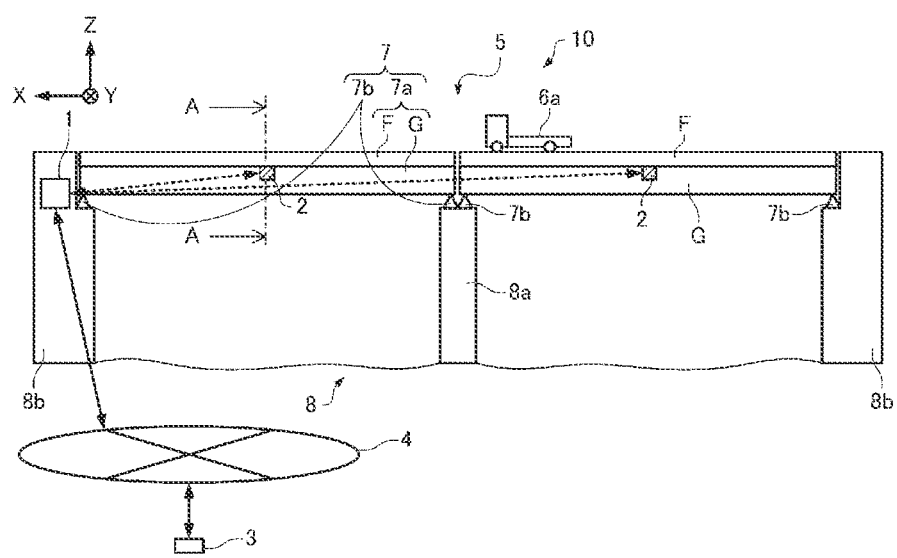
FIG. 40 shows another configuration example of the measurement system.
Figure 41:
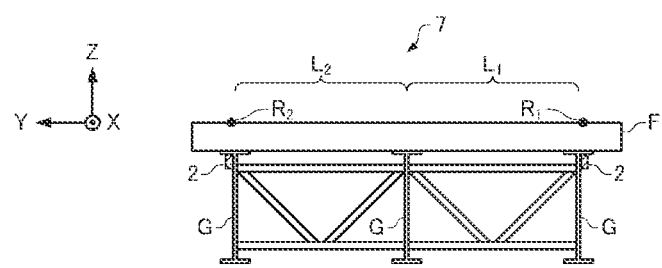
FIG. 41 is a cross-sectional view of a superstructure of FIG. 40 taken along line A-A.

In the embodiments described above, the bridge 5 is a railroad bridge, and the moving object moving on the bridge 5 is the railway vehicle 6, but the bridge 5 may be a road bridge, and the moving object moving on the bridge 5 may be a vehicle such as an automobile, a road train, or a construction vehicle. FIG. 40 illustrates a configuration example of the measurement system 10 in a case where the bridge 5 is a road bridge and a vehicle 6a moves on the bridge 5. In FIG. 40, the same components as those in FIG. 1 are denoted by the same reference numerals. As illustrated in FIG. 40, the bridge 5, which is a road bridge, includes the superstructure 7 and the substructure 8, similarly to the railroad bridge. FIG. 41 is a cross-sectional view of the superstructure 7 taken along line A-A of FIG. 40. As shown in FIGS. 40 and 41, the superstructure 7 includes the bridge floor 7a and the support 7b, and the bridge floor 7a includes the floor plate F, the main girder G, and a cross girder which is not shown. As shown in FIG. 40, the substructure 8 includes bridge piers 8a and bridge abutments 8b. The superstructure 7 is a structure across any one of the bridge abutment 8b and the bridge pier 8a adjacent to each other, two adjacent bridge abutments 8b, and two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a. The bridge 5 is, for example, a steel bridge, a girder bridge, or an RC bridge.

Each sensor 2 is installed at position of a central portion of the superstructure 7 in a longitudinal direction, specifically, at a central portion of the main girder G in the longitudinal direction. Each sensor 2 is not limited to being installed at the central portion of the superstructure 7 as long as each sensor 2 can detect an acceleration for calculating the displacement of the superstructure 7. When each sensor 2 is provided on the floor plate F of the superstructure 7, the sensor 2 may be damaged due to traveling of the vehicle 6a, and the measurement accuracy may be affected by local deformation of the bridge floor 7a, so that in the example of FIGS. 40 and 41, each sensor 2 is provided at the main girder G of the superstructure 7.

As shown in FIG. 41, the superstructure 7 has two lanes $L_1$ and $L_2$ and three main girders G to which the vehicle 6a as a moving object can move. In the example of FIGS. 40 and 41, in the central portion in the longitudinal direction of the superstructure 7, the sensors 2 are provided at two main girders at both ends, an observation point $R_1$ is provided at a position of a surface of the lane $L_1$ vertically above one of the sensors 2, and an observation point $R_2$ is provided at a position of a surface of the lane $L_2$ vertically above the other of the sensor 2. That is, the two sensors 2 are observation devices for observing the observation points $R_1$ and $R_2$, respectively. Although the two sensor 2 for observing the observation points $R_1$ and $R_2$ may be provided at positions where the accelerations generated at the observation points $R_1$ and $R_2$ due to the traveling of the vehicle 6a can be detected, it is desirable that the sensors 2 are provided at positions close to the observation points $R_1$ and $R_2$. The number and installation positions of the sensors 2 are not limited to the example shown in FIGS. 40 and 41, and various modifications can be made.

The measurement device 1 calculates displacements of bending of the lanes $L_1$ and $L_2$ caused by the traveling of the vehicle 6a based on the acceleration data output from the sensors 2, and transmits information on the displacements of the lanes $L_1$ and $L_2$ to the monitoring device 3 via the communication network 4. The monitoring device 3 may store the information in a storage device (not illustrated), and may perform processing such as monitoring of the vehicle 6a and abnormality determination of the superstructure 7 based on the information, for example.

In the embodiments described above, each sensor 2 is provided at the main girder G of the superstructure 7, but the sensor may be provided on the surface of or inside the superstructure 7, at the lower surface of the floor plate F, at the bridge pier 8a, or the like. In the embodiments described above, the superstructure of the bridge is described as an example of the structure, but the present disclosure is not limited thereto, and it is sufficient that the structure is deformed due to the movement of the moving object.

A railway vehicle or a vehicle passing through a bridge is a vehicle that has a large weight and can be measured by BWIM. The BWIM is an abbreviation of bridge weigh in motion, and is a technology in which a bridge is regarded as a "scale", deformation of the bridge is measured, and thereby the weight and the number of axles of the railway vehicle and vehicle passing through the bridge is measured. The superstructure of the bridge, which enables analysis of the weight of the railway vehicle or the vehicle, that travels on the bridge, based on a response such as deformation and strain, is a structure in which the BWIM functions. The BWIM system, which applies a physical process between an action on the superstructure of the bridge and the response, enables the measurement of the weight of the vehicle that travels on the bridge.

The embodiments and modifications described above are merely examples, and the present disclosure is not limited thereto. For example, it is also possible to appropriately combine the embodiments and modifications.

The present disclosure includes a configuration substantially the same as the configuration described in the embodiment, for example, a configuration having the same function, method and result, or a configuration having the same purpose and effect. The present disclosure includes a configuration obtained by replacing a non-essential portion of the configuration described in the embodiment. The present disclosure includes a configuration having the same operation and effect as the configuration described in the embodiments, or a configuration capable of achieving the same purpose. Further, the present disclosure includes a configuration in which a known technique is added to the configuration described in the embodiment.

The following contents are derived from the embodiments and modifications described above.

According to an aspect of the present disclosure, a measurement method includes: a low-pass filter processing step of performing low-pass filter processing on target data including a drift noise and a vibration component to generate vibration component reduction data in which the vibration component is reduced; a high-pass filter processing step of performing high-pass filter processing on the vibration component reduction data to generate drift noise reduction data in which the drift noise is reduced; a correction data estimation step of estimating, based on the drift noise reduction data, correction data corresponding to a difference between the drift noise reduction data and data obtained by removing the drift noise from the vibration component reduction data; a vibration component data generation step of generating vibration component data, which includes the vibration component, by subtracting the vibration component reduction data from the target data; and a measurement data generation step of generating measurement data by adding the drift noise reduction data, the correction data, and the vibration component data, in which the correction data estimation step includes: an interval specifying step of calculating a first peak and a second peak of the drift noise reduction data and specifying a first interval before the first peak, a second interval between the first peak and the second peak, and a third interval after the second peak, a first interval correction data generation step of generating first interval correction data by inverting a sign of the drift noise reduction data in the first interval, a second interval correction data generation step of generating second interval correction data in the second interval, a third interval correction data generation step of generating third interval correction data by inverting a sign of the drift noise reduction data in the third interval, and a correction data generation step of generating the correction data by adding the first interval correction data, the second interval correction data, and the third interval correction data, and the second interval correction data generation step includes: generating first line data linearly approximating the first interval correction data smaller than a product of a first coefficient and a value obtained by inverting a sign of an amplitude of the first peak, generating second line data obtained by multiplying a line passing through the first peak and the second peak by a second coefficient, generating third line data linearly approximating the third interval correction data smaller than a product of the first coefficient and a value obtained by inverting a sign of an amplitude of the second peak, calculating a first intersection point between the first line data and the second line data and a second intersection point between the second line data and the third line data, and generating the second interval correction data in the second interval by using data before the first intersection point as the first line data, data from the first intersection point to the second intersection point as the second line data, and data after the second intersection point as the third line data.

In the measurement method, the vibration component reduction data in which the vibration component is reduced and the vibration component data including the vibration component are generated using the target data to be processed, the drift noise reduction data in which the drift noise is reduced is generated based on the vibration component reduction data, and the correction data is estimated based on the drift noise reduction data. Since the vibration component of the drift noise reduction data is reduced, the correction data estimated with high accuracy is obtained. Further, since the correction data corresponds to the difference between the drift noise reduction data and the data obtained by subtracting the drift noise from the vibration component reduction data, the correction data includes the significant signal component removed by the high-pass filter processing. Therefore, according to the measurement method, the measurement data in which the drift noise is reduced with respect to the target data can be generated by adding the drift noise reduction data, the correction data, and the vibration component data. According to the measurement method, by generating the drift noise reduction data, the correction data and the vibration component data using the target data to be processed, and adding the drift noise reduction data, the correction data and the vibration component data, the measurement data in which the drift noise is reduced can be generated without preparing information for reducing the drift noise in advance. Therefore, by using the measurement method, accurate measurement data can be obtained regardless of a change in environment, and cost reduction can be achieved.

According to the measurement method, the three intervals can be specified based on a feature of the drift noise reduction data in which the drift noise and the vibration component are reduced with respect to the target data, and more appropriate correction data can be generated in each interval, so that the estimation accuracy of the generated correction data can be improved. In particular, since the first line data, the second line data, and the third line data with high accuracy can be obtained by setting the first coefficient and the second coefficient to appropriate values, the correction data with high accuracy can be generated in the second interval.

According to another aspect of the present disclosure, a measurement method includes: a low-pass filter processing step of performing low-pass filter processing on target data including a drift noise and a vibration component to generate vibration component reduction data in which the vibration component is reduced; a high-pass filter processing step of performing high-pass filter processing on the vibration component reduction data to generate drift noise reduction data in which the drift noise is reduced; an interval specifying step of calculating a first peak and a second peak of the drift noise reduction data and specifying a first interval before the first peak, a second interval between the first peak and the second peak, and a third interval after the second peak; a correction data estimation step of estimating, based on the drift noise reduction data, correction data in the second interval corresponding to a difference between the drift noise reduction data and data obtained by removing the drift noise from the vibration component reduction data; a vibration component data generation step of generating vibration component data, which includes the vibration component, by subtracting the vibration component reduction data from the target data; and a measurement data generation step of generating measurement data by setting data in the first interval as the vibration component reduction data, adding the drift noise reduction data, the correction data, and the vibration component data in the second interval, and setting data in the third interval as the vibration component reduction data, in which the correction data estimation step includes: generating first interval inverted data by inverting a sign of the drift noise reduction data in the first interval, generating third interval inverted data by inverting a sign of the drift noise reduction data in the third interval, generating first line data linearly approximating the first interval inverted data smaller than a product of a first coefficient and a value obtained by inverting a sign of an amplitude of the first peak, generating second line data obtained by multiplying a line passing through the first peak and the second peak by a second coefficient, generating third line data linearly approximating the third interval inverted data smaller than a product of the first coefficient and a value obtained by inverting a sign of an amplitude of the second peak, calculating a first intersection point between the first line data and the second line data and a second intersection point between the second line data and the third line data, and generating the correction data in the second interval by using data before the first intersection point as the first line data, data from the first intersection point to the second intersection point as the second line data, and data after the second intersection point as the third line data.

According to the measurement method, the vibration component reduction data in which the vibration component is reduced and the vibration component data including the vibration component are generated using the target data to be processed, the drift noise reduction data in which the drift noise is reduced is generated based on the vibration component reduction data, the three intervals are specified based on a feature of the drift noise reduction data, and the correction data in the second interval is estimated. Since the vibration component of the drift noise reduction data is reduced, the correction data estimated with high accuracy in the second interval is obtained. Further, since the correction data in second interval corresponds to the difference between the drift noise reduction data and the data obtained by removing the drift noise from the vibration component reduction data, the correction data includes the significant signal component removed by the high-pass filter processing. Therefore, according to the measurement method, by setting data in the first interval and data in the third interval as the vibration component data and adding the drift noise reduction data, the correction data, and the vibration component data in the second interval, it is possible to generate the measurement data in which the drift noise is reduced with respect to the target data. According to the measurement method, by generating the drift noise reduction data, the correction data and the vibration component data using the target data to be processed, and adding the drift noise reduction data, the correction data and the vibration component data in the second interval, the measurement data in which the drift noise is reduced can be generated without preparing information for reducing the drift noise in advance. Therefore, by using the measurement method, accurate measurement data can be obtained regardless of a change in environment, and cost reduction can be achieved.

According to the measurement method, based on a feature of the drift noise reduction data in which the drift noise and the vibration component are reduced with respect to the target data, more appropriate correction data can be generated in the second interval, so that the estimation accuracy of the generated correction data can be improved. In particular, since the first line data, the second line data, and the third line data with high accuracy can be obtained by setting the first coefficient and the second coefficient to appropriate values, the correction data with high accuracy can be generated in the second interval.

According to the measurement method, in order to generate the measurement data, there is no need to generate the correction data and to add the drift noise reduction data, the correction data and vibration component data in the first interval and the third interval, so that the calculation amount is reduced.

In the measurement method of the above aspect, in the low-pass filter processing step, a fundamental frequency may be calculated by performing fast Fourier transform processing on the target data, and the vibration component reduction data may be generated by performing, as the low-pass filter processing, moving average processing on the target data at a cycle corresponding to the fundamental frequency.

According to the measurement method, in the moving average processing, not only the necessary calculation amount is small, but also an attenuation amount of the signal component and the harmonic component of the fundamental frequency is very large, so that the vibration component reduction data in which the vibration component is effectively reduced is obtained. Therefore, according to the measurement method, the estimation accuracy of the correction data can be improved by eliminating the influence of the vibration component.

In the measurement method of the above aspect, in the low-pass filter processing step, a fundamental frequency may be calculated by performing fast Fourier transform processing on the target data, and the vibration component reduction data may be generated by performing, as the low-pass filter processing, FIR filter processing for attenuating a signal component of a frequency equal to or higher than the fundamental frequency on the target data.

According to the measurement method, although the FIR filter processing has a larger calculation amount than the moving average processing, all signal components of a frequency equal to or higher than the fundamental frequency can be attenuated. Therefore, according to the measurement method, the estimation accuracy of the correction data can be improved by eliminating the influence of the vibration component equal to or higher than the fundamental frequency.

In the measurement method of the above aspect, the first coefficient $c_{TH}$ may be larger than 0 and smaller than 1.

In the measurement method of the above aspect, the second coefficient may be larger than −4 and equal to or smaller than −2.

In the measurement method of the above aspect, the high-pass filter processing may be processing of subtracting, from the vibration component reduction data, data obtained by performing moving average processing or FIR filter processing on the vibration component reduction data.

According to the measurement method, the high-pass filter processing can be easily performed, and in the moving average processing or the FIR filter processing, a group delay of each signal component included in the vibration component reduction data is constant, so that the correction data can be estimated with high accuracy.

In the measurement method of the above aspect, the target data may be data of a displacement of a structure caused by a moving object that moves on the structure.

According to the measurement method, since the data of the displacement of the structure caused by the movement of the moving object is obtained as the measurement data in which the drift noise is reduced, the displacement of the structure can be measured with high accuracy.

In the measurement method of the above aspect, the target data may be data obtained by integrating twice an acceleration in a direction intersecting a surface of the structure on which the moving object moves.

According to the measurement method, it is possible to accurately measure the displacement of the structure using output data of an acceleration sensor installed at the structure.

In the measurement method of the above aspect, the target data may be observation data observed by a contact-type displacement meter, a ring-type displacement meter, a laser displacement meter, a pressure-sensitive sensor, an image processing-based displacement measurement device or an optical fiber-based displacement measurement device, or data obtained by integrating a velocity detected by a velocity sensor.

According to the measurement method, it is possible to accurately measure the displacement of the structure using data of a displacement, a stress change, or a velocity.

In the measurement method of the above aspect, the structure may be a superstructure of a bridge.

According to the measurement method, it is possible to accurately measure a displacement of the superstructure of the bridge.

In the measurement method of the above aspect, a frequency of the drift noise may be lower than a minimum value of a natural vibration frequency of the superstructure.

According to the measurement method, by setting a cutoff frequency of the low-pass filter processing and the high-pass filter processing to be higher than the frequency of the drift noise of the superstructure and lower than the minimum value of the natural vibration frequency, the drift noise in the generated displacement data can be reduced without reducing the signal component and the harmonic component of the natural vibration frequency of the superstructure.

In the measurement method of the above aspect, the moving object may be a vehicle or a railway vehicle.

According to the measurement method, it is possible to accurately measure the displacement of the structure caused by movement of the vehicle or the railway vehicle.

In the measurement method of the above aspect, the target data may include data of a waveform that projects in a positive direction or a negative direction.

According to the measurement method, since more appropriate correction data can be generated based on a feature of the waveform that projects in the positive direction or the negative direction, it is possible to improve the estimation accuracy of the generated correction data.

In the measurement method of the above aspect, the waveform may be a rectangular waveform, a trapezoidal waveform, or a sine half-wave waveform.

According to the measurement method, since more appropriate correction data can be generated based on a feature of the rectangular waveform, the trapezoidal waveform or the sine half-wave waveform, it is possible to improve the estimation accuracy of the generated correction data.

According to an aspect of the present disclosure, a measurement device includes: a low-pass filter processing unit configured to perform low-pass filter processing on target data including a drift noise and a vibration component to generate vibration component reduction data in which the vibration component is reduced; a high-pass filter processing unit configured to perform high-pass filter processing on the vibration component reduction data to generate drift noise reduction data in which the drift noise is reduced; a correction data estimation unit configured to estimate, based on the drift noise reduction data, correction data corresponding to a difference between the drift noise reduction data and data obtained by removing the drift noise from the vibration component reduction data; a vibration component data generation unit configured to generate vibration component data, which includes the vibration component, by subtracting the vibration component reduction data from the target data; and a measurement data generation unit configured to generate measurement data by adding the drift noise reduction data, the correction data, and the vibration component data, in which the correction data estimation unit is configured to: calculate a first peak and a second peak of the drift noise reduction data and specify a first interval before the first peak, a second interval between the first peak and the second peak, and a third interval after the second peak, generate first interval correction data by inverting a sign of the drift noise reduction data in the first interval, generate third interval correction data by inverting a sign of the drift noise reduction data in the third interval, generate first line data linearly approximating the first interval correction data smaller than a product of a first coefficient and a value obtained by inverting a sign of an amplitude of the first peak, generate second line data obtained by multiplying a line passing through the first peak and the second peak by a second coefficient, generate third line data linearly approximating the third interval correction data smaller than a product of the first coefficient and a value obtained by inverting a sign of an amplitude of the second peak, calculate a first intersection point between the first line data and the second line data and a second intersection point between the second line data and the third line data, generate the second interval correction data in the second interval by using data before the first intersection point as the first line data, data from the first intersection point to the second intersection point as the second line data, and data after the second intersection point as the third line data, and generate the correction data by adding the first interval correction data, the second interval correction data, and the third interval correction data.

In the measurement device, the vibration component reduction data in which the vibration component is reduced and the vibration component data including the vibration component are generated using the target data to be processed, the drift noise reduction data in which the drift noise is reduced is generated based on the vibration component reduction data, and the correction data is estimated based on the drift noise reduction data. Since the vibration component of the drift noise reduction data is reduced, the correction data estimated with high accuracy is obtained. Further, since the correction data corresponds to the difference between the drift noise reduction data and the data obtained by subtracting the drift noise from the vibration component reduction data, the correction data includes the significant signal component removed by the high-pass filter processing. Therefore, according to the measurement device, the measurement data in which the drift noise is reduced with respect to the target data can be generated by adding the drift noise reduction data, the correction data, and the vibration component data. According to the measurement device, by generating the drift noise reduction data, the correction data and the vibration component data using the target data to be processed, and adding the drift noise reduction data, the correction data and the vibration component data, the measurement data in which the drift noise is reduced can be generated without preparing information for reducing the drift noise in advance. Therefore, by using the measurement device, accurate measurement data can be obtained regardless of a change in environment, and cost reduction can be achieved.

According to the measurement device, the three intervals can be specified based on a feature of the drift noise reduction data in which the drift noise and the vibration component are reduced with respect to the target data, and more appropriate correction data can be generated in each interval, so that the estimation accuracy of the generated correction data can be improved. In particular, since the first line data, the second line data, and the third line data with high accuracy can be obtained by setting the first coefficient and the second coefficient to appropriate values, the correction data with high accuracy can be generated in the second interval.

According to an aspect of the present disclosure, a measurement system includes: the measurement device according to the above aspect; and an observation device configured to observe an observation point, in which the target data is data based on the observation data observed by the observation device.

According to an aspect of the present disclosure, a non-transitory computer-readable storage medium stores a measurement program, and the measurement program causes a computer to execute: a low-pass filter processing step of performing low-pass filter processing on target data including a drift noise and a vibration component to generate vibration component reduction data in which the vibration component is reduced; a high-pass filter processing step of performing high-pass filter processing on the vibration component reduction data to generate drift noise reduction data in which the drift noise is reduced; a correction data estimation step of estimating, based on the drift noise reduction data, correction data corresponding to a difference between the drift noise reduction data and data obtained by removing the drift noise from the vibration component reduction data; a vibration component data generation step of generating vibration component data, which includes the vibration component, by subtracting the vibration component reduction data from the target data; and a measurement data generation step of generating measurement data by adding the drift noise reduction data, the correction data, and the vibration component data, in which the correction data estimation step includes: an interval specifying step of calculating a first peak and a second peak of the drift noise reduction data and specifying a first interval before the first peak, a second interval between the first peak and the second peak, and a third interval after the second peak, a first interval correction data generation step of generating first interval correction data by inverting a sign of the drift noise reduction data in the first interval, a second interval correction data generation step of generating second interval correction data in the second interval, a third interval correction data generation step of generating third interval correction data by inverting a sign of the drift noise reduction data in the third interval, and a correction data generation step of generating the correction data by adding the first interval correction data, the second interval correction data, and the third interval correction data, and the second interval correction data generation step includes: generating first line data linearly approximating the first interval correction data smaller than a product of a first coefficient and a value obtained by inverting a sign of an amplitude of the first peak, generating second line data obtained by multiplying a line passing through the first peak and the second peak by a second coefficient, generating third line data linearly approximating the third interval correction data smaller than a product of the first coefficient and a value obtained by inverting a sign of an amplitude of the second peak, calculating a first intersection point between the first line data and the second line data and a second intersection point between the second line data and the third line data, and generating the second interval correction data in the second interval by using data before the first intersection point as the first line data, data from the first intersection point to the second intersection point as the second line data, and data after the second intersection point as the third line data.

According to the measurement program, the vibration component reduction data in which the vibration component is reduced and the vibration component data including the vibration component are generated using the target data to be processed, the drift noise reduction data in which the drift noise is reduced is generated based on the vibration component reduction data, and the correction data is estimated based on the drift noise reduction data. Since the vibration component of the drift noise reduction data is reduced, the correction data estimated with high accuracy is obtained. Further, since the correction data corresponds to the difference between the drift noise reduction data and the data obtained by subtracting the drift noise from the vibration component reduction data, the correction data includes the significant signal component removed by the high-pass filter processing. Therefore, according to the measurement program, the measurement data in which the drift noise is reduced with respect to the target data can be generated by adding the drift noise reduction data, the correction data and the vibration component data. According to the measurement program, by generating the drift noise reduction data, the correction data and the vibration component data using the target data to be processed, and adding the drift noise reduction data, the correction data and the vibration component data, the measurement data in which the drift noise is reduced can be generated without preparing information for reducing the drift noise in advance. Therefore, by using the measurement program, accurate measurement data can be obtained regardless of a change in environment, and cost reduction can be achieved.

According to the measurement program, the three intervals can be specified based on a feature of the drift noise reduction data in which the drift noise and the vibration component are reduced with respect to the target data, and more appropriate correction data can be generated in each interval, so that the estimation accuracy of the generated correction data can be improved. In particular, since the first line data, the second line data, and the third line data with high accuracy can be obtained by setting the first coefficient and the second coefficient to appropriate values, the correction data with high accuracy can be generated in the second interval.

What is claimed is:

1. A measurement method comprising executing on a processor steps of:
    a target data generation step of acquiring target data, the target data corresponding to observation data sensed by an acceleration sensor, the acceleration sensor being disposed at a superstructure of a bridge, the observation data corresponding to displacement of the superstructure due to moving of a vehicle on the superstructure, the target data including a drift noise and a vibration component of the superstructure;
    a low-pass filter processing step of performing low-pass filter processing on the target data to generate vibration component reduction data in which the vibration component is reduced;
    a high-pass filter processing step of performing high-pass filter processing on the vibration component reduction data to generate drift noise reduction data in which the drift noise is reduced;
    a correction data estimation step of estimating, based on the drift noise reduction data, correction data corresponding to a difference between the drift noise reduction data and data obtained by removing the drift noise from the vibration component reduction data;
    a vibration component data generation step of generating vibration component data, which includes the vibration component, by subtracting the vibration component reduction data from the target data;
    a measurement data generation step of generating measurement data by adding the drift noise reduction data, the correction data, and the vibration component data, while a deformation of the superstructure of the bridge is measured by a bridge weigh in motion system; and
    a measurement data transmission step of transmitting the measurement data to a monitoring device, the monitoring device being configured to monitor a state of the superstructure based on the measurement data,
    wherein the correction data estimation step includes:
        an interval specifying step of calculating a first peak and a second peak of the drift noise reduction data, and specifying a first interval before the first peak, a second interval between the first peak and the second peak, and a third interval after the second peak;
        a first interval correction data generation step of generating first interval correction data by inverting a sign of the drift noise reduction data in the first interval;
        a second interval correction data generation step of generating second interval correction data in the second interval;
        a third interval correction data generation step of generating third interval correction data by inverting a sign of the drift noise reduction data in the third interval; and
        a correction data generation step of generating the correction data by adding the first interval correction data, the second interval correction data, and the third interval correction data,
    the second interval correction data generation step includes:
        generating first line data linearly approximating the first interval correction data smaller than a product of a first coefficient and a value obtained by inverting a sign of an amplitude of the first peak;
        generating second line data obtained by multiplying a line passing through the first peak and the second peak by a second coefficient;
        generating third line data linearly approximating the third interval correction data smaller than a product of the first coefficient and a value obtained by inverting a sign of an amplitude of the second peak;
        calculating a first intersection point between the first line data and the second line data, and a second intersection point between the second line data and the third line data; and
        generating the second interval correction data in the second interval by using data before the first intersection point as the first line data, data from the first intersection point to the second intersection point as the second line data, and data after the second intersection point as the third line data, and
    an abnormality of the superstructure of the bridge is determined based on the measurement data.

2. The measurement method according to claim 1, wherein
    in the low-pass filter processing step,
    a fundamental frequency is calculated by performing fast Fourier transform processing on the target data, and the vibration component reduction data is generated by performing, as the low-pass filter processing, moving average processing on the target data at a cycle corresponding to the fundamental frequency.

3. The measurement method according to claim 1, wherein
    in the low-pass filter processing step,
    a fundamental frequency is calculated by performing fast Fourier transform processing on the target data, and the vibration component reduction data is generated by performing, as the low-pass filter processing, finite impulse response (FIR) filter processing for attenuating a signal component of a frequency equal to or higher than the fundamental frequency on the target data.

4. The measurement method according to claim 1, wherein
the first coefficient is larger than 0 and smaller than 1.

5. The measurement method according to claim 1, wherein
the second coefficient is larger than −4 and equal to or smaller than −2.

6. The measurement method according to claim 1, wherein
the high-pass filter processing is processing of subtracting, from the vibration component reduction data, data obtained by performing moving average processing or finite impulse response (FIR) filter processing on the vibration component reduction data.

7. The measurement method according to claim 1, wherein
the observation data corresponds to acceleration sensed by the acceleration sensor, and
the target data is obtained by integrating twice the acceleration in a direction intersecting a surface of the superstructure on which the vehicle moves.

8. The measurement method according to claim 1, wherein
the observation data includes data observed by a contact-type displacement meter, a ring-type displacement meter, a laser displacement meter, a pressure-sensitive sensor, an image processing-based displacement measurement device or an optical fiber-based displacement measurement device, or data obtained by integrating a velocity detected by a velocity sensor.

9. The measurement method according to claim 1, wherein
a frequency of the drift noise is lower than a minimum value of a natural vibration frequency of the superstructure.

10. The measurement method according to claim 1, wherein
the vehicle is a railway vehicle.

11. The measurement method according to claim 1, wherein
the target data includes data of a waveform that projects in a positive direction or a negative direction.

12. The measurement method according to claim 11, wherein
the waveform is a rectangular waveform, a trapezoidal waveform, or a sine half-wave waveform.

13. A measurement method comprising executing on a processor steps of:
a target data generation step of acquiring target data, the target data corresponding to observation data sensed by an acceleration sensor, the acceleration sensor being disposed at a superstructure of a bridge, the observation data corresponding to displacement of the superstructure due to moving of a vehicle on the superstructure, the target data including a drift noise and a vibration component of the superstructure;
a low-pass filter processing step of performing low-pass filter processing on the target data to generate vibration component reduction data in which the vibration component is reduced;
a high-pass filter processing step of performing high-pass filter processing on the vibration component reduction data to generate drift noise reduction data in which the drift noise is reduced;
an interval specifying step of calculating a first peak and a second peak of the drift noise reduction data, and specifying a first interval before the first peak, a second interval between the first peak and the second peak, and a third interval after the second peak;
a correction data estimation step of estimating, based on the drift noise reduction data, correction data in the second interval corresponding to a difference between the drift noise reduction data and data obtained by removing the drift noise from the vibration component reduction data;
a vibration component data generation step of generating vibration component data, which includes the vibration component, by subtracting the vibration component reduction data from the target data;
a measurement data generation step of generating measurement data by setting data in the first interval as the vibration component reduction data, adding the drift noise reduction data, the correction data, and the vibration component data in the second interval while a deformation of the superstructure of the bridge is measured by a bridge weigh in motion system, and setting data in the third interval as the vibration component reduction data; and
a measurement data transmission step of transmitting the measurement data to a monitoring device, the monitoring device being configured to monitor a state of the superstructure based on the measurement data,
wherein the correction data estimation step includes:
generating first interval inverted data by inverting a sign of the drift noise reduction data in the first interval;
generating third interval inverted data by inverting a sign of the drift noise reduction data in the third interval;
generating first line data linearly approximating the first interval inverted data smaller than a product of a first coefficient and a value obtained by inverting a sign of an amplitude of the first peak;
generating second line data obtained by multiplying a line passing through the first peak and the second peak by a second coefficient;
generating third line data linearly approximating the third interval inverted data smaller than a product of the first coefficient and a value obtained by inverting a sign of an amplitude of the second peak;
calculating a first intersection point between the first line data and the second line data, and a second intersection point between the second line data and the third line data; and
generating the correction data in the second interval by using data before the first intersection point as the first line data, data from the first intersection point to the second intersection point as the second line data, and data after the second intersection point as the third line data, and
an abnormality of the superstructure of the bridge is determined based on the measurement data.

14. A measurement device, comprising:
a memory configured to store a program; and
a processor configured to execute the program so as to:
acquire target data, the target data corresponding to observation data sensed by an acceleration sensor, the acceleration sensor being disposed at a superstructure of a bridge, the observation data corresponding to displacement of the superstructure due to moving of a vehicle on the superstructure, the target data including a drift noise and a vibration component of the superstructure;

perform low-pass filter processing on the target data to generate vibration component reduction data in which the vibration component is reduced;

perform high-pass filter processing on the vibration component reduction data to generate drift noise reduction data in which the drift noise is reduced;

estimate, based on the drift noise reduction data, correction data corresponding to a difference between the drift noise reduction data and data obtained by removing the drift noise from the vibration component reduction data;

generate vibration component data, which includes the vibration component, by subtracting the vibration component reduction data from the target data;

generate measurement data by adding the drift noise reduction data, the correction data, and the vibration component data, while a deformation of the superstructure of the bridge is measured by a bridge weigh in motion system; and transmit the measurement data to a monitoring device, the monitoring device being configured to monitor a state of the superstructure based on the measurement data, wherein the processor is further configured to:

calculate a first peak and a second peak of the drift noise reduction data, and specify a first interval before the first peak, a second interval between the first peak and the second peak, and a third interval after the second peak;

generate first interval correction data by inverting a sign of the drift noise reduction data in the first interval;

generate third interval correction data by inverting a sign of the drift noise reduction data in the third interval;

generate first line data linearly approximating the first interval correction data smaller than a product of a first coefficient and a value obtained by inverting a sign of an amplitude of the first peak;

generate second line data obtained by multiplying a line passing through the first peak and the second peak by a second coefficient;

generate third line data linearly approximating the third interval correction data smaller than a product of the first coefficient and a value obtained by inverting a sign of an amplitude of the second peak;

calculate a first intersection point between the first line data and the second line data, and a second intersection point between the second line data and the third line data;

generate second interval correction data in the second interval by using data before the first intersection point as the first line data, data from the first intersection point to the second intersection point as the second line data, and data after the second intersection point as the third line data; and generate the correction data by adding the first interval correction data, the second interval correction data, and the third interval correction data, and an abnormality of the superstructure of the bridge is determined based on the measurement data.

15. A measurement system, comprising:
the measurement device according to claim 14; and
the acceleration sensor.

16. A non-transitory computer-readable storage medium storing a measurement program for causing a computer to execute a process by a processor so as to perform steps of:

a target data generation step of acquiring target data, the target data corresponding to observation data sensed by an acceleration sensor, the acceleration sensor being disposed at a superstructure of a bridge, the observation data corresponding to displacement of the superstructure due to moving of a vehicle on the superstructure, the target data including a drift noise and a vibration component of the superstructure;

a low-pass filter processing step of performing low-pass filter processing on the target data to generate vibration component reduction data in which the vibration component is reduced;

a high-pass filter processing step of performing high-pass filter processing on the vibration component reduction data to generate drift noise reduction data in which the drift noise is reduced;

a correction data estimation step of estimating, based on the drift noise reduction data, correction data corresponding to a difference between the drift noise reduction data and data obtained by removing the drift noise from the vibration component reduction data;

a vibration component data generation step of generating vibration component data, which includes the vibration component, by subtracting the vibration component reduction data from the target data;

a measurement data generation step of generating measurement data by adding the drift noise reduction data, the correction data, and the vibration component data, while a deformation of the superstructure of the bridge is measured by a bridge weigh in motion system; and a measurement data transmission step of transmitting the measurement data to a monitoring device, the monitoring device being configured to monitor a state of the superstructure based on the measurement data, wherein the correction data estimation step includes:

an interval specifying step of calculating a first peak and a second peak of the drift noise reduction data, and specifying a first interval before the first peak, a second interval between the first peak and the second peak, and a third interval after the second peak;

a first interval correction data generation step of generating first interval correction data by inverting a sign of the drift noise reduction data in the first interval;

a second interval correction data generation step of generating second interval correction data in the second interval;

a third interval correction data generation step of generating third interval correction data by inverting a sign of the drift noise reduction data in the third interval; and a correction data generation step of generating the correction data by adding the first interval correction data, the second interval correction data, and the third interval correction data, the second interval correction data generation step includes:

generating first line data linearly approximating the first interval correction data smaller than a product of a first coefficient and a value obtained by inverting a sign of an amplitude of the first peak;

generating second line data obtained by multiplying a line passing through the first peak and the second peak by a second coefficient;

generating third line data linearly approximating the third interval correction data smaller than a product of the first coefficient and a value obtained by inverting a sign of an amplitude of the second peak;

calculating a first intersection point between the first line data and the second line data, and a second intersection point between the second line data and the third line data; and generating the second interval correction data in the second interval by using data before the first intersection point as the first line data, data from the first intersection point to the second intersection point as the second line data, and data after the second intersection point as the third line data, and an abnormality of the superstructure of the bridge is determined based on the measurement data.

* * * * *